United States Patent
Kim et al.

(10) Patent No.: US 10,067,641 B2
(45) Date of Patent: Sep. 4, 2018

(54) USER TERMINAL DEVICE AND DISPLAYING METHOD THEREOF

(71) Applicant: SAMSUNG ELECTRONICS CO., LTD., Suwon-si (KR)

(72) Inventors: Yun-kyung Kim, Suwon-si (KR); Dong-Goo Kang, Seoul (KR); Yong-yeon Lee, Suwon-si (KR); Ji-yeon Kwak, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/618,421

(22) Filed: Feb. 10, 2015

(65) Prior Publication Data
US 2015/0227249 A1    Aug. 13, 2015

Related U.S. Application Data

(60) Provisional application No. 61/937,744, filed on Feb. 10, 2014.

(30) Foreign Application Priority Data

Jul. 3, 2014   (KR) ........................ 10-2014-0083282

(51) Int. Cl.
*G06F 3/041*   (2006.01)
*G06F 3/0482*  (2013.01)
(Continued)

(52) U.S. Cl.
CPC .......... *G06F 3/0482* (2013.01); *G06F 1/1652* (2013.01); *G06F 1/1694* (2013.01);
(Continued)

(58) Field of Classification Search
CPC ........ G06F 1/1615; G06F 1/1677; G06F 1/32; G06F 1/1616; G06F 1/1652;
(Continued)

(56) References Cited

U.S. PATENT DOCUMENTS

| 7,453,437 B2 | 11/2008 | Inui |
|---|---|---|
| 8,502,788 B2 | 8/2013 | Cho |

(Continued)

FOREIGN PATENT DOCUMENTS

| CN | 101788850 A | 7/2010 |
|---|---|---|
| CN | 102150120 A | 8/2011 |

(Continued)

OTHER PUBLICATIONS

Search Report dated Apr. 28, 2015, issued by the International Searching Authority in counterpart International Application No. PCT/KR2015/001347.

(Continued)

*Primary Examiner* — Insa Sadio
(74) *Attorney, Agent, or Firm* — Sughrue Mion, PLLC

(57) ABSTRACT

A user terminal device and a displaying method thereof are provided. The user terminal device includes a display which is divided by a folding line into a first area and a second area, the second area being larger than the first area and comprising an exposure area that is exposed while the display is folded along the folding line such that the first area faces the second area, a detector configured to detect a first user interaction of moving along a long side of the exposure area and a second user interaction of moving along a short side of the exposure area, and a controller configured to display a first function execution screen on the exposure area in response to detecting the first user interaction, and display a second function execution screen on the exposure area in response to detecting the second user interaction.

18 Claims, 85 Drawing Sheets

(51) Int. Cl.
*G06F 9/451* (2018.01)
*H04M 1/02* (2006.01)
*H04M 1/725* (2006.01)
*G06F 3/0488* (2013.01)
*G06F 3/0484* (2013.01)
*G06F 3/0487* (2013.01)
*G06F 1/16* (2006.01)
*G06F 9/44* (2018.01)

(52) U.S. Cl.
CPC ........ *G06F 3/0487* (2013.01); *G06F 3/04842* (2013.01); *G06F 3/04847* (2013.01); *G06F 3/04883* (2013.01); *G06F 3/04886* (2013.01); *G06F 9/4443* (2013.01); *G06F 9/451* (2018.02); *H04M 1/0214* (2013.01); *H04M 1/0243* (2013.01); *H04M 1/0245* (2013.01); *H04M 1/72522* (2013.01); *H04M 1/72583* (2013.01); *G06F 2200/1637* (2013.01); *G06F 2203/04803* (2013.01); *H04M 2250/16* (2013.01); *H04M 2250/22* (2013.01)

(58) Field of Classification Search
CPC ........... G06F 1/1694; G06F 2200/1637; G06F 2203/04803; G06F 3/0482; G06F 3/04842; G06F 3/04847; G06F 3/0487; G06F 3/04883; G06F 3/04886; G06F 9/4443; G06F 9/451; H04M 1/0214; H04M 1/02
USPC ............. 345/156; 455/566; 463/30; 715/773
See application file for complete search history.

(56) References Cited

U.S. PATENT DOCUMENTS

| | | |
|---|---|---|
| 8,836,611 B2 | 9/2014 | Kilpatrick, II et al. |
| 8,863,038 B2 | 10/2014 | King et al. |
| 8,866,840 B2 | 10/2014 | Dahl et al. |
| 8,923,934 B2 | 12/2014 | Choi et al. |
| 9,489,078 B2 | 11/2016 | Seo et al. |
| 9,489,079 B2 | 11/2016 | Seo et al. |
| 9,489,080 B2 | 11/2016 | Seo et al. |
| 9,684,342 B2 | 6/2017 | Kim et al. |
| 2005/0104866 A1 | 5/2005 | Inui |
| 2006/0189345 A1 | 8/2006 | Suzuki et al. |
| 2007/0149262 A1 | 6/2007 | Navntoft |
| 2008/0158795 A1 | 7/2008 | Aoki et al. |
| 2009/0011798 A1 | 1/2009 | Yamada |
| 2010/0056272 A1* | 3/2010 | Dutilly .................. G06F 1/329 463/30 |
| 2010/0064244 A1* | 3/2010 | Kilpatrick, II ........ G06F 1/1616 715/773 |
| 2010/0079355 A1 | 4/2010 | Kilpatrick, II et al. |
| 2010/0085274 A1 | 4/2010 | Kilpatrick, II et al. |
| 2010/0120470 A1* | 5/2010 | Kim ..................... G06F 1/1615 455/566 |
| 2010/0182265 A1 | 7/2010 | Kim et al. |
| 2010/0241989 A1 | 9/2010 | Wen |
| 2011/0126141 A1 | 5/2011 | King et al. |
| 2011/0216064 A1 | 9/2011 | Dahl et al. |
| 2011/0241998 A1 | 10/2011 | McKinney et al. |
| 2012/0115422 A1 | 5/2012 | Tziortzis et al. |
| 2012/0129581 A1 | 5/2012 | Choi et al. |
| 2012/0262367 A1 | 10/2012 | Chiu et al. |
| 2013/0027364 A1 | 1/2013 | Kim et al. |
| 2013/0050270 A1* | 2/2013 | Joo ......................... G09G 3/20 345/661 |
| 2013/0097668 A1 | 4/2013 | Park et al. |
| 2013/0120239 A1 | 5/2013 | Suzuki et al. |
| 2013/0127918 A1 | 5/2013 | Kang et al. |
| 2013/0141373 A1 | 6/2013 | Takuma et al. |
| 2013/0154970 A1 | 6/2013 | Seo et al. |
| 2013/0176248 A1 | 7/2013 | Shin et al. |
| 2013/0222998 A1 | 8/2013 | Cho et al. |
| 2013/0265221 A1 | 10/2013 | Lee et al. |
| 2013/0296000 A1 | 11/2013 | Park et al. |
| 2013/0300679 A1 | 11/2013 | Oh et al. |
| 2013/0321340 A1 | 12/2013 | Seo et al. |
| 2014/0028596 A1 | 1/2014 | Seo et al. |
| 2014/0029212 A1 | 1/2014 | Hwang et al. |
| 2014/0062919 A1 | 3/2014 | Park |
| 2014/0245225 A1 | 8/2014 | Yagihashi et al. |
| 2014/0320393 A1* | 10/2014 | Modarres ................ G06F 3/017 345/156 |
| 2015/0004939 A1 | 1/2015 | Higashibeppu |
| 2015/0153778 A1* | 6/2015 | Jung ..................... G06F 1/1677 345/156 |
| 2015/0309691 A1 | 10/2015 | Seo et al. |
| 2015/0378503 A1 | 12/2015 | Seo et al. |
| 2017/0052698 A1 | 2/2017 | Seo et al. |

FOREIGN PATENT DOCUMENTS

| | | |
|---|---|---|
| CN | 102187296 A | 9/2011 |
| CN | 102469183 A | 5/2012 |
| CN | 103477304 A | 12/2013 |
| EP | 2581808 A1 | 4/2013 |
| JP | 2005-149364 A | 6/2005 |
| JP | 2009-124449 A | 6/2009 |
| JP | 2009-201157 A | 9/2009 |
| JP | 2010-63159 A | 3/2010 |
| JP | 2010-66918 A | 3/2010 |
| JP | 2013-73352 A | 4/2013 |
| KR | 10-1063882 B1 | 9/2011 |
| KR | 10-2013-0056674 A | 5/2013 |
| KR | 10-2013-0113895 A | 10/2013 |
| KR | 10-2013-0127122 A | 11/2013 |
| RU | 2 480 811 C2 | 4/2013 |
| WO | 2008/147637 A1 | 12/2008 |
| WO | 2013/154318 A1 | 10/2013 |
| WO | 2014/021628 A1 | 2/2014 |

OTHER PUBLICATIONS

Written Opinion dated Apr. 28, 2015, issued by the International Searching Authority in counterpart International Application No. PCT/KR2015/001347.
Search Report dated Apr. 27, 2015, issued by the International Searching Authority in counterpart International Application No. PCT/KR2015/001266.
Written Opinion dated Apr. 27, 2015, issued by the International Searching Authority in counterpart International Application No. PCT/KR2015/001266.
Search Report dated May 19, 2015, issued by the International Searching Authority in counterpart International Application No. PCT/KR2015/001341.
Written Opinion dated May 19, 2015, issued by the International Searching Authority in counterpart International Application No. PCT/KR2015/001341.
Search Report dated Apr. 30, 2015, issued by the International Searching Authority in counterpart International Application No. PCT/KR2015/001312.
Written Opinion dated Apr. 30, 2015, issued by the International Searching Authority in counterpart International Application No. PCT/KR2015/001312.
Communication dated Jul. 1, 2016, issued by the United States Patent and Trademark Office in counterpart U.S. Appl. No. 14/618,447.
Communication from United States Patent and Trademark Office dated Jun. 8, 2017, in U.S. Appl. No. 14/618,223.
Communication dated Jul. 10, 2017, from the Japanese Patent Office in counterpart application No. 2016-568774.
Office Action dated Jul. 11, 2017, issued by the Australian Patent Office in counterpart Australian Application No. 2015214697.
Communication from United States Patent and Trademark Office dated Jul. 20, 2017, in U.S. Appl. No. 14/618,447.
Communication dated Sep. 4, 2017, from the European Patent Office in counterpart European Application No. 15746532.9.

(56) References Cited

OTHER PUBLICATIONS

Communication from United States Patent and Trademark Office dated Aug. 31, 2017, in U.S. Appl. No. 14/618,379.
Communication dated Feb. 1, 2017, issued by the United States Patent and Trademark Office in counterpart U.S. Appl. No. 14/618,447.
Communication dated Mar. 22, 2017, issued by the United States Patent and Trademark Office in counterpart U.S. Appl. No. 14/618,379.
Communication issued by the European Patent Office dated Sep. 4, 2017 in counterpart European Patent Office for European Patent Application No. 15746584.0.
Communication issued by the European Patent Office dated Sep. 19, 2017 in counterpart European Patent Application No. 15745916.5.
Communication issued by the European Patent Office dated Oct. 2, 2017 in counterpart European Patent Application No. 15746883.6.
Communication issued by the Russian Patent Office dated Oct. 27, 2017 in counterpart Russian Patent Application No. 2016136345.
Communication issued by the Australian Patent Office dated Nov. 8, 2017 in counterpart Australian Patent Application No. 2015214697.
Communication issued by the United States Patent and Trademark Office dated Nov. 9, 2017 in counterpart U.S. Appl. No. 14/618,223.
Communication dated Dec. 22, 2017, from the European Patent Office in counterpart European Application No. 15746584.0.
Communication from United States Patent and Trademark Office dated Jan. 29, 2018, in U.S. Appl. No. 14/618,223.
Communication from United States Patent and Trademark Office dated Feb. 21, 2018, in U.S. Appl. No. 14/618,447.
Communication dated Jul. 2, 2018, issued by the State Intellectual Property Office of P.R. China in counterpart Chinese Application No. 201580007966.0.
Communication dated Jul. 3, 2018, issued by the State Intellectual Property Office of P.R. China in counterpart Chinese Application No. 201580007942.5.
Communication from United States Patent and Trademark Office dated Apr. 27, 2018, in U.S. Appl. No. 14/618,379.

\* cited by examiner

USER TERMINAL DEVICE AND DISPLAYING METHOD THEREOF

CROSS-REFERENCE TO RELATED APPLICATIONS

This application claims priority from Korean Patent Application No. 10-2014-0083282, filed in the Korean Intellectual Property Office on Jul. 3, 2014, and the benefit of U.S. Provisional Application No. 61/937,744, filed in the United States Patent and Trademark Office on Feb. 10, 2014, the disclosures of which are incorporated herein by reference in their entireties.

BACKGROUND

1. Field

Apparatuses and methods consistent with exemplary embodiments relate to a user terminal device and a displaying method thereof, and more particularly, to a user terminal device where a display may be asymmetrically folded with reference to a folding line so as to expose a part of the display and a displaying method thereof.

2. Description of Related Art

With the development of electronic technology, various types of user terminal devices have been developed and distributed. Recently, the size of such user terminal devices has been minimized while the functions of the devices have become diverse and thus, the demands for user terminal devices have been increasing continuously.

A user terminal device may provide various content, such as multimedia content and application screens according to a user's request. A user may select a desired function using a button or a touch screen provided with a user terminal device. A user terminal device may execute a program selectively according to a user interaction, and display the result of execution.

Meanwhile, as a user terminal device provides more diverse functionality, there are various needs for a method of displaying contents and a user interface method. In other words, as the method of displaying content has changed and the type and function of content have been increasing, the existing interaction methods, such as simply selecting a button or touching a screen, may not be sufficient to perform various functions of a user terminal device.

Particularly, a user terminal device of which the display can be folded with reference to a folding line has been developed in order to minimize the size of the user terminal device. However, when the display is folded symmetrically with reference to the folding line, the display is folded completely and a user may not use or watch the display.

SUMMARY

Aspects of one or more exemplary embodiments relate to a user terminal device that, when a display is folded asymmetrically with reference to a folding line, exposing a part of the display, provides various User Interfaces (UI) through the exposed area, and a displaying method thereof.

According to an aspect of an exemplary embodiment, there is provided a displaying method of a user terminal device including a display which is divided into a first area and a second area by a folding line, the second area being larger than the first area and comprising an exposure area, the method including, detecting at least one of a first user interaction of moving along a long side of the exposure area and a second user interaction of moving along a short side of the exposure area while the display is folded forward along the folding line, and displaying a first function execution screen on the exposure area in response to detecting the first user interaction, and displaying a second function execution screen on the exposure area in response to detecting the second user interaction.

The first user interaction of moving along a long side of the exposure area may be the first user interaction of moving in one direction in parallel with the long side of the exposure area, and the second user interaction of moving along the short side of the exposure area may be the second user interaction of moving perpendicular to the one direction in parallel with a short side of the exposure area.

The application providing the first function execution screen may be the same as the application providing the second function execution screen.

The first user interaction may include a movement in a first direction along the long side of the exposure area movement in a second direction opposite to the first direction along the long side of the exposure area, and the displaying the execution screen of the application providing the first function on the exposure area may include, displaying a third function execution screen in response to detecting movement in the first direction, and displaying a fourth function execution screen on the exposure area in response to detecting movement in the second direction.

The second user interaction may include movement in a third direction along the short side of the exposure area and movement in a fourth direction opposite to the third direction along the short side of the exposure area, and the first function execution screen may include, displaying a fifth function execution screen on the exposure area in response to detecting movement in the third direction, and displaying a sixth function execution screen on the exposure area in response to detecting movement in the fourth direction.

The first function execution screen displays one of a home screen, public information, state information of the user terminal device, and the environment setting user interface of the user terminal device, and the second function execution screen another one of the home screen, public information, state information of the user terminal device, and the environment setting user interface of the user terminal device.

The first function may display image information and a first user interface for requesting one or more of storing the image information, deleting the image information, displaying other information related to the image information, a lower menu and an upper menu, and the second function execution screen displays a second user interface for requesting another one of storing the image information, deleting the image information, displaying other information related to the image information, a lower menu and an upper menu.

The first function execution screen may be a telephone application execution screen for indicating that one of a telephone call request is accepted, the telephone call request is rejected, a telephone number of a counterpart requesting the telephone call is stored in a contact list, and a telephone number of a counterpart requesting the telephone call is stored in a spam list, and the second function execution screen may be another telephone application execution screen for indicating another one of the telephone call request is accepted, the telephone call request is rejected, the telephone number of the counterpart requesting the telephone call is stored in the contact list, and the telephone number of the counterpart requesting the telephone call is stored in the spam list.

The first function execution screen may be a message application execution screen for providing one of a received message, a next message, a previous message, an indication that the message is stored, and an indication that the message is deleted, and the second function execution screen may be a message application execution screen for providing another one of the next message, a previous message, an indication that the message is stored, and an indication that the message is deleted.

The first function execution screen may be a music application execution screen for providing one of playlist information, next song information, previous song information, and other playlist information, and the second function execution screen may be another music application execution screen for providing another one of playlist information, next song information, previous song information, and other playlist information.

The method may further include detecting a third user interaction of touching the exposure area, and displaying a third function execution screen on the exposure area in response to detecting the third user interaction.

According to another exemplary embodiment, there is provided a user terminal device including a display which divided by a folding line into a first area and a second area, the second area being larger than the first area and comprising an exposure area that is exposed while the display is folded along the folding line such that the first area faces the second area, a detector configured to detect at least one of a first user interaction of moving along a long side of the exposure area and a second user interaction of moving along a short side of the exposure area, and a controller configured to display a first function execution screen on the exposure area in response to detecting the first user interaction, and display a second function execution screen on the exposure area in response to detecting the second user interaction.

The first user interaction of moving along the long side of the exposure area may be the first user interaction of moving in one direction in parallel with the long side of the exposure area, and the second user interaction of moving along the short side of the exposure area may be the second user interaction of moving perpendicular to the one direction in parallel with a short side of the exposure area.

The application providing the first function execution screen may be the same as the application providing the second function execution screen.

The first user interaction may include movement in a first direction along a long side of the exposure area and movement in a second direction opposite to the first direction along the long side of the exposure area, and the controller may be configured to control the display to display a third function execution screen on the exposure area in response to detecting movement in the first direction, and may control the display to display a fourth function execution screen on the exposure area in response to detecting movement in the second direction.

The second user interaction may include movement in a third direction along the short side of the exposure area and movement in a fourth user direction opposite to the third direction along the short side of the exposure area, and the controller may be configured to control the display to display a fifth execution screen on the exposure area in response to detecting movement in the third direction, and may control the display to display a sixth function execution screen on the exposure area.

The first function execution screen may display one of a home screen, public information, state information of the user terminal device, and the environment setting user interface of the user terminal device, and the second function execution screen may be another one of execution screens of the home screen, public information, state information of the user terminal device, and the environment setting user interface of the user terminal device.

The first function execution screen may display image information and a first user interface for requesting one or more of storing the image information, deleting the image information, displaying other information related to the image information, a lower menu and an upper menu, and the second function execution screen displays a second user interface for requesting another one of storing the image information, deleting the image information, displaying other information related to the image information, a lower menu and an upper menu.

The first function execution screen may be a telephone application execution screen for indicating that one of a telephone call request is accepted, the telephone call request is rejected, a telephone number of a counterpart requesting the telephone call is stored in a contact list, and a telephone number of a counterpart requesting the telephone call is stored in a spam list, and an the second function execution screen may be another telephone application execution screen for indicating another one of the telephone call request is accepted, the telephone call request is rejected, a telephone number of a counterpart requesting the telephone call is stored in the contact list, and indicating that the telephone number of the counterpart requesting the telephone call is stored in the spam list.

The first function execution screen may be a message application for providing one of a received message, a next message, a previous message, an indication that the message is stored, and an indication that the message is deleted, and the second function execution screen may be another one a next message, a previous message, the indication that the message is stored, and the indication that the message is deleted.

The first function execution screen may be a music application execution screen for providing one of playlist information, next song information, previous song information, and other playlist information, and the second function execution screen may be another music application execution screen for displaying another one of playlist information, next song information, previous song information, and other playlist information.

The detector may be configured to detect a third user interaction of touching the exposure area, and the controller may control the display to display a third function execution screen on the exposure area in response to the third user interaction being detected.

According to still another aspect of an exemplary, a device includes a display configured to fold along a folding line dividing the display into a first area and a second area larger than the first area, the second area comprising an exposure area that is exposed when the display is folded; a detector configured to detect a folding state of the display and a touch interaction on the device; and a controller configured to generate a user interface and control the display to display the generated user interface based on the folding state and the touch interaction.

The controller may be configured to generate and display a lock screen on the exposure area of the display.

The controller may be configured to generate and display a public information user interface on the exposure area of the display.

As described above, according to various exemplary embodiments, a user may perform various functions of a user terminal device through a user interface displayed on the exposure area even when the display is folded, and may be provided with various information.

BRIEF DESCRIPTION OF THE DRAWINGS

The above and/or other aspects of exemplary embodiments will be more apparent from the following description with reference to the accompanying drawings, in which:

FIGS. 8A to 16B are views illustrating exemplary embodiments where a user terminal device performs various functions according to a folding interaction and an unfolding interaction;

DETAILED DESCRIPTION

Specific exemplary embodiments will be described with reference to accompanying drawings and detailed explanation. However, this does not necessarily limit the scope of the exemplary embodiments to a specific form. Instead, modifications, equivalents and replacements included in the disclosed concept and technical scope of this specification may be employed. While describing exemplary embodiments, if a specific description regarding a known technology might obscure the gist of an inventive concept, the specific description may be omitted.

In the present disclosure, relational terms such as first and second, and the like, may be used to distinguish one entity from another entity, without necessarily implying any actual relationship or order between such entities.

The terms used in the following description are provided to explain a specific exemplary embodiment and are not intended to limit the scope of rights. A singular term includes a plural form unless expressly stated otherwise. The terms "include", "comprise", "is configured to", etc., of the description, are used to indicate that there are features, numbers, steps, operations, elements, parts or combinations thereof, and they should not exclude the possibilities of combination or addition of one or more features, numbers, steps, operations, elements, parts or combination thereof.

In an exemplary embodiment, 'a module' or 'a unit' performs at least one function or operation, and may be realized as hardware, software, or a combination thereof. In addition, a plurality of 'modules' or a plurality of 'units' may be integrated into at least one module and may be realized as at least one processor except for 'modules' or 'units' that should be realized in a specific hardware.

Figure 1:
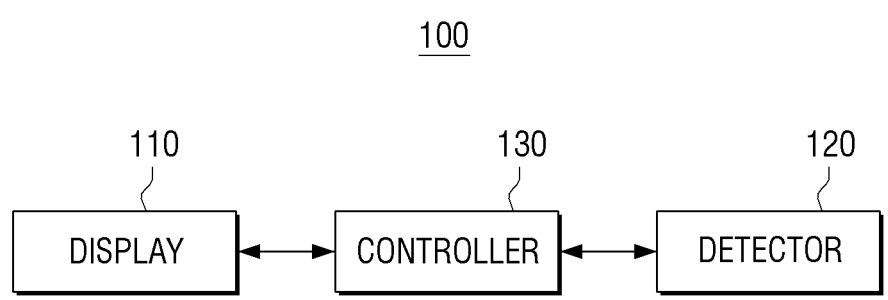
FIG. 1 is a block diagram of a user terminal device according to an exemplary embodiment.

An exemplary embodiment will now be described in detail with reference to the accompanying drawings. FIG. 1 is a block diagram illustrating configuration of a user terminal device 100 according to an exemplary embodiment. As illustrated in FIG. 1, the user terminal device 100 includes a display 110, a detector 120, and a controller 130. The user terminal device 100 may be realized as various types of devices such as TV, monitor, PC, laptop PC, mobile phone, tablet PC, touchscreen, PDA, MP3 player, kiosk, electronic album, table display device, LCD display, LED display, OLED display, camera, watch, wearable device, etc. If a user terminal device is realized as portable device such as mobile phone, tablet PC, PDA, MP3 player, laptop PC, watch, wearable device, etc., the user terminal device may be referred to as a mobile device. Throughout this specification, for convenience and not for any limiting purposes, it may be referred to as a user terminal device.

The display 110 displays various image data and UIs. In particular, the display 110 may be realized as a touch screen as it is combined with a touch detector. In addition, the display 110 may include a folding line so that the display 110 may be folded.

In particular, the display 110 is divided by a folding line to form a first area and a second area which is larger than the first area. If the display is folded such that the first area comes in touch with the second area, the display 110 may display on an exposure area of the second area, the area exposed while the display 110 is folded, at least one of a UI including information regarding the user terminal device 100 and a UI for controlling the user terminal device 100.

The detector 120 detects a user interaction. In particular, the detector 120 may include a touch detector which detects a user's touch interaction. In addition, the detector 120 may include a folding detector which detects a folding interaction of folding the display 110 and an unfolding interaction of unfolding the display 110.

The controller 130 controls overall operations of the user terminal device 100. In particular, the controller 130 may control the detector 120 to detect a first user interaction of moving along a long side of the exposure area or a second user interaction of moving along a short side of the exposure area while the first area and the second area are folded forward to face each other, exposing a part of the second area. If the first user interaction is detected, the controller 130 may control the display 110 to display an execution screen of an application providing a first function on the exposure area and if the second user interaction is detected the controller 130 may control the display 110 to display an execution screen of an application providing a second function.

In particular, if a third user interaction is detected, the controller 130 may control the display 110 to display an execution screen of an application providing a third function on the exposure area, and if a fourth user interaction is detected, may control the display 110 to display an execution screen of an application providing a fourth function.

In addition, if the third user interaction is detected on the exposure area through the detector 120, the controller 130 may control the display 110 to display an execution screen of an application providing the third function on the exposure area.

As described above, according to various exemplary embodiments, a user may perform various functions of a user terminal device and may be provided with various information through a UI displayed on the exposure area even when the display 110 is folded.

Figure 2:
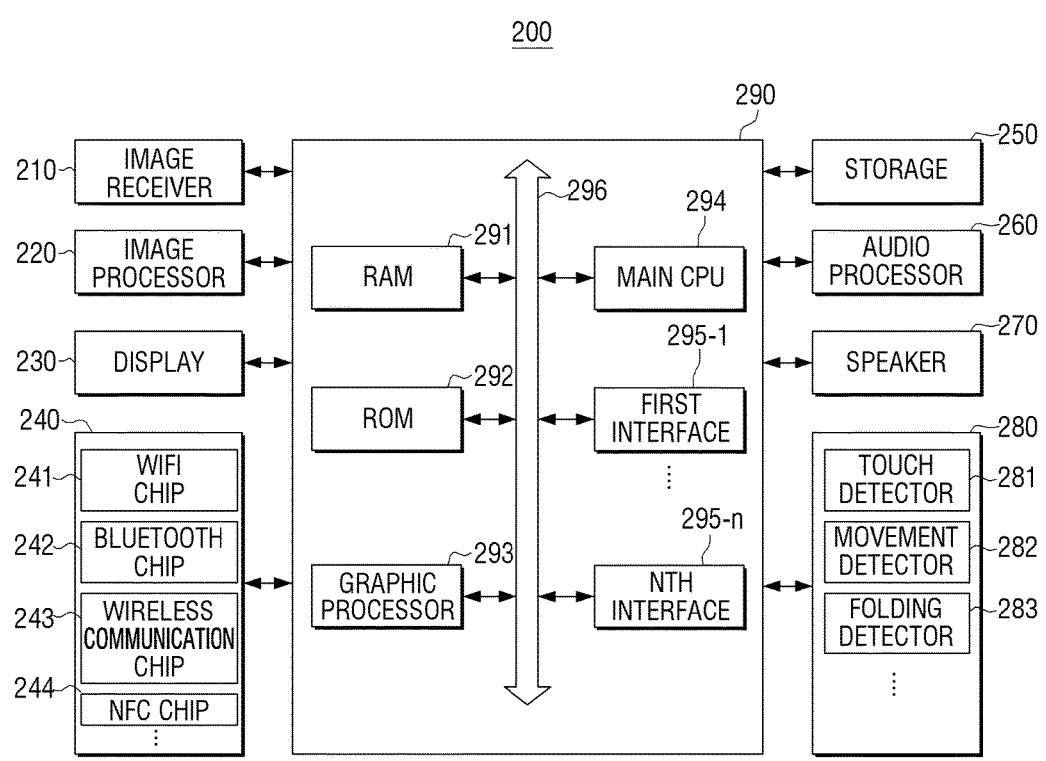
FIG. 2 is a block diagram illustrating a user terminal device according to an exemplary embodiment.

One or more exemplary embodiments will be described in greater detail with reference to FIGS. 2 to 23B. Hereinafter, an exemplary embodiment will be described in greater detail with reference to FIGS. 2 to 23B. FIG. 2 is a block diagram illustrating configuration of a user terminal device 200 in detail according to an exemplary embodiment. As illustrated in FIG. 2, the user terminal device includes an image receiver 210, an image processor 220, a display 230, a communicator 240, a storage 250, an audio processor 260, a speaker 270, a detector 280, and a controller 290.

Meanwhile, FIG. 2 illustrates various components of the user terminal device 200 is an apparatus having various functions, such as content providing function, display function, etc. One or more exemplary embodiments, a part of the components illustrated in FIG. 2 may be omitted or changed, or other components may be further added.

The image receiver 210 receives image data through various sources. For example, the image receiver 210 may receive broadcasting data from an external broadcasting station, VOD data in real time from an external server, or image data from an external apparatus.

The image processor 220 processes image data received from the image receiver 210. The image processor 220 may perform various image processing with respect to image data, such as decoding, scaling, noise filtering, frame rate conversion, resolution conversion, etc.

The display 230 displays at least one of a video frame which is generated as the image processor 220 processes image data received from the image receiver 220 and various screens generated by a graphic processor 293.

Figure 3A:
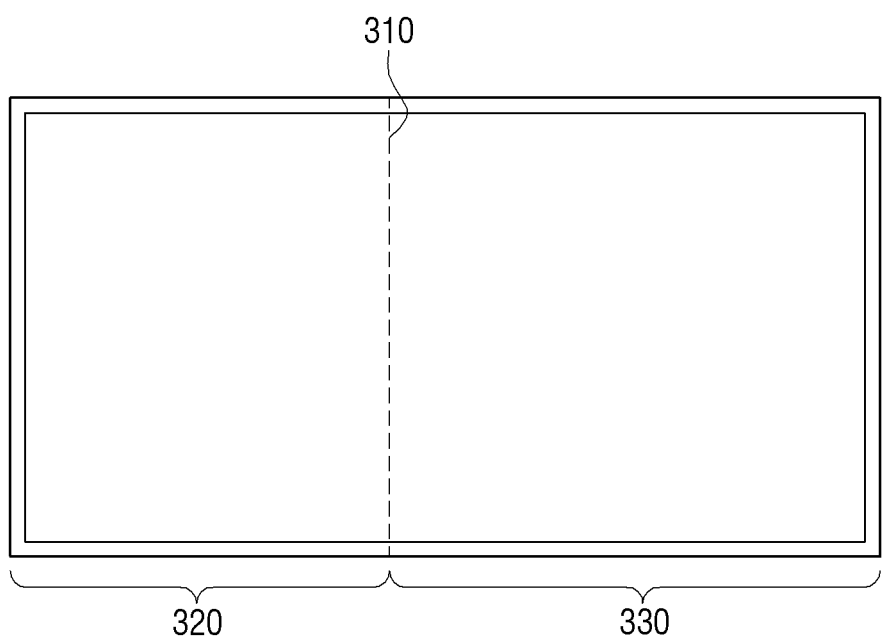
FIGS. 3A to 3E are views illustrating a user terminal device with a rectangular display panel according to an exemplary embodiment.
Figure 3B:
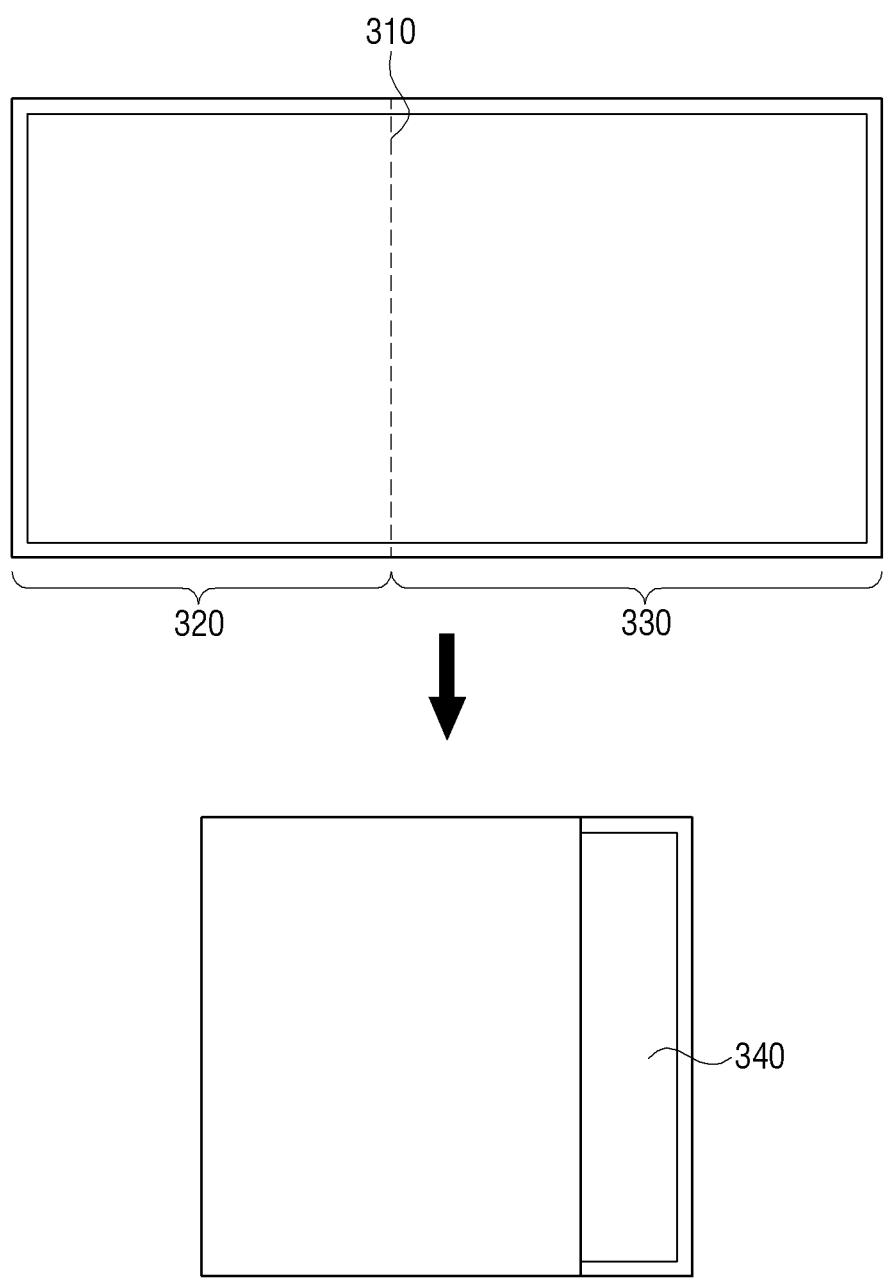
Figure 3C:
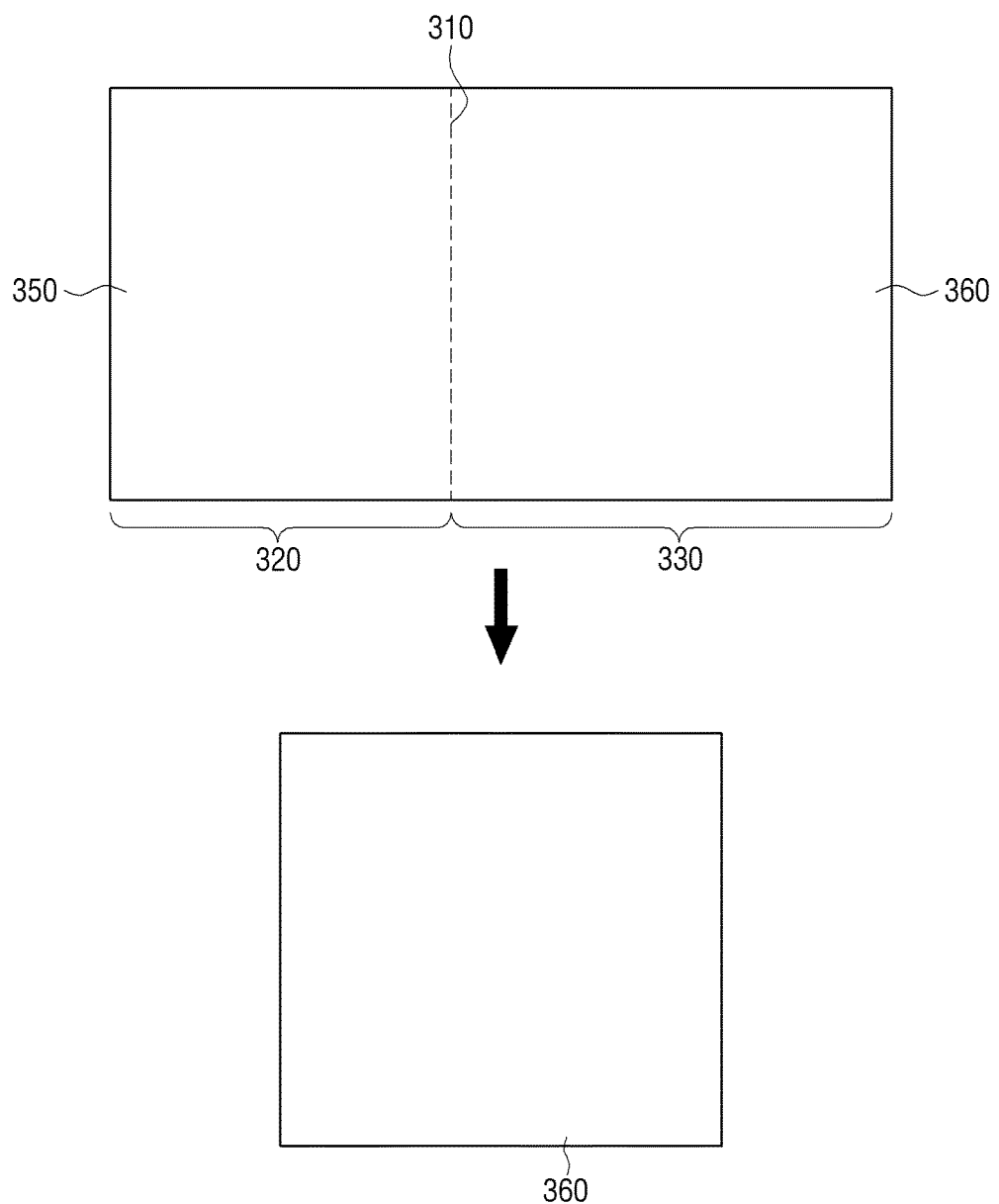

In particular, as illustrated in FIG. 3A, the display 230 may consist of a first area 320 and a second area 330 which is larger than the first area 320 with reference to a folding line 310. As illustrated in FIG. 3B, if the display 230 is folded with reference to the folding line 310, the display 230 may include an exposure area 340 which is the exposed a part of the second area 330. Meanwhile, FIG. 3C is a view illustrating a cover which is on the rear side of the user terminal device 200 when the user terminal device 200 is folded. In other words, the rear side of the user terminal device 200 may include a first cover 350 corresponding to the first area 320 and a second cover 360 corresponding to the second area 330.

Figure 3D:
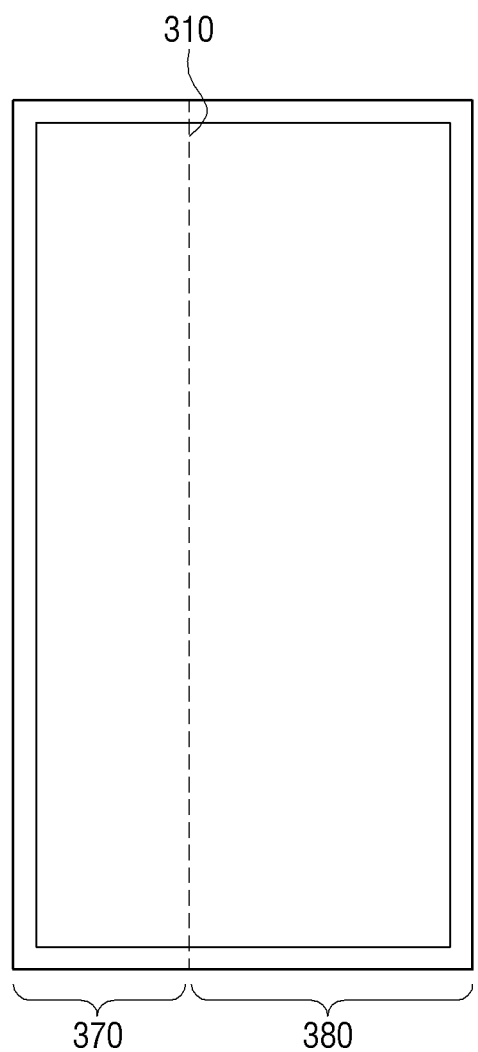
Figure 3E:
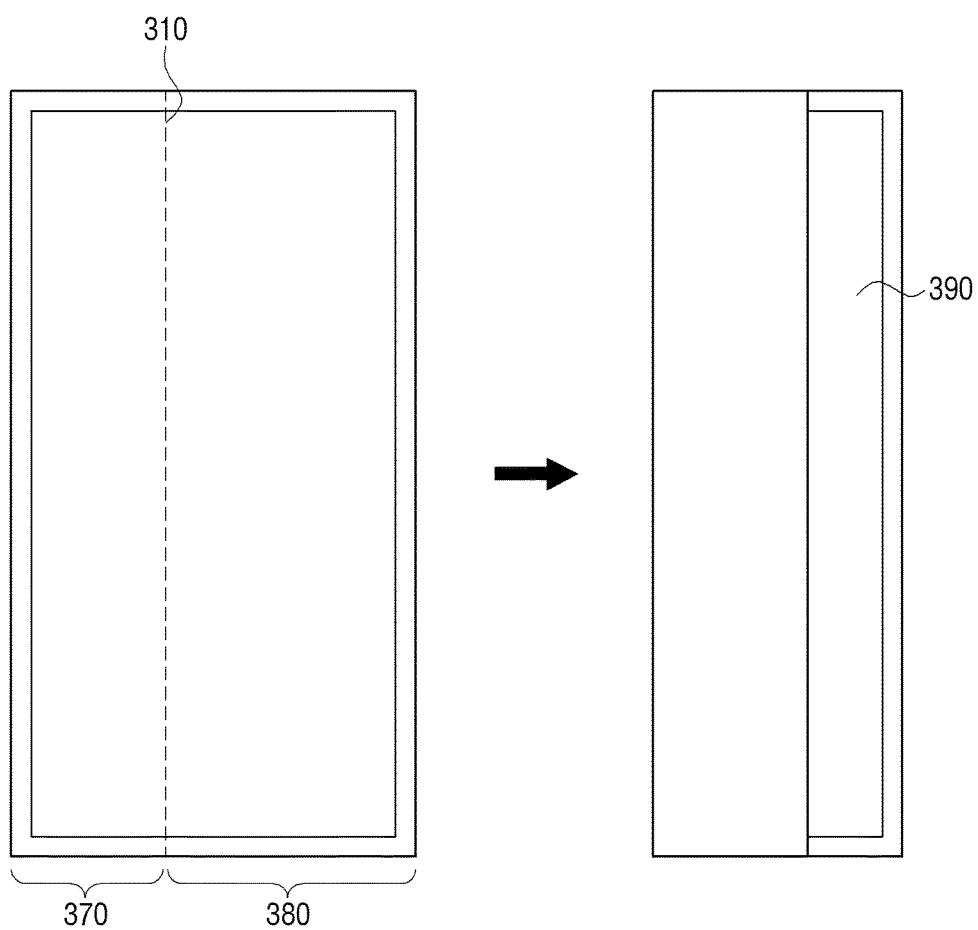

Meanwhile, in the above-described exemplary embodiment, the length of the folding line 310 is in parallel with a short side, but this is only an example. As illustrated in FIG. 3D, the length of the folding line 310 may be in parallel with a long side. In this case, the display 230 may consist of a first area 370 and a second area 380 with reference to the folding line 310. As illustrated in FIG. 3E, if the display 230 is folded with reference to the folding line 310, the display 230 may include an exposure area 390 of the second area 380, which is exposed to outside.

Meanwhile, in the above-exemplary embodiment, the folding line 310 may be a line generated by a physical hinge. In addition, if the display 230 is a flexible display, the folding line 310 may be a line which can be folded by a user.

The communicator 240 performs communication with various types of external apparatuses according to various types of communication methods. The communicator 240 may include a WiFi chip 241, a Bluetooth chip 242, a wireless communication chip 243, and a Near Field Communication (NFC) chip 244. The controller 290 performs communication with various external apparatuses using the communicator 240.

In particular, the WiFi chip 241 and the Bluetooth chip 242 perform communication according to a WiFi method and a Bluetooth method, respectively. In the case of the WiFi chip 241 or the Bluetooth chip 242, various connection information, such as an SSID and a session key may be transmitted/received first for communication connection and then, various information may be transmitted/received. The wireless communication chip 243 represents a chip which performs communication according to various communication standards such as IEEE, Zigbee, $3^{rd}$ Generation (3G), $3^{rd}$ Generation Partnership Project (3GPP), Long Term Evolution (LTE) and so on. The NFC chip 244 represents a chip which operates according to an NFC method which uses 13.56 MHz band among various RF-ID frequency bands such as 135 kHz, 13.56 MHz, 433 MHz, 860~960 MHz, 2.45 GHz, and so on.

Figure 4:
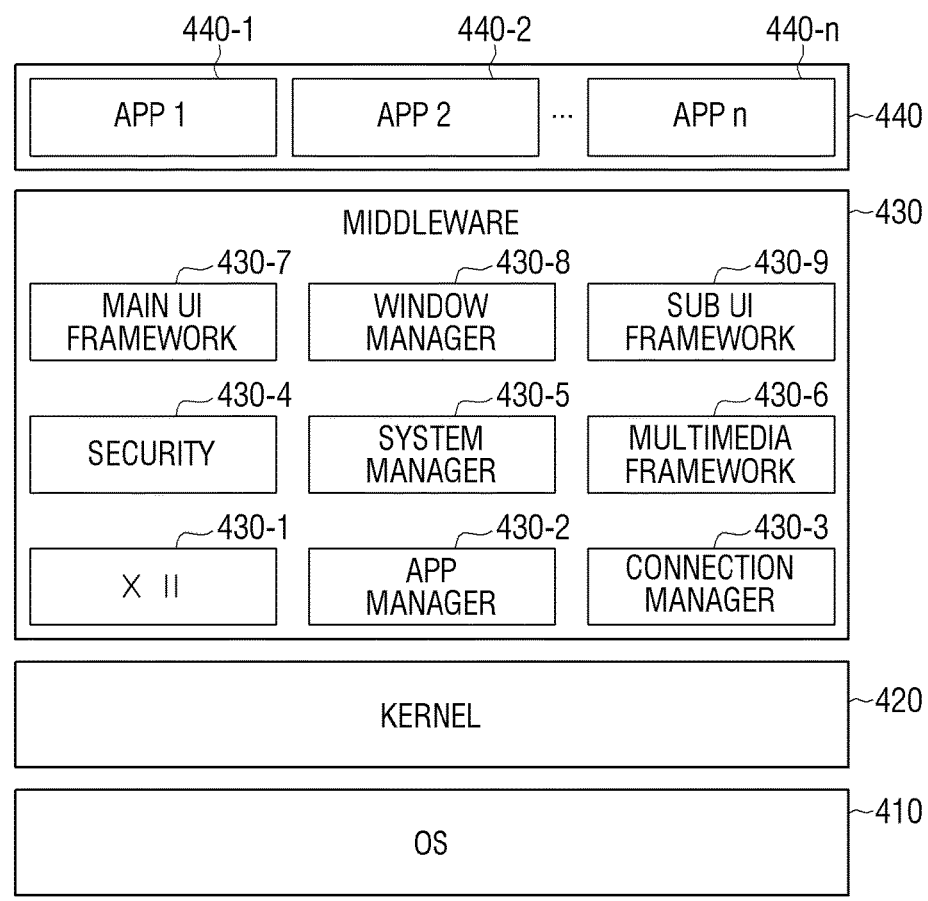
FIG. 4 is a view illustrating a configuration of software stored in a storage according to an exemplary embodiment.

The storage 250 may store various programs and data necessary to operate the user terminal device 200. Specifically, the storage 250 may store programs and data to configure various screens to be displayed on a main area and a sub area. FIG. 4 is a view provided to explain the structure of software stored in the user terminal device 200. According to FIG. 4, the storage 250 may store an Operating System (OS) 410, a kernel 420, middleware 430, an application 440, etc.

The OS 410 controls and manages overall operations of hardware. In other words, the OS 410 manages hardware and is responsible for basic functions such as memory and security.

The kernel 420 serves as a path transmitting various signals detected at the display 230, such as a touch signal, to the middleware 430.

The middleware 430 includes various software modules for controlling the operation of the user terminal device 200. According to FIG. 4, the middleware 430 includes an X11 module 430-1, an APP manager 430-2, a connection manager 430-3, a security module 430-4, a system manager 430-5, a multimedia framework 430-6, a UI framework 430-7, a window manager 430-8, and a writing recognition module 430-9.

The X11 module 430-1 receives various event signals from various hardware provided in the user terminal device 200. Herein, the event may vary, ranging from an event of setting of a system alarm, an event of executing or terminating a specific program, etc.

The APP manager 430-2 manages the execution state of various applications 440 which are installed in the storage 250. When an application execution event is detected from the X11 module 430-1, the APP manager 430-2 calls and executes an application corresponding to the event.

The connection manager 430-3 supports wired or wireless network connection. The connection manager 430-3 may include various detailed modules such as a DNET module, a UPnP module, etc.

The security module 430-4 supports certification, permission, secure storage, etc., with respect to hardware.

The system manager 430-5 monitors the state of each element of the user terminal device 200, and provides the monitoring result to other modules. For example, if there is not enough battery left, an error occurs, or connection is cut off, the system manager 430-5 may provide the monitoring result to a main UI framework 430-7 or a sub UI framework 430-9 and output an alarm message or an alarm sound.

The multimedia framework 430-6 may be stored in the user terminal device 200, or may reproduce multimedia content provided from an external source. The multimedia framework 430-6 may include a player module, a camcorder module, a sound processing module, etc. Accordingly, the multimedia framework 430-6 may reproduce various multimedia content, and generate and reproduce screens and sounds.

The main UI framework 430-7 provides various UIs to be displayed on a main area of the display 230, and the sub UI framework 430-9 provides various UIs to be displayed on a sub area. The main UI framework 430-7 and the sub UI framework 430-9 may include an image composite module to configure various objects, a coordinates composite module to calculate a coordinates where an object is to be displayed, a rendering module to render the configured object on the calculated coordinates, a 2D/3D UI toolkit to provide a tool for configuring a UI in 2D or 3D form, etc. The main UI framework 430-7 and the sub UI framework 430-9 may include an image composite module to configure various objects, a coordinates composite module to calculate a coordinates where an object is to be displayed, a rendering module to render the configured object on the calculated coordinates, a 2D/3D UI toolkit to provide a tool for configuring a UI in 2D or 3D form, etc.

The window manager 430-8 may detect a touch event using a user's body part or pen or other input events. When such an event is detected, the window manager 430-8 transmits an event signal to the main UI framework 430-7 or the sub UI framework 430-9 so that an operation corresponding to the event is performed.

In addition, if a user touches and drags a screen, various program modules such as a writing module for drawing a line according to a drag trace and an angle calculation module for calculating a pitch angle, a roll angle, a yaw angle, etc. based on a sensor value sensed by a movement detector 282 may be stored.

The application module 440 includes applications 440-1-440-n for supporting various functions. For example, program modules for providing various services, such as a navigation program module, a game module, an electronic book module, a calendar module, an alarm management module, a music module, an electronic banking module, a stock module, a calculator module, an electronic mail module, a spreadsheet module, a word processor module, etc. may be included. Such applications may be set as default or may be set temporarily by a user when necessary. If an object is selected, the main CPU 294 may execute an application corresponding to the selected object using the application module 440.

The software structure displayed in FIG. 4 is only an example and thus, an exemplary embodiment is not necessarily limited thereto. Thus, part of the structure may be omitted or changed, or new structure may be added, if necessary. For example, the storage 250 may additionally provide various programs such as a sensing module for analyzing signals sensed by various sensors, a messaging module including a messenger program, a Short Message Service (SMS) & Multimedia Message Service (MMS) program, an e-mail program, etc., a call info aggregator program module, a VoIP module, a web browser module, etc.

Referring back to FIG. 2, the audio processor 260 processes audio data of image content. The audio processor 260 may perform various processing such as decoding, amplification, noise filtering, compression, equalization, noise cancellation, echo or reverb removal or addition, etc. with respect to audio data. The audio data processed by the audio processor 260 may be output to the audio output unit 270 (e.g., audio outputter).

The audio output unit 270 outputs not only various audio data which is processed in many ways such as decoding, amplification, and noise filtering by the audio processor 260 but also various alarm sounds or voice messages. In particular, the audio output unit 270 may be realized as a speaker, but this is only an example. The audio output unit 270 may be realized as an output terminal which may output audio data.

The detector 280 detects various user interactions. In particular, the detector 280 may include a touch detector 281, a movement detector 282, and a folding detector 283, as illustrated in FIG. 2.

Specifically, the touch detector 281 may detect a user's touch interaction using a touch panel attached to the rear side of a display panel. The movement detector 282 may detect a movement (for example, a rotation movement, a vertical movement, a horizontal movement, etc.) of the user terminal device 100 using at least one of an accelerator sensor, a geomagnetic sensor, and a gyro sensor. The folding detector 283 may detect at least one of whether the user terminal device 200 is folded with reference to the folding line 310 and the angle at which the terminal device 200 is folded using a bending sensor (for example, a light sensor, a fiber optic sensor, a conductive ink-based sensor, a conductive fabric sensor, etc.).

Meanwhile, the touch detector 281 might activate only a touch sensor disposed on the exposure area while the display 230 is folded, and inactivate a touch sensor disposed on the other areas.

The controller 290 controls overall operations of the user terminal device 200 using various programs stored in the storage 250.

As illustrated in FIG. 2, the controller 290 includes a RAM 291, a ROM 292, a graphic processor 293, a main CPU 294, a first to an nth interface 295-1~295-n, and a bus 296. In this case, the RAM 291, the ROM 292, the graphic processor 293, the main CPU 294, the first to the nth interface 295-1~295-n, etc. may be interconnected through the bus 296.

The ROM 292 stores a set of commands for system booting. If a turn-on command is input and thus, power is supplied, the main CPU 294 copies O/S stored in the storage 250 in the RAM 291 according to a command stored in the ROM 292, and boots a system by executing the O/S. When the booting is completed, the main CPU 294 copies various application programs stored in the storage 250 to the RAM 291, and executes the application programs copied in the RAM 291 to perform various operations.

The graphic processor 293 generates a screen including various objects such as an icon, an image, a text, etc. using a computing unit (e.g., computer) and a rendering unit (e.g., renderer). The computing unit computes property values such as coordinates, shape, size, and color of each object to be displayed according to the layout of the screen using a control command received from the detector 280. The rendering unit generates a screen with various layouts including objects based on the property values computed by the computing unit. The screen generated by the rendering unit is displayed in a display area of the display 230.

The main CPU 294 accesses the storage 250, and performs booting using the O/S stored in the storage 250. The main CPU 294 performs various operations using various programs, content, data, etc. stored in the storage 250.

The first to the nth interface 295-1~295-n are connected to the above-described various elements. One of the above interface may be a network interface which is connected to an external apparatus via network.

In particular, the controller 290 may provide various functions using an exposure area which is exposed to the outside when the display 110 is folded.

A UI Provided on the Exposure Area

If the display 230 is folded with reference to the folding line 310 such that the first area 320 and the second area 330 come in contact with each other, the controller 290 may control the display 230 to display a predetermined UI on the exposure area 340 of the second area 320, which is exposed to the outside. In this case, the predetermined UI may include at least one of a UI including the state information of the user terminal device 200 and a UI for controlling the user terminal device 200.

Figure 5A:
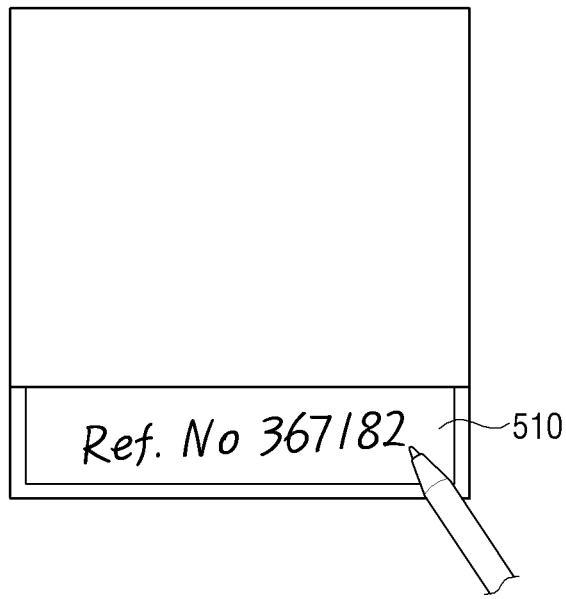
FIGS. 5A to 7B are views illustrating a UI displayed on an exposure area according to various exemplary embodiments.

In an exemplary embodiment, if a folding interaction of folding the display 230 with reference to the folding line 310 such that the first area 320 and the second area 330 come in contact with each other is detected, the controller 290 may control the display 230 to display a UI 510 providing a memo function on the exposure area as illustrated in FIG. 5A. In this case, if a user input, such as a finger, pen or stylus, is detected through the UI 510 which provides a memo function, the controller 290 may control the display 230 to display an image according to the user input.

Figure 5B:
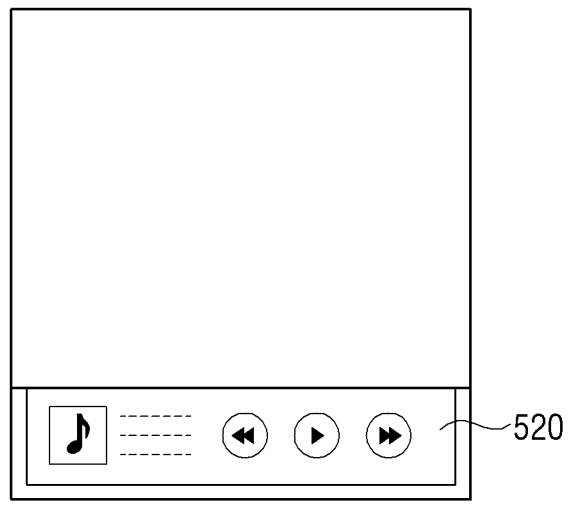

In addition, the controller 290 may control the display 230 to display a UI for controlling a specific application on the exposure area. Specifically, if a folding interaction of folding the display 230 with reference to the folding line 310 such that the first area 320 and the second area 330 come in contact with each other is detected while a specific application is executed, the controller 290 may control the display 230 to display a UI for controlling the specific application on the exposure area. For example, as shown in FIG. 5B, if a folding interaction of folding the display 230 with reference to the folding line 310 such that the first area 320 and the second area 330 come in contact with each other is detected while a music application is executed, the controller 290 may control the display 230 to display a UI 520 for controlling the music application on the exposure area. In this case, the UI 520 for controlling a music application may include information regarding currently-played music, a play/stop icon, a skip icon, a rewind icon, a next song, a past song, thumbs up, thumbs down, etc.

Figure 5C:
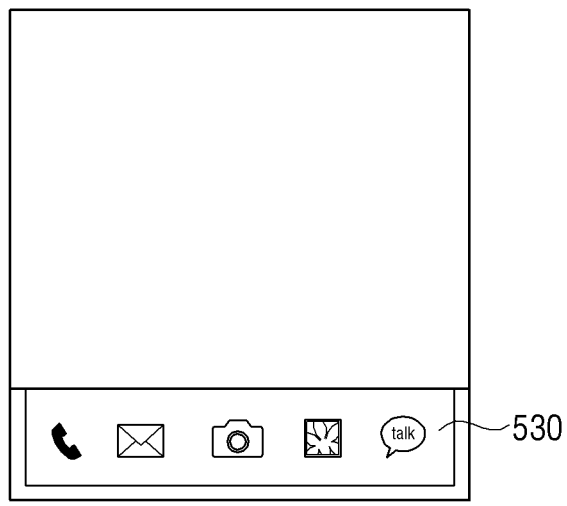

In addition, the controller 290 may control the display 230 to display a UI including a hot key icon for checking the current state of the user terminal device 200 on the exposure area. For example, if a predetermined user interaction (for example, an interaction of touching or tapping the exposure area twice in a row) is detected while the display 230 is folded, the controller 290 may control the display 230 to display a UI 530 including a hot key icon for checking the current state of the user terminal device 200 on the exposure area as illustrated in FIG. 5C. In this case, the hot key icon for checking the current state of the user terminal device 200 may include a hot key icon for checking a battery state, a hot key icon for checking a network state, a hot key icon for checking display brightness setting, etc.

Figure 5D:
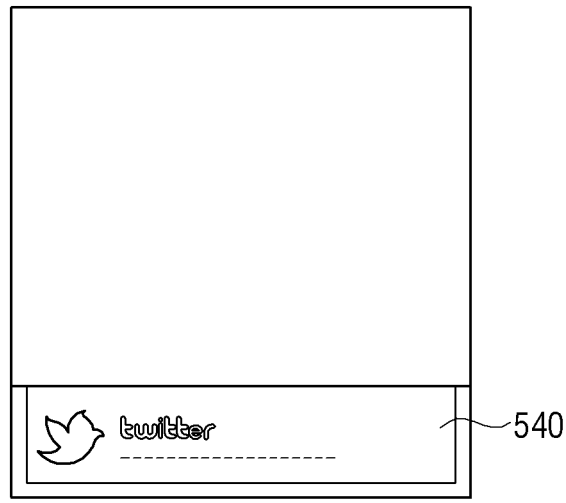

In addition, the controller 290 may control the display 230 to display a UI informing that a message or data is received from the outside on the exposure area. For example, if a social network message (SNS) message is received from the outside through the communicator 240 while the display 230 is folded, the controller 290 may control the display 230 to display a UI 540 informing that the SNS message is received on the exposure area as illustrated in FIG. 5D. In this case, the UI 540 informing that an SNS message is received may include at least one of information regarding a sender and information regarding the SNS message.

Further, the controller 290 may control the display 230 to display various types of UIs for releasing a lock state of the user terminal device 200 on the exposure area.

Figure 6A:
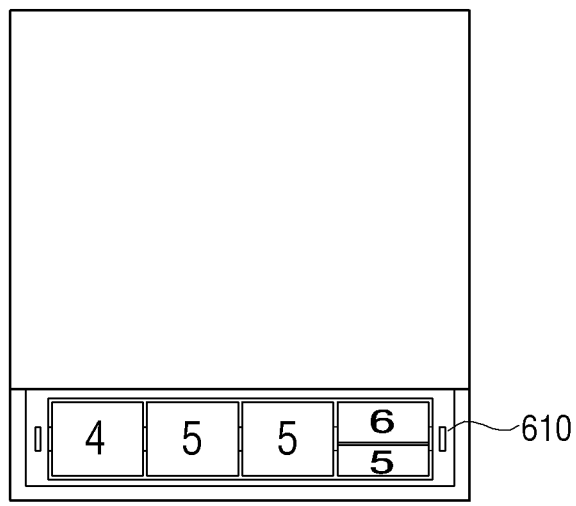

Specifically, as illustrated in FIG. 6A, the controller 290 may control the display 230 to display a UI 610 for inputting a pin number to release the lock state of the user terminal device 200 on the exposure area. In this case, the UI 610 for inputting a pin number may change the pin number by a touch interaction of swiping up and down. If a predetermined pin number is input on the UI 610 displayed on the exposure area, the controller 290 may release the lock state of the user terminal device 200. Additionally, the user may set the pin number through user input.

Figure 6B:
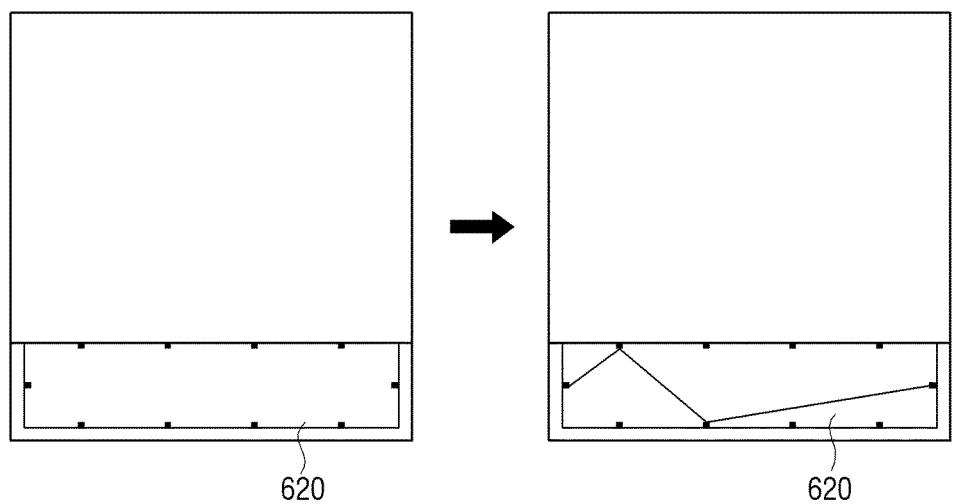

In addition, as illustrated in FIG. 6B, the controller 290 may control the display 230 to display a UI 620 including a plurality of dots on a corner of the exposure area to release the lock state of the user terminal device 200 on the exposure area. In this case, if a touch interaction of connecting dots in a predetermined pattern is detected on the UI 620, the controller 290 may release the lock state of the user terminal device 200. Additionally, the user may set the pattern through user input.

Figure 6C:
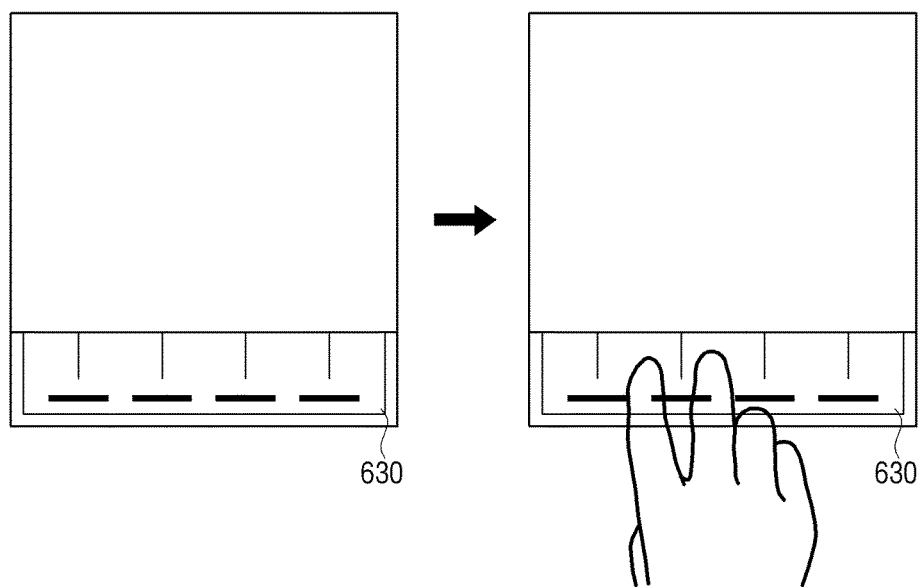

As illustrated in FIG. 6C, the controller 290 may control the display 230 to display a UI 630 in the form of a keyboard, e.g., a piano, to release the lock state of the user terminal device 200 on the exposure area. In this case, if a touch interaction of touching the keyboard in a predetermined rhythm is detected on the UI 630, the controller may release the lock state of the user terminal device 200. Additionally, the user may set the rhythm through user input.

Figure 6D:
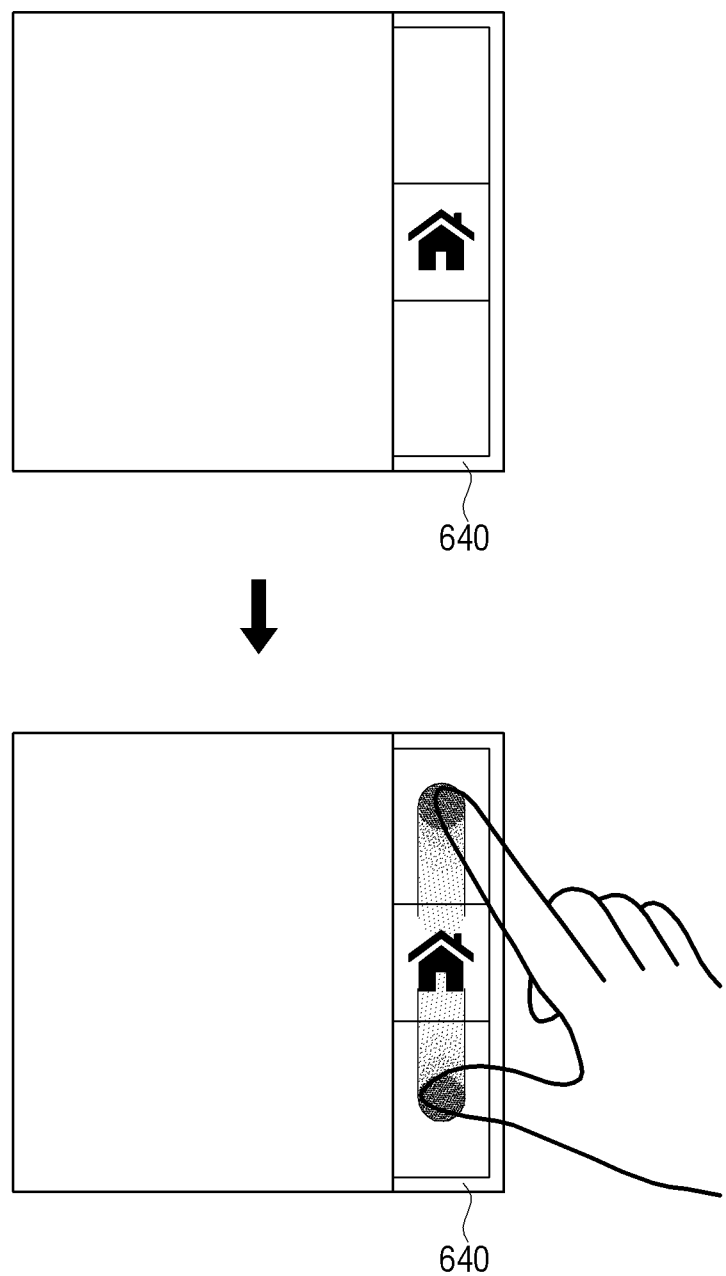

In addition, as illustrated in FIG. 6D, the controller 290 may control the display 230 to display a UI 640 including a home icon to release the lock state of the user terminal device on the exposure area. In this case, if a touch interaction of pinching out with reference to the home icon included in the UI 640 is detected, the controller 290 may release the lock state of the user terminal device 200.

The controller 290 may control the display 230 to display a UI for changing the setting of the user terminal device 200 illustrated in FIG. 2 on the exposure area.

Figure 7A:
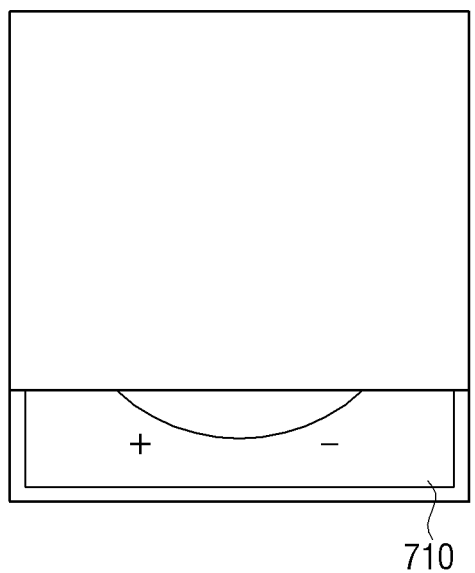

Specifically, as illustrated in FIG. 7A, the controller 290 may control the display 230 to display a UI 710 in the form of an arc for adjusting the volume of the user terminal device 200. Meanwhile, in the above exemplary embodiment, the UI displayed on the exposure area adjusts the volume, but this is only an example. A UI for adjusting another setting of the user terminal device 200 (for example, display brightness, etc.) may be displayed.

Figure 7B:
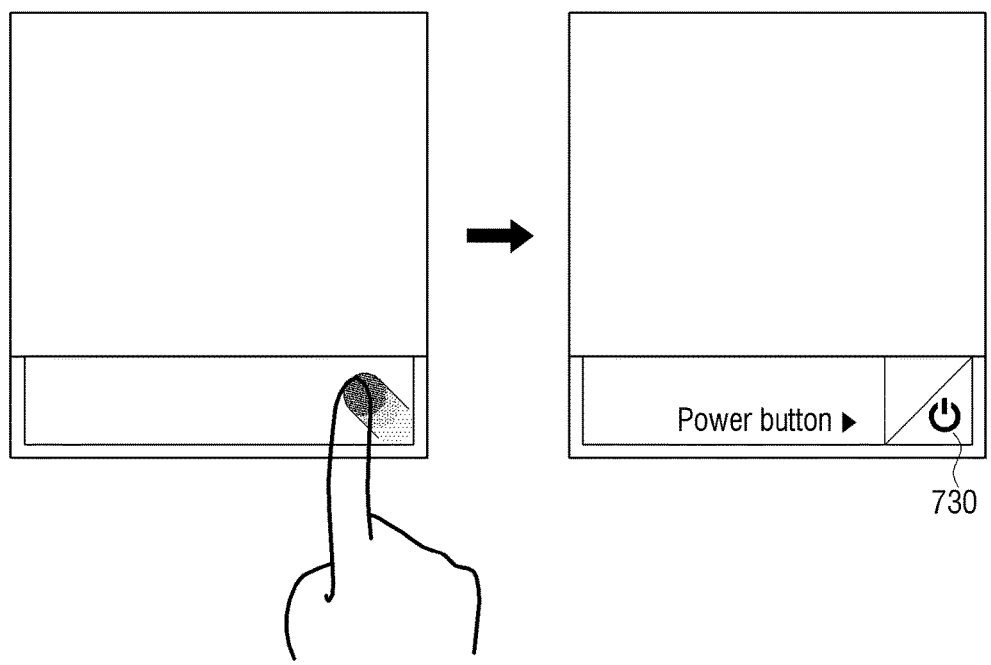

In addition, as illustrated in FIG. 7B, if a touch interaction of dragging one of a plurality of vertexes included in the exposure area in a diagonal direction is detected, the controller 290 may control the display 230 to display a UI 730 for turning off the power of the user terminal device 200 at the corner area corresponding to the vertex where the touch interaction is detected.

A Folding Interaction and an Unfolding Interaction

If a plurality of icons are displayed on the exposure area while the display 230 is folded, and an unfolding interaction of unfolding the display 230 while one of the plurality of icons is touched, the controller 290 may control the display 230 to display a screen corresponding to the touched icon on full screen.

Figure 8A:
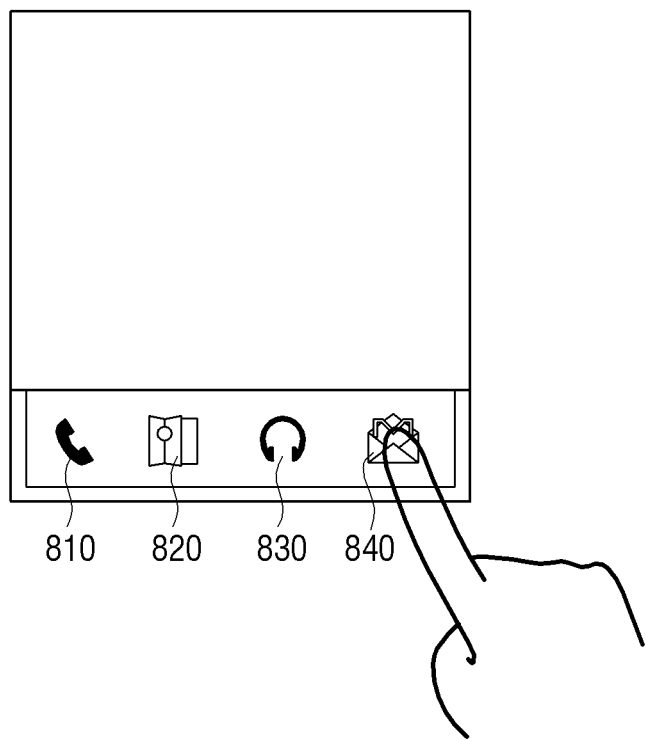

Specifically, as illustrated in FIG. 8A, the display 230 displays first to fourth icons 810 to 840 while the display 230 is folded. If an unfolding interaction of unfolding the display 230 is detected while the fourth icon 840 out of the first to the fourth icon 810 to 840 is touched, the controller 290 may control the display 230 to display a message window 850 corresponding to the fourth icon 840, as illustrated in FIG. 8B.

Meanwhile, in the above exemplary embodiment, an unfolding interaction is detected while the fourth icon 840 is touched, but this is only an example. If an unfolding interaction is detected while another icon is touched, a screen corresponding to the other-touched icon may be displayed on the full screen of the display 230. For example, if an unfolding interaction is detected while the first icon 810 is touched, the controller 290 may control the display 230 to display a full screen execution screen of a call application corresponding to the first icon 810 (for example, a recent call list screen, an address book screen, a call sending screen, etc.). In addition, if an unfolding interaction is detected while the second icon 820 is touched, the controller 290 may control the display 230 to display a web browser screen corresponding to the second icon 820 on full screen. If an unfolding interaction is detected while the third icon 830 is touched, the controller 290 may control the display 230 to display a full screen execution screen of a music application corresponding to the third icon 830 (for example, a music play screen, a music list screen, etc.).

In addition, if the exposure area is touched while the display 230 is folded and then, an unfolding interaction of unfolding a hinge angle of the display 230 as much as a predetermined angle is detected, the controller 290 may control the display 230 to display a screen for executing a specific function.

Figure 9A:
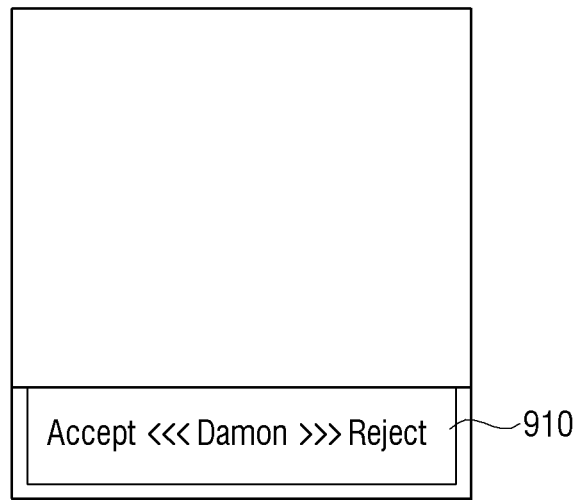
Figure 9B:
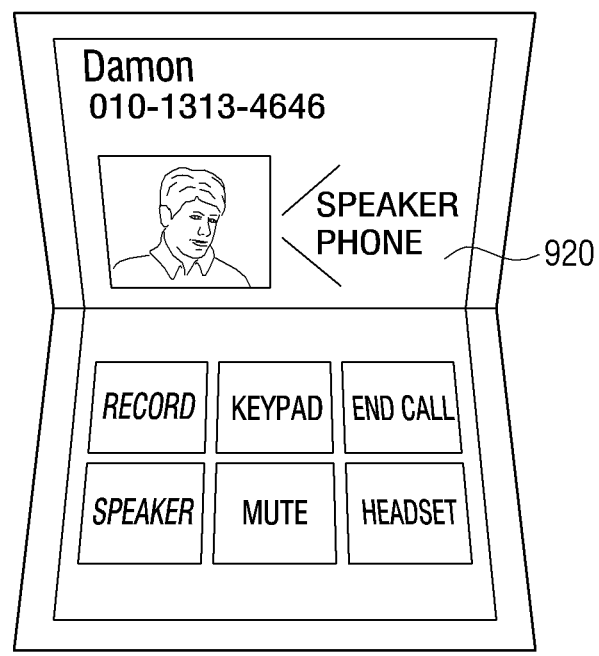

Specifically, if a call request is received while the display 230 is folded, the controller 290 may control the display 230 to display a UI 910 informing that a call request is received on the exposure area, as illustrated in FIG. 9A. If an unfolding interaction of unfolding a hinge angle of the display 230 as much as a predetermined angle (for example, 70° to 120°) is detected while the UI 910 informing that a call request is received is touched, the controller 290 may accept the call request, execute a speaker phone function, and control the display 230 to display an execution screen 920 including various icons as illustrated in FIG. 9B.

Figure 10A:
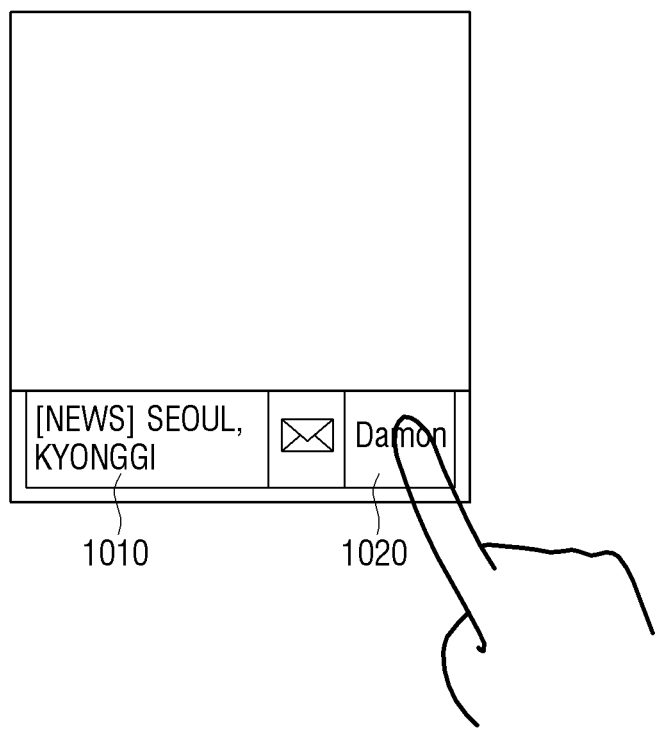
Figure 10B:
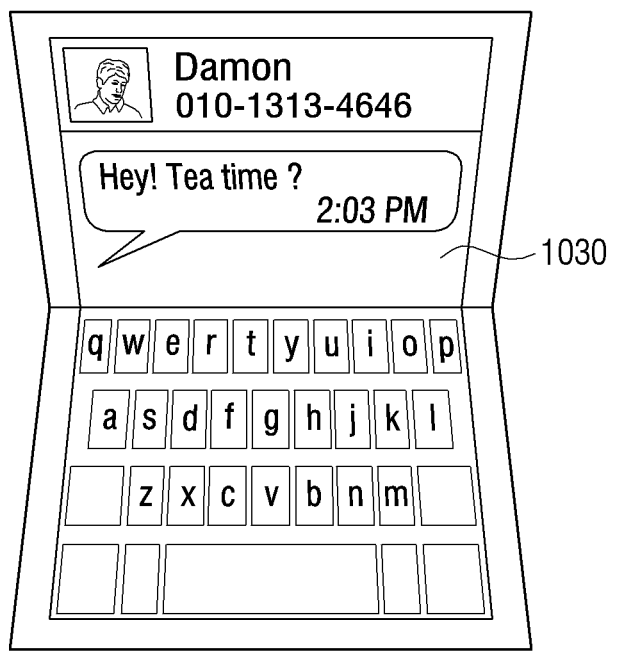

Specifically, if a message is received from outside while news information 1010 is displayed at the same as the display 230 is folded, the controller 290 may control the display 230 to display a UI 1020 informing that the message is received along with the news information 1010 on the exposure area as illustrated in FIG. 10A. If an unfolding interaction of unfolding a hinge angle of the display 230 as much as a predetermined angle (for example, 70° to 120°) is detected while the UI 1020 informing that a message is received is touched, the controller 290 may control the display 230 to display a message window 1030 for writing a reply to the received message as illustrated in FIG. 10B.

In addition, the controller 290 may control the display 230 to display different screens when the exposure area is touched and then, an unfolding interaction is detected and when an unfolding interaction is detected.

Figure 11A:
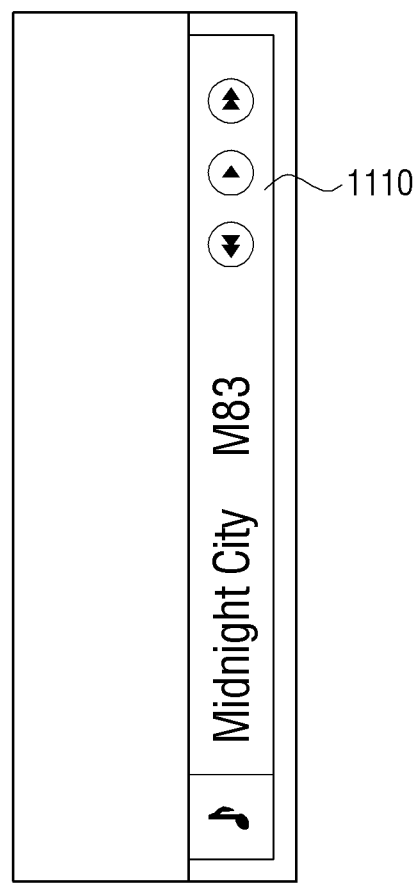

Specifically, the controller 290 may control the display 230 to display a UI 1110 corresponding to a music application on the exposure area as illustrated in FIG. 11A.

Figure 11B:
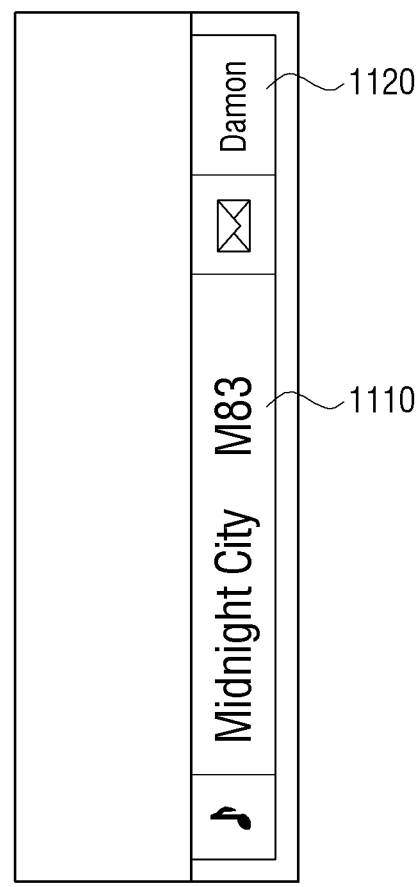

If a message is received from outside while the UI 1110 corresponding to a music application is displayed on the exposure area, the controller 290 may control the display 230 to display a UI 1120 informing that the message is received along with the music application UI 1110 on the exposure area as illustrated in FIG. 11B.

Figure 11C:
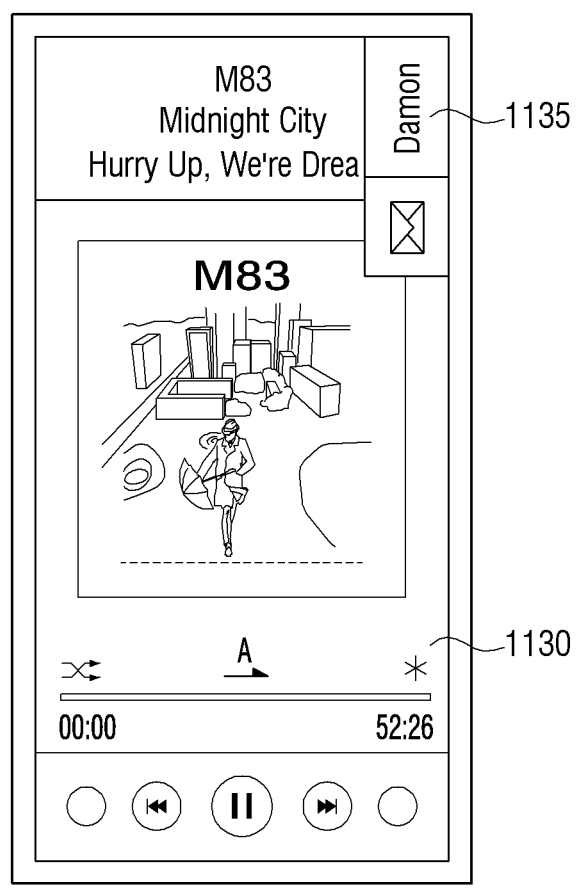

In this case, if an unfolding interaction of unfolding the display 230 is detected while the exposure area is not touched, the controller 290 may control the display 230 to display an execution screen 1130 of the existing music application as illustrated in FIG. 11C. In this case, a UI 1135 informing that a message is received may be displayed on one area of the execution screen 1130 of the music application for a predetermined time.

Figure 11D:
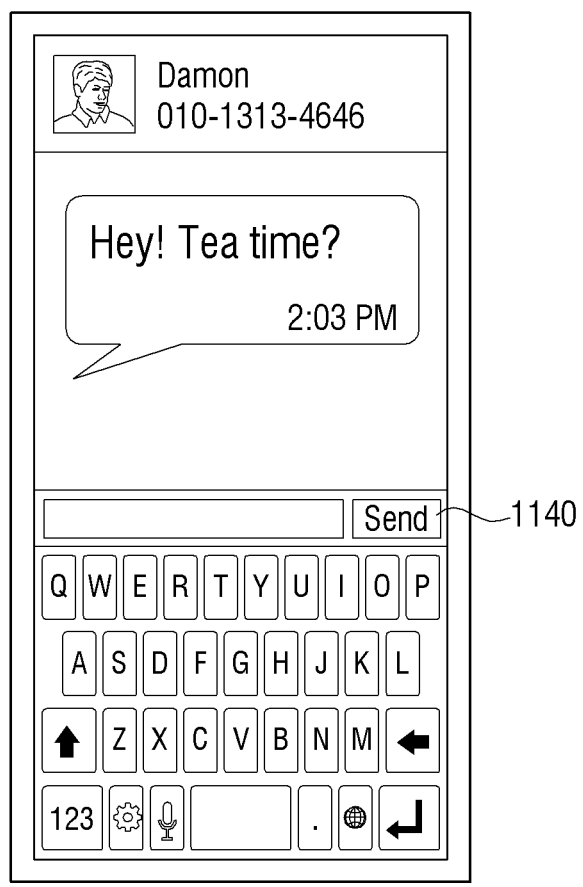

However, if an unfolding interaction of unfolding the display 230 is detected while the UI 1120 informing that a message is received is displayed on the exposure area, the controller 290 may control the display 230 to display a message window 1140 for writing a reply to the received message as illustrated in FIG. 11D.

In addition, the controller 290 may control the display 230 to display different screens in the order of detecting an unfolding interaction and a touch interaction for lock-releasing.

Figure 12A:
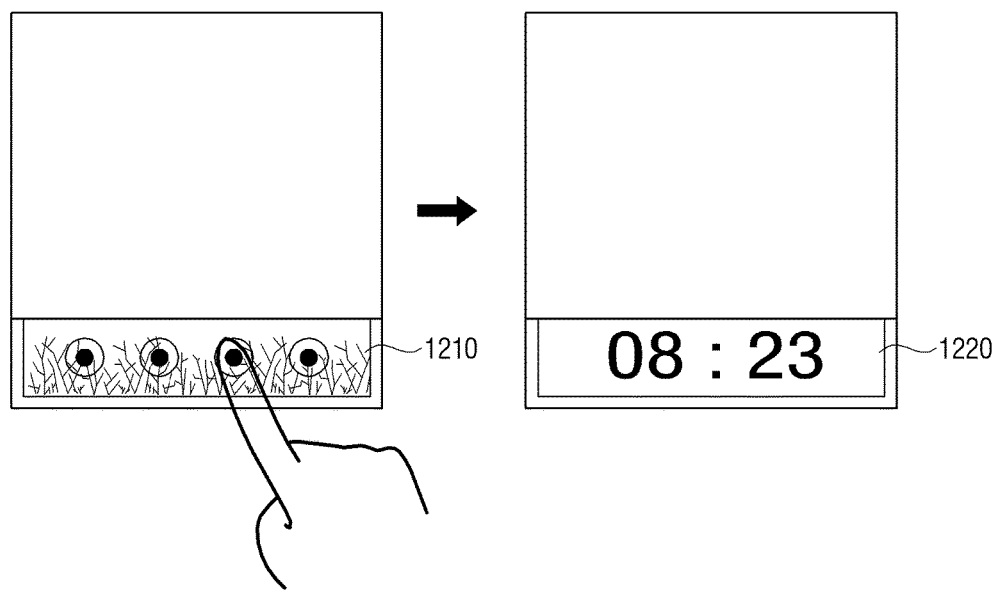

Specifically, as illustrated in the left side of FIG. 12A, if a touch interaction for lock-releasing is detected while a UI 1210 for releasing the lock of the user terminal device 200 is displayed on the exposure area, the controller 290 may release the lock state of the user terminal device 200, and as illustrated in the right side of FIG. 12A, may control the display 230 to display a first home screen 1220 including time information on the exposure area.

Figure 12B:
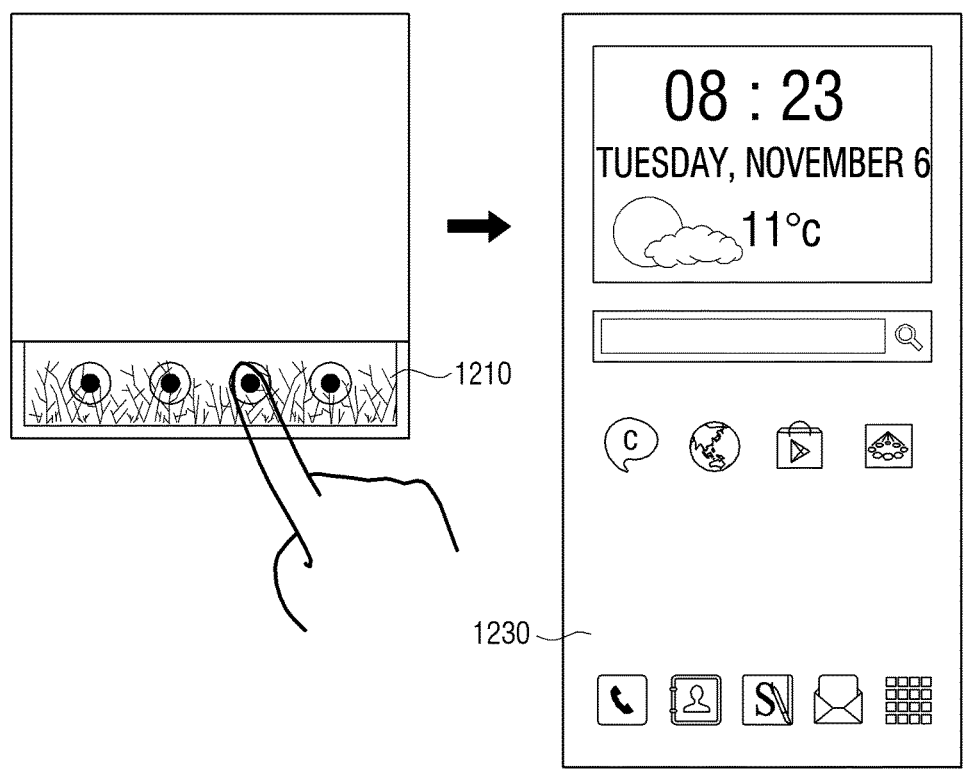

In addition, as illustrated in the left side of FIG. 12B, if a touch interaction for lock-releasing is detected while the UI 1210 for releasing the lock of the user terminal device 200 is displayed on the exposure area, and an unfolding interaction is detected, the controller 290 may release the lock state of the user terminal device 200, and as illustrated in the right side of FIG. 12B, may control the display 230 to display a second home screen 1230 on full screen.

Figure 12C:
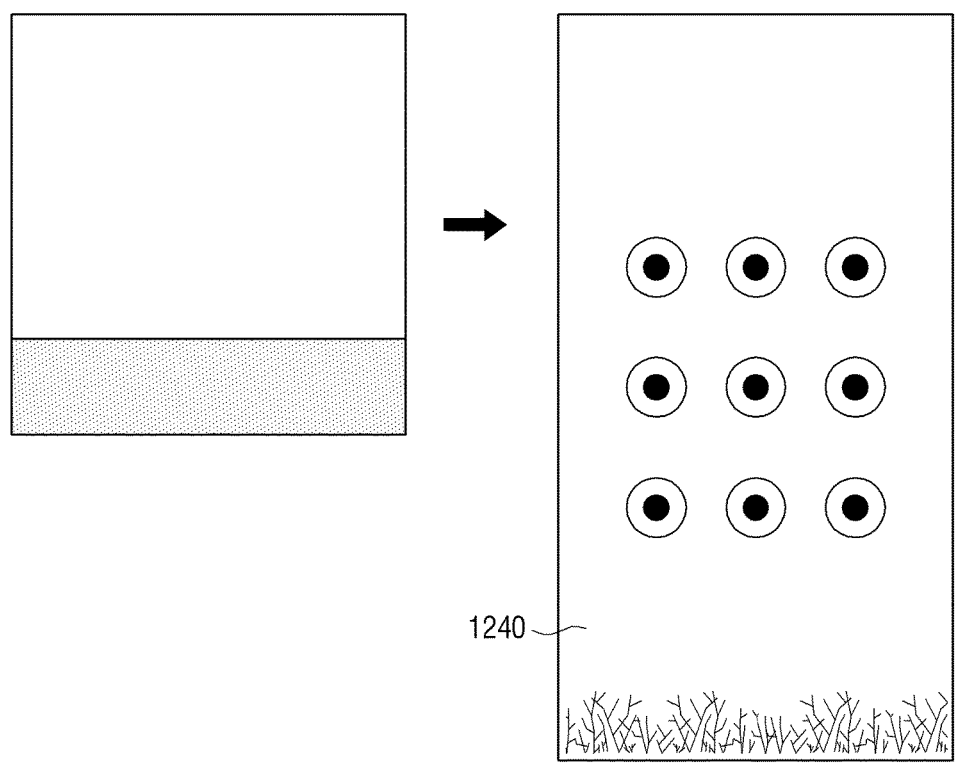

As illustrated in the left side of FIG. 12C, if an unfolding interaction is detected while an image is not displayed on the exposure area, the controller 290 may control the display 230 to display a UI 1240 for releasing the lock of the user terminal device on full screen as illustrated in the right side of FIG. 12C. If a touch interaction for lock-releasing is detected on the UI 1240 for releasing the lock of the user terminal device 200, which is displayed on full screen, the controller 290 may release the lock state of the user terminal device 200, and as illustrated in the right side of FIG. 12B, may control the display 230 to display the second home screen 1230 on full screen.

In addition, the controller 290 may control the display 230 to display a distinctive screen which is displayed only when an unfolding interaction is detected while a UI corresponding to a specific application is displayed on the exposure area and a screen which is displayed when an unfolding interaction is detected after the exposure area is touched.

Figure 13A:
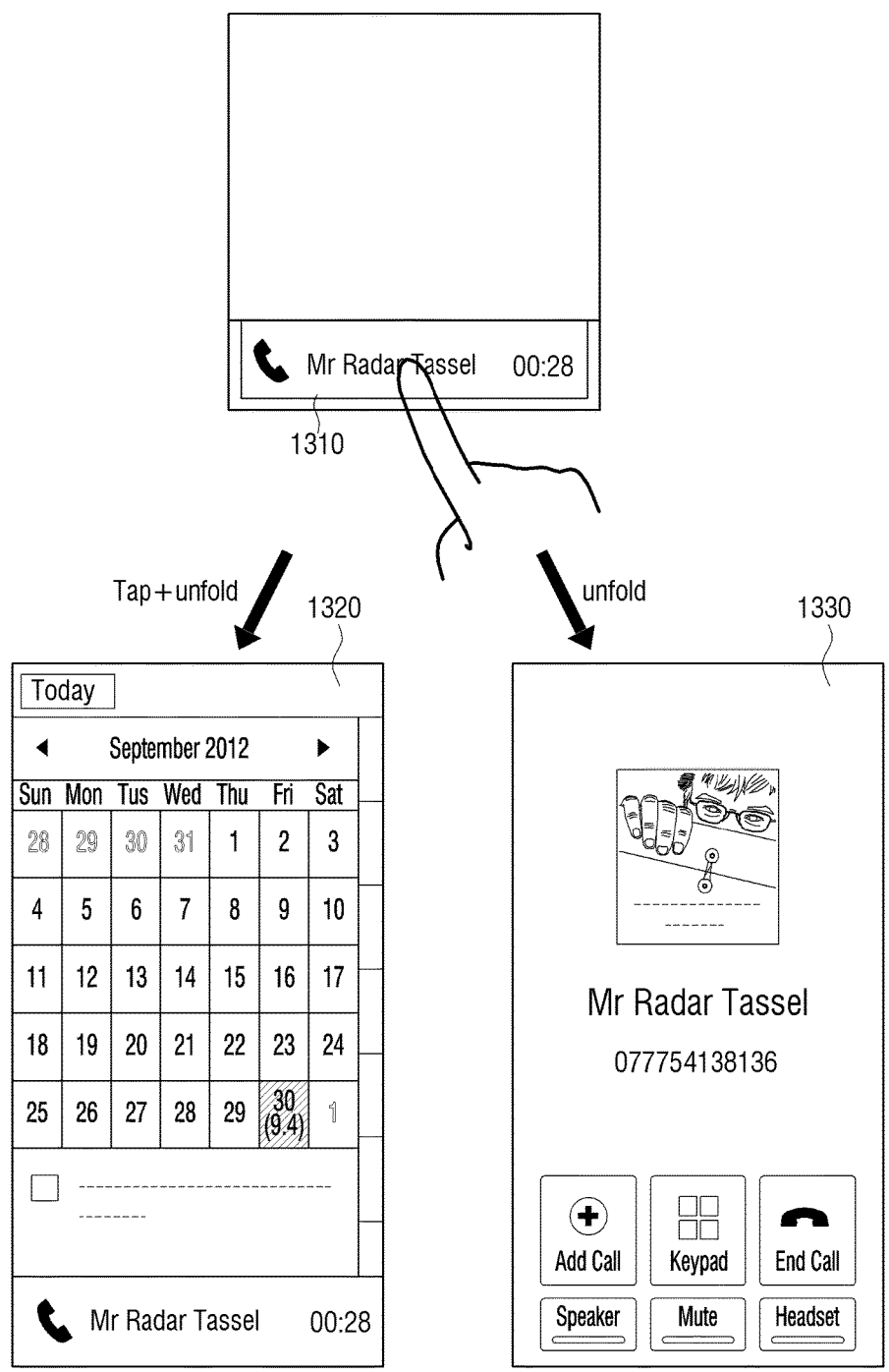

Specifically, if a call request is received from outside while the display 230 is folded, the controller 290 may control the display 230 to display a UI 1310 informing a call request is received on the exposure area as illustrated in the left side of FIG. 13A. If the UI 1310 displayed on the exposure area is touched and then, an unfolding interaction of unfolding the display 230 is detected, the controller 290 may control the display 230 to display an execution screen 1320 of a calendar application which is related to a call request function on full screen, as illustrated in the lower left side of FIG. 13A. Other applications, such as a memo application may display execution screens in response to the UI 1310 displayed on the exposure area being touched and then, an unfolding interaction of unfolding the display 230 being detected. On the other hand, if an unfolding interaction of unfolding the display 230 is detected while the UI 1310 displayed on the exposure area is not touched, the controller 290 may control the display 230 to display a call screen 1330 on full screen as illustrated in the lower right side of FIG. 13A.

Figure 13B:
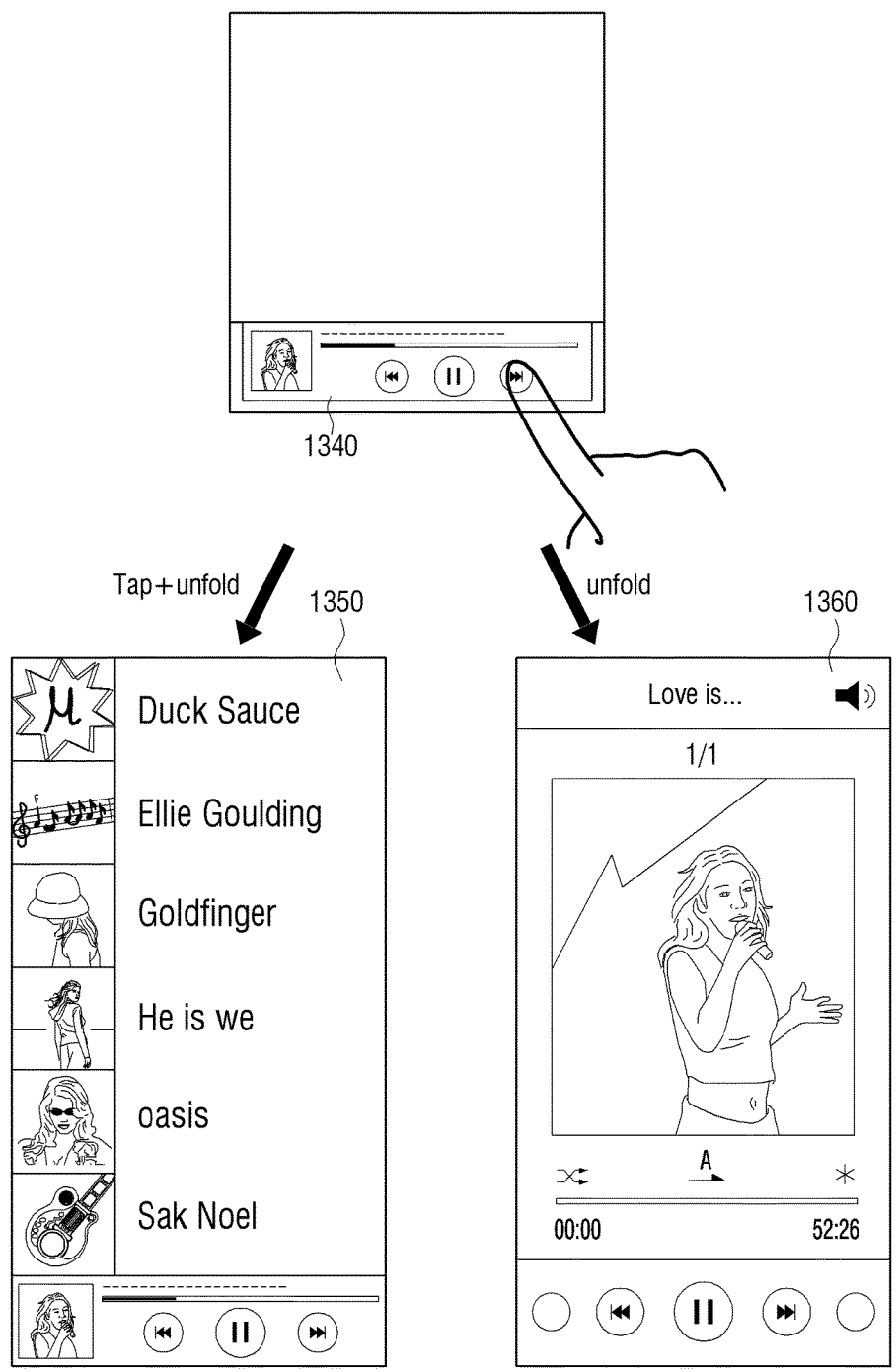

If a folding interaction of folding the display 230 is detected while a music application is executed, the controller 290 may control the display 230 to display a UI 1340 for controlling the music application on the exposure area as illustrated in the upper portion of FIG. 13B. If the UI 1340 displayed on the exposure area is touched and then an unfolding interaction of unfolding the display 230 is detected, the controller 290 may control the display 230 to maintain music play and display a play list 1350 on full screen as illustrated in the lower left side of FIG. 13B. On the other hand, if an unfolding interaction of unfolding the display 230 is detected while the UI 1340 displayed on the exposure area is not touched, the controller 290 may control the display 230 to display a music player screen 1360 on full screen as illustrated in the lower right side of FIG. 13B.

If a first unfolding interaction of unfolding a hinge angle of the display 230 as much as a predetermined angle is detected, the controller 290 may control the display 230 to display at least one icon for executing a specific function. If a second unfolding interaction of unfolding the display 230 completely while at least one icon is touched, the controller 290 may execute a function corresponding to the touched icon.

Figure 14A:
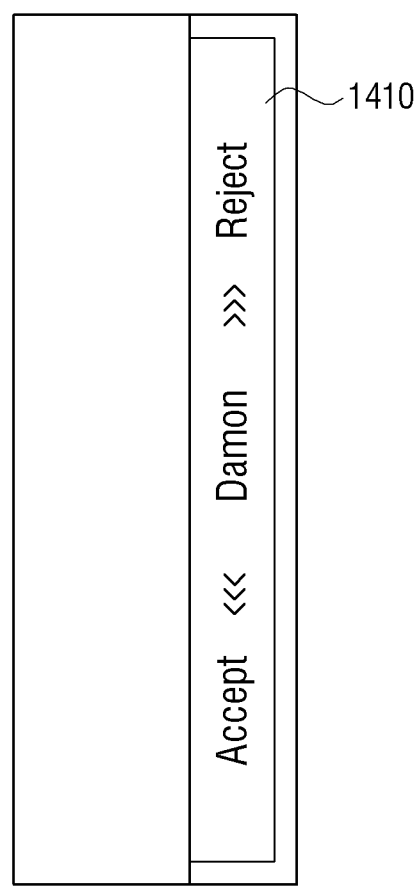

According to an exemplary embodiment, if a call request is received from outside while the display 230 is folded, the controller 290 may control the display 230 to display a UI 1410 informing that a call request is received on the exposure area as illustrated in FIG. 14A.

Figure 14B:
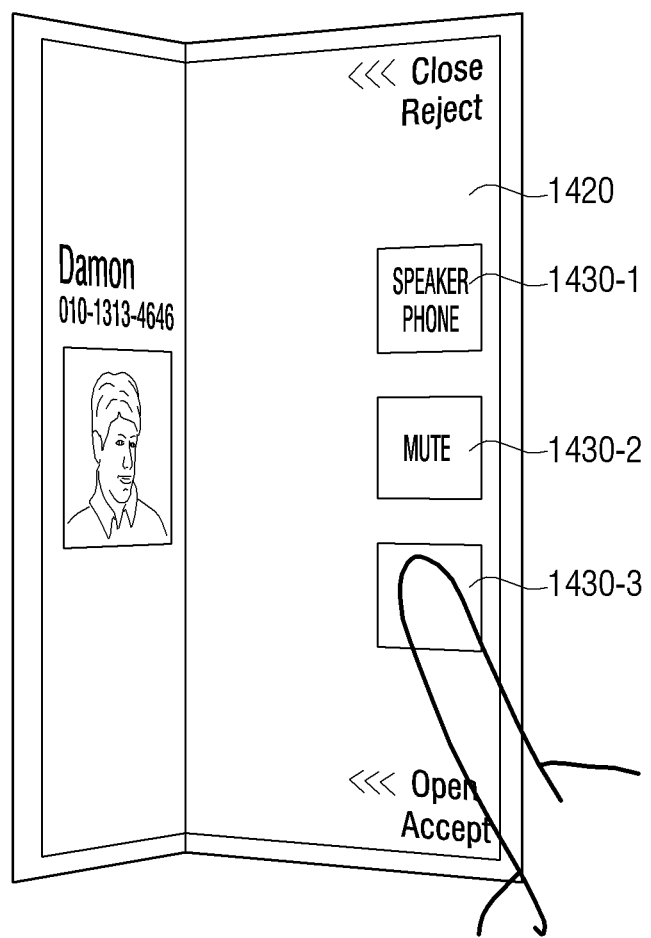

If the first unfolding interaction of unfolding a hinge angle of the display 230 as much as a predetermined angle (for example, 30° to 150°) is detected while the UI 1410 informing that a call request is received is displayed, the controller 290 may control the display 230 to display a UI 1420 including a plurality of icons 1430-1 to 1430-3 for performing various functions in relation with making a call as illustrated in FIG. 14B.

Figure 14C:
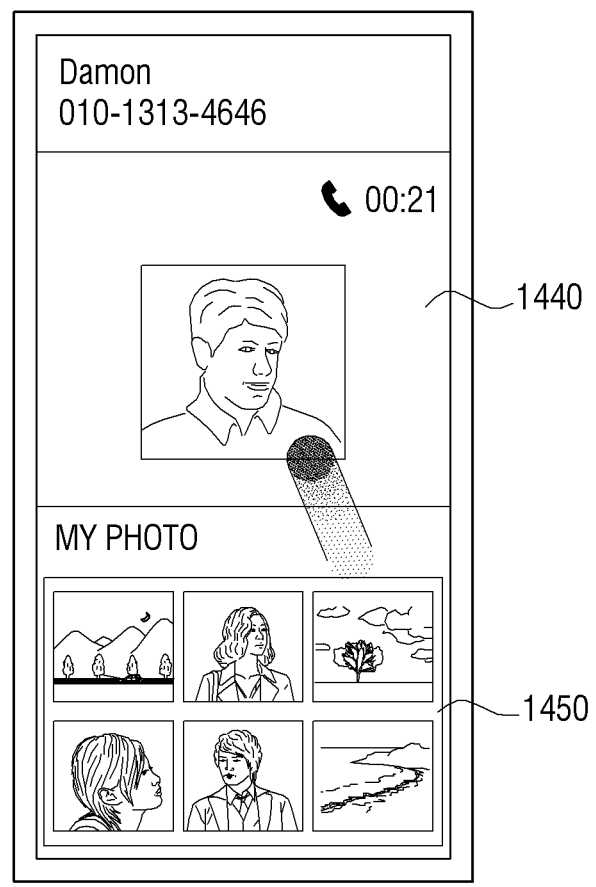

If an unfolding interaction of completely unfolding the display 230 (that is, unfolding the display 230 such that a hinge angle of the display 230 becomes 180°) is detected while a photo sharing icon is touched from among the plurality of icons 1430-1 to 1430-3, the controller 290 may accept a call request, and as illustrated in FIG. 14C, may control the display 230 to display a call screen 1440 on the upper area and a list 1450 for selecting a photo to be shared. In this case, if a touch interaction of dragging one of a plurality of photos included in the list 1450 to the call screen 1440 is selected, the controller 290 may control the communicator 240 to transmit the photo where the touch interaction is detected to a receiver.

If an unfolding interaction is detected, the controller 290 may control the display 230 to display a plurality of guidance messages according to a hinge angle of the display 230 while the unfolding interaction is detected. In this case, the guidance messages may include a guidance message for informing an incoming text message, a guidance message for indicating a missed call, a guidance message for informing an incoming an SNS message, a guidance message for informing of application updates, etc.

Figure 15A:
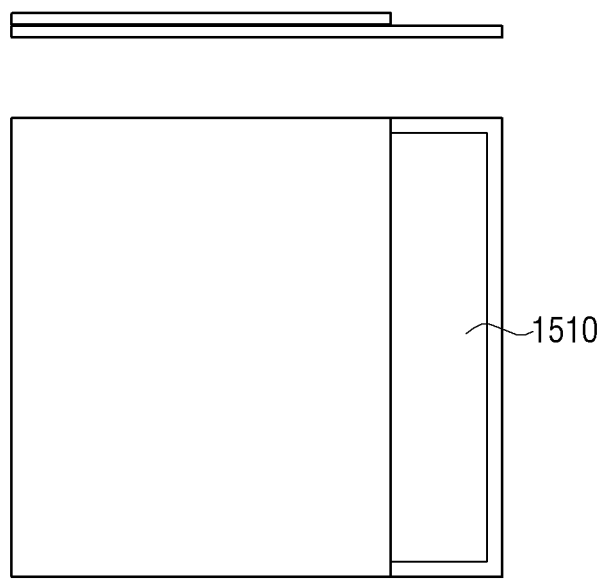

Specifically, as illustrated in FIG. 15A, the controller 290 may control the display 230 to display one guidance message 1510 while the display 230 is folded. Subsequently, if an unfolding interaction of unfolding the display 230 is detected, the controller 290 may control the display 230 to display a different number of guidance messages according to a hinge angle of the display 230. For example, if a hinge angle of the display 230 is within a first angle range (for example, between 5° and 15°), the controller 290 may control the display 230 to display two guidance messages 1510, 1520. If a hinge angle of the display 230 is within a second angle range (for example, between 15° and 25°), the controller 290 may control the display 230 to display three guidance messages 1510, 1520, 1530. That is, the controller 290 may increase the number of guidance messages displayed as a hinge angle of display 230 becomes greater.

Figure 15B:
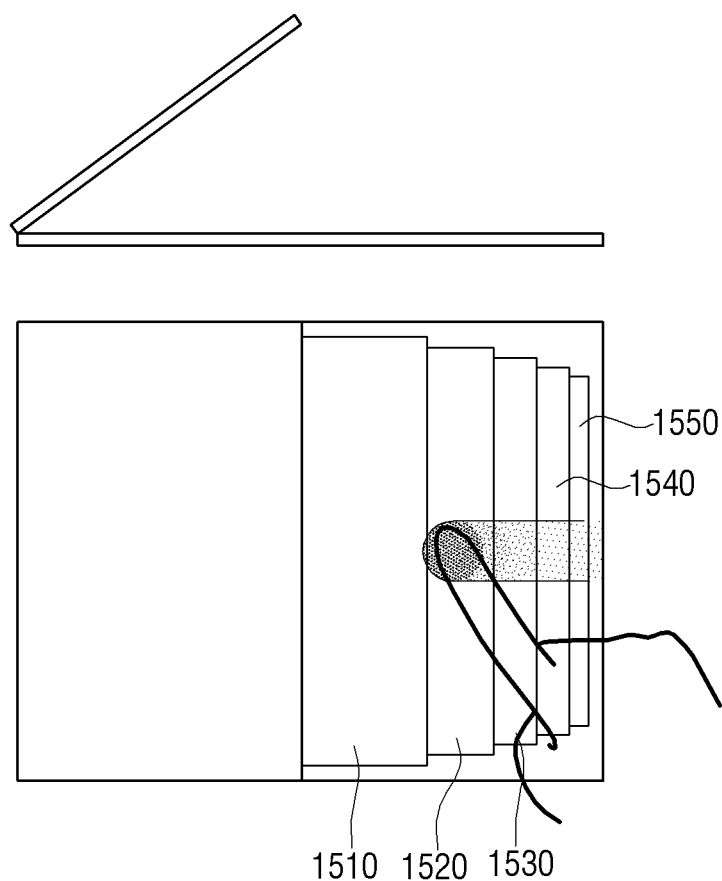

If a hinge angle of the display 230 is within a fourth angle range (for example, between 35° and 45°), the controller 290 may control the display 230 to display five guidance messages (possibly overlapping) 1510 to 1550, as illustrated in FIG. 15B. In this case, as illustrated in FIG. 15B, the first guidance message 1510 which is updated most recently may be disposed on the top.

Figure 15C:
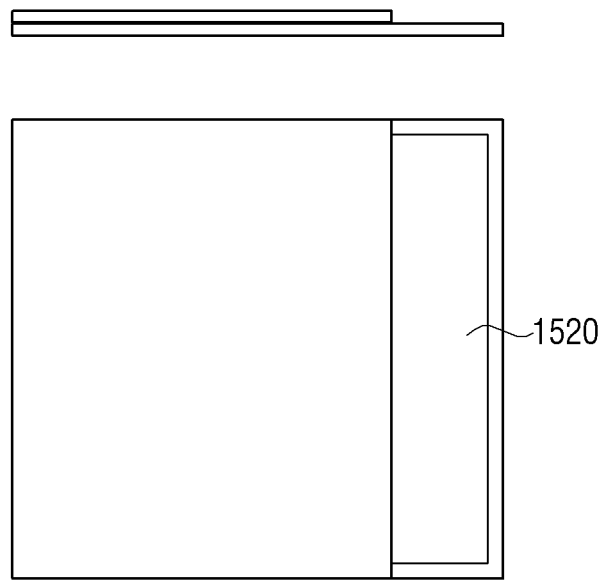

As illustrated in FIG. 15B, if a folding interaction of folding the display 230 again is detected when the second guidance message 1520 is touched while the five guidance messages 1510 to 1550 are displayed, the controller 290 may control the display 230 to display the second guidance message 1520 on the exposure area as illustrated in FIG. 15C.

Figure 15D:
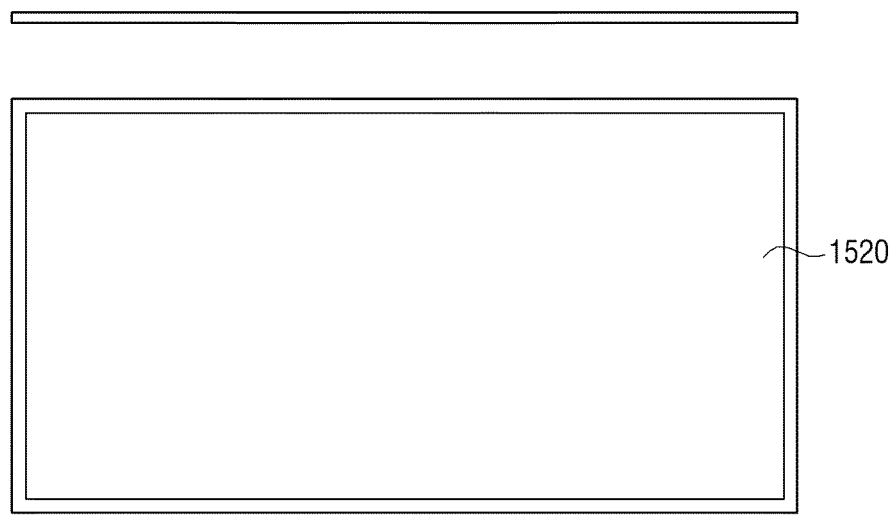

In addition, as illustrated in FIG. 15B, if an unfolding interaction of unfolding the display 230 completely is detected when the second guidance message 1520 is touched while the five guidance messages 1510 to 1550 are displayed, the controller 290 may control the display 230 to display a screen corresponding to the second guidance message 1520 on full screen as illustrated in FIG. 15D.

Further, the controller 290 may perform different functions according to the direction of a touch interaction which is detected on the exposure area while the display 230 is folded.

Figure 16A:
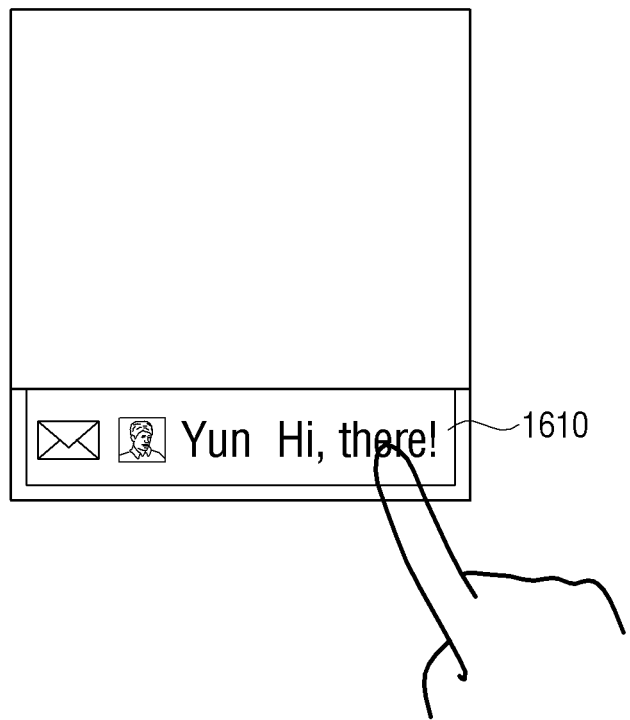

Specifically, if a message is received from outside while the display 230 is folded, the controller 290 may control the display 230 to display a UI 1610 informing that the message is received on the exposure area as illustrated in FIG. 16A.

In this case, if a touch interaction in the left-and-right direction is detected on the UI 1610 informing that a message is received, the controller 290 may control the display 230 to display a UI informing the previous message or the next message on the exposure area according to the touch interaction.

If a touch interaction in the down direction is detected on the UI 1610 informing that a message is received, the controller 290 may delete a currently-received message.

Figure 16B:
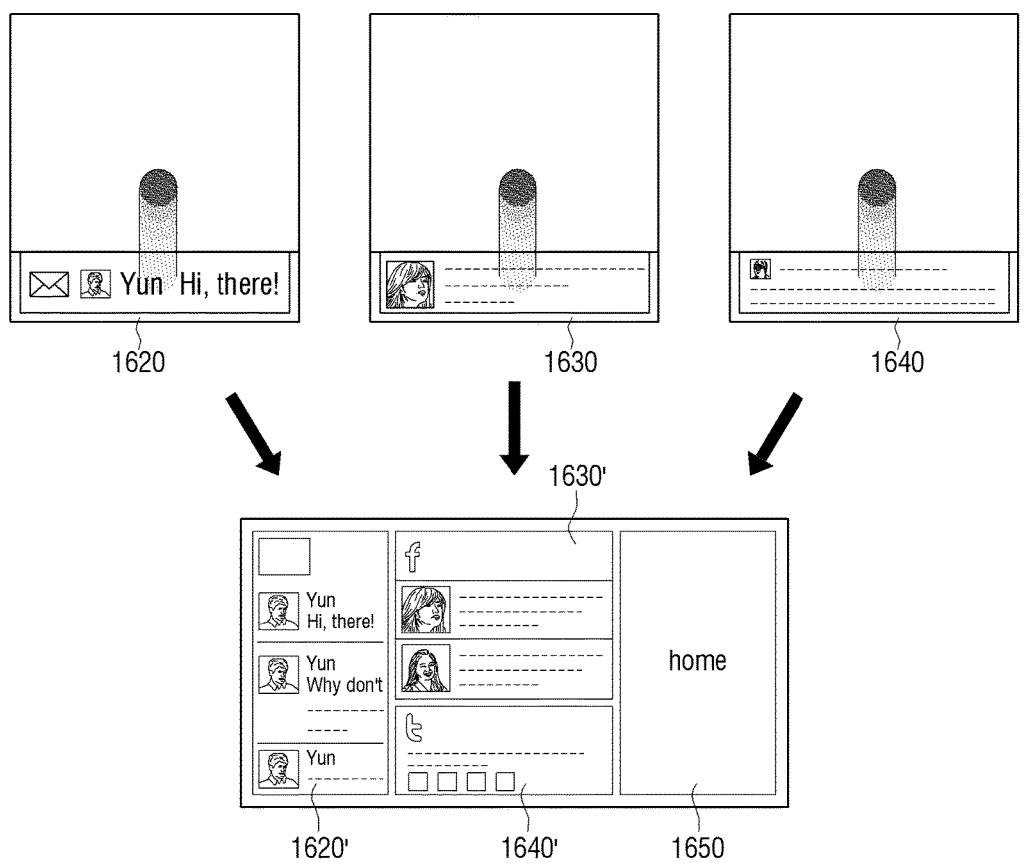

If a touch interaction in the up direction is detected on the UI 1610 informing that a message is received, the controller 290 may store the received messages. Specifically, as illustrated in FIG. 16B, if a touch interaction in the up direction is detected on a UI 1620 informing that a first message is received, a touch interaction in the up direction is detected on a UI 1630 informing a second message is received, a touch interaction in the up direction is detected on a UI 1640 informing that a third message is received and then, an unfolding interaction of unfolding the display 230 is detected, the controller 290 may control the display 230 to display a screen 1620' including the first message, a screen 1630' including the second message, a screen 1640' including the third message and a home screen 1650.

Maintain the Current Function Despite the Change in the Shape of the Display 230

The controller 290 may maintain the current function even if the shape of the display 230 changes according to a folding interaction or an unfolding interaction, and control the display 230 to display a screen corresponding to the current function.

Figure 17A:
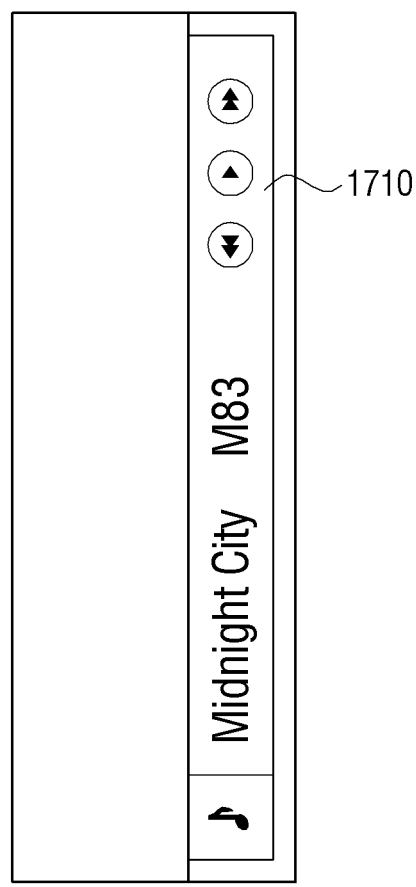
FIGS. 17A to 23B are views illustrating exemplary embodiments for maintaining functions of a user terminal device when a folding interaction and an unfolding interaction are detected.
Figure 17B:
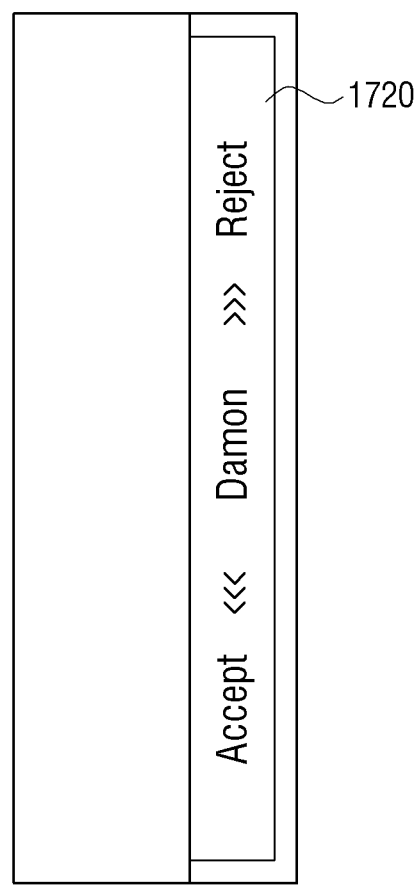
Figure 17C:
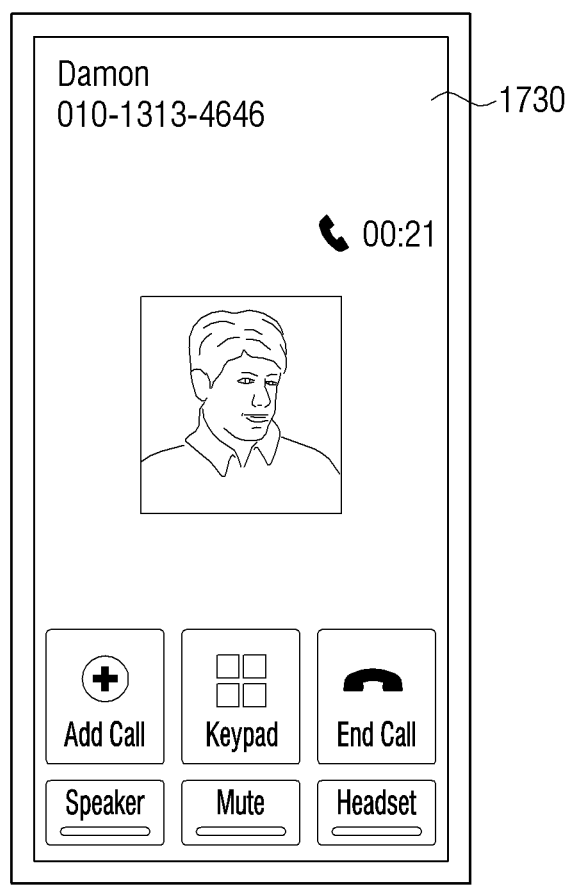
Figure 17D:
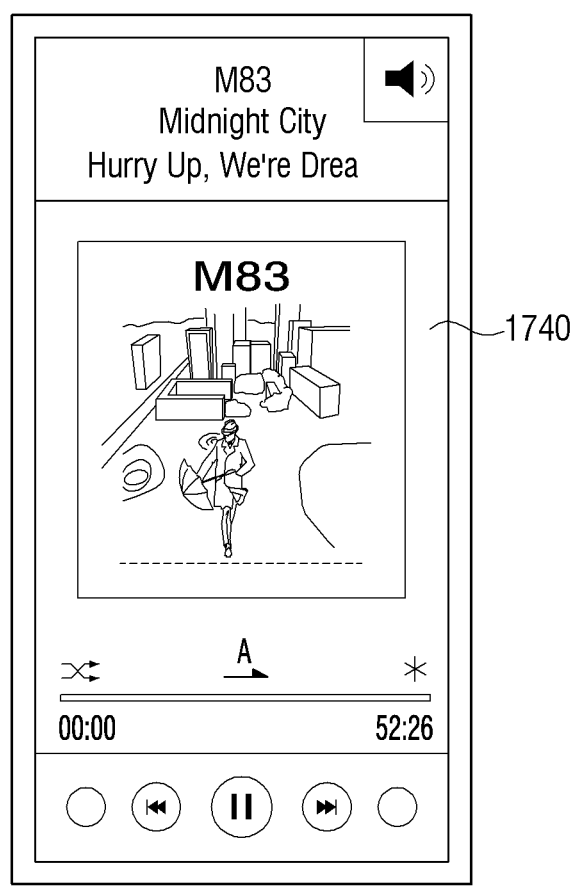
Figure 17E:
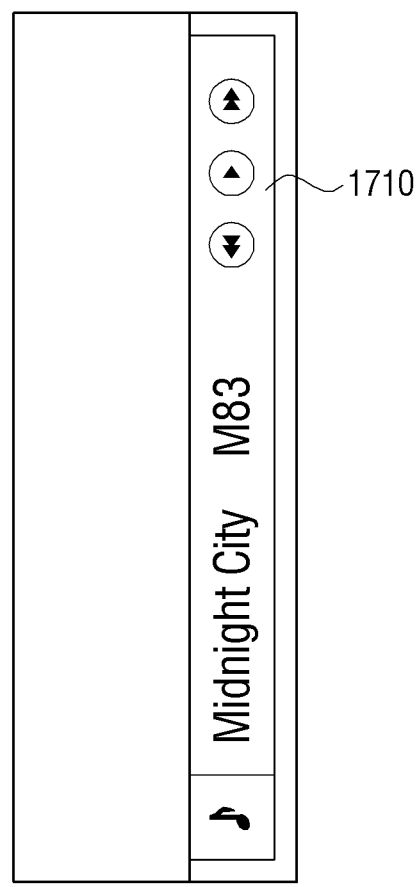

According to an exemplary embodiment, if a folding interaction of folding the display 230 is detected while a music application is executed, the controller 290 may control the display 230 to display a UI 1710 corresponding to the music application on the exposure area as illustrated in FIG. 17A. If a call request is received while the UI 1710 corresponding to the music application is displayed on the exposure area, the controller 290 may control the display 230 to display a UI 1720 informing that a call request is received on the exposure area as illustrated in FIG. 17B. If an unfolding interaction of unfolding the display 230 is detected while the UI 1720 informing that a call request is received is displayed on the exposure area, the controller 290 may control the display 230 to display a call screen 1730 on full screen as illustrated in FIG. 17C. Subsequently, when the telephone call is completed, the controller 290 may control the display 230 to display an execution screen 1740 of the music application on full screen as illustrated in FIG. 17D. If a folding interaction of folding the display 230 is detected again, the controller 290 may control the display 230 to display the UI 1710 corresponding to the music application on the exposure area as illustrated in FIG. 17E.

Figure 18A:
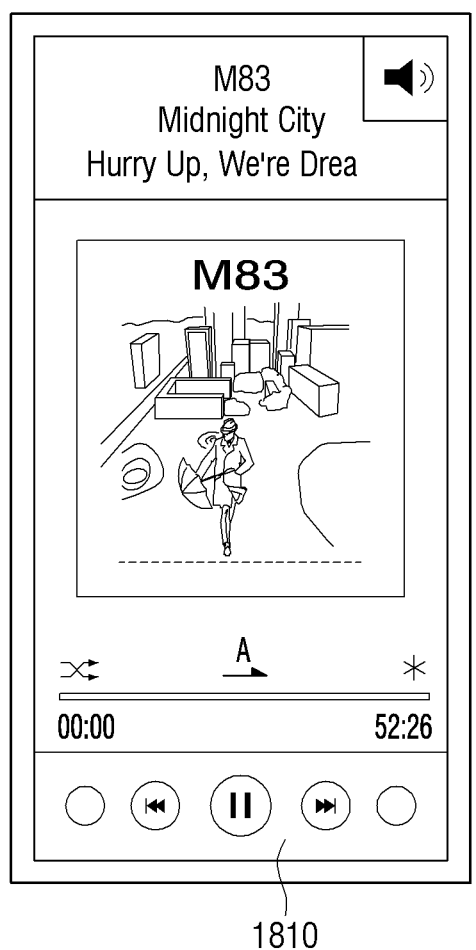
Figure 18B:
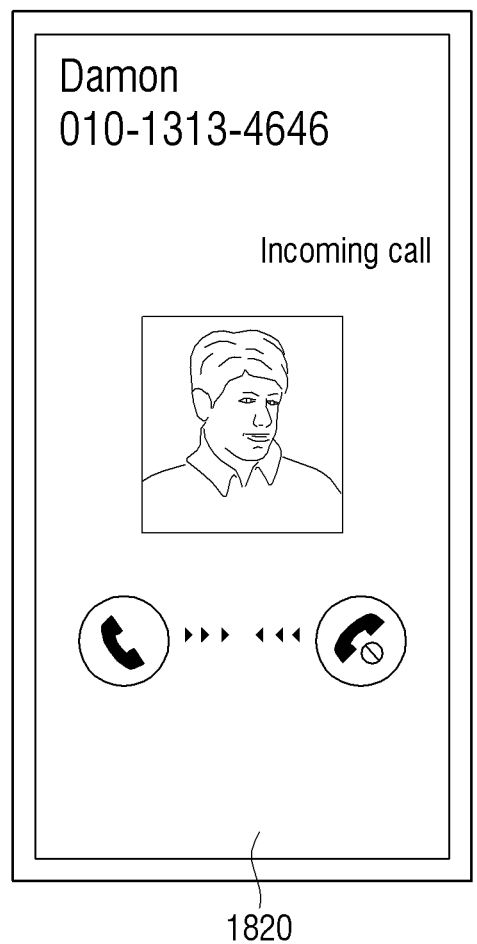
Figure 18C:
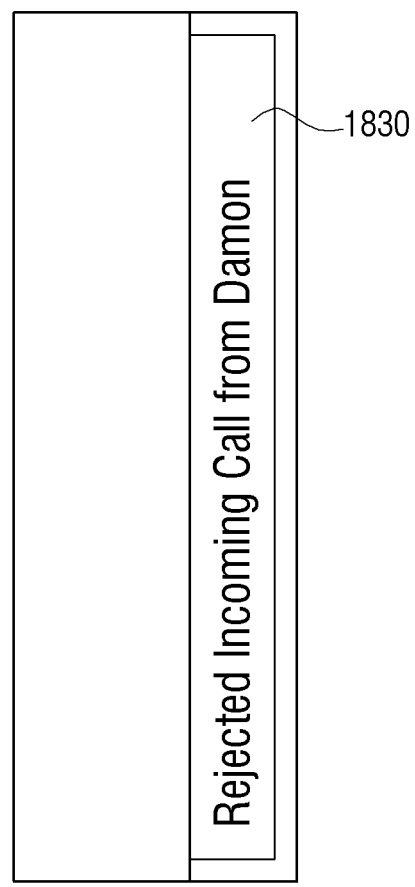
Figure 18D:
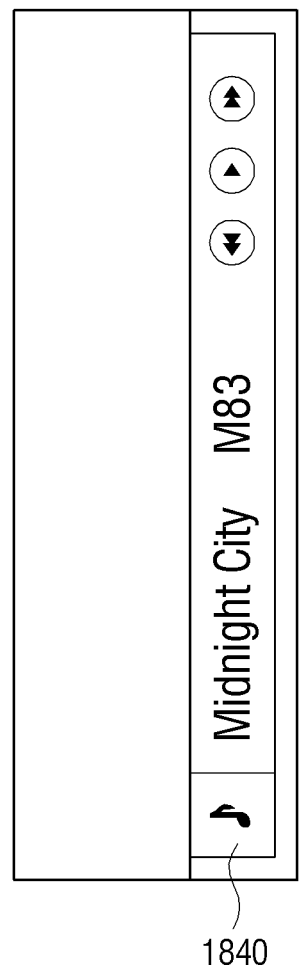
Figure 18E:
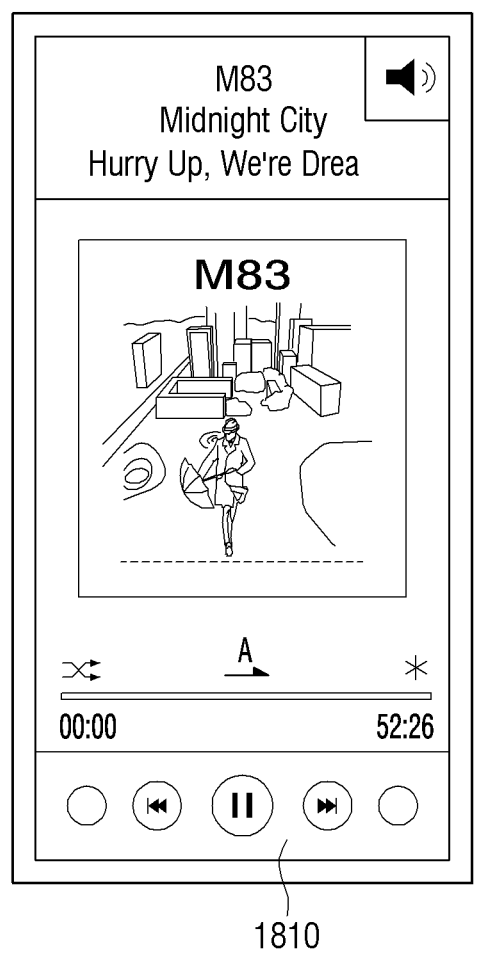

According to another exemplary embodiment, as illustrated in FIG. 18A, the controller 290 may control the display 230 to display an execution screen 1810 of a music application on full screen while the music application is executed. If a call request is received from outside, the controller 290 may control the display 230 to display a screen 1820 for confirming whether to accept the call request as illustrated in FIG. 18B. If a folding interaction of folding the display 230 is detected while the screen 1820 for confirming whether to accept the call request is displayed, the controller 290 may control the display 230 to display a UI 1830 informing that a call request is rejected on the exposure area as illustrated in FIG. 18C. When the telephone call is completed, the controller 290 may control the display 230 to display a UI 1840 corresponding to the music application on the exposure area as illustrated in FIG. 18D. Subsequently, if an unfolding interaction of unfolding the display 230 is detected again, the controller 290 may control the display 230 to display the execution screen 1810 of the music application on full screen as illustrated in FIG. 18E.

Figure 19A:
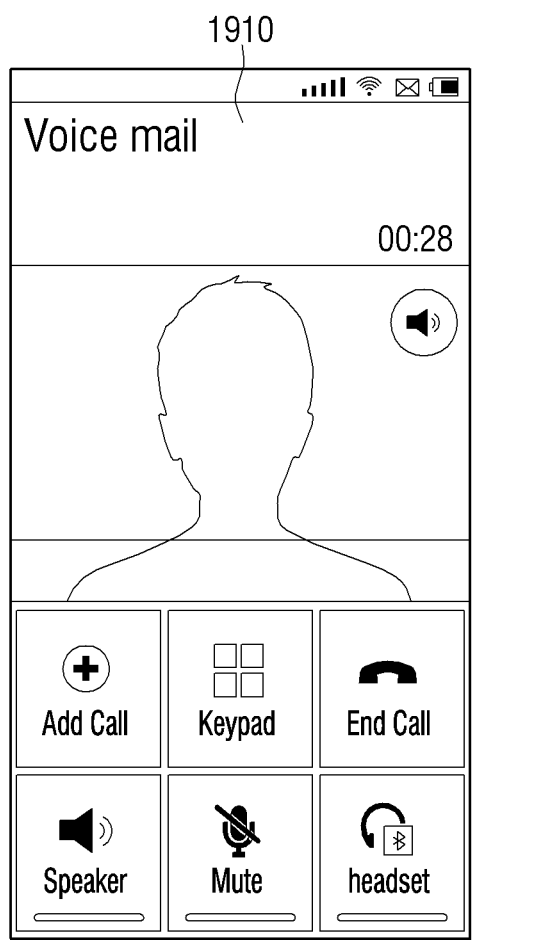

The controller 290 may determine a display area which can be watched by a user according to a hinge angle of the display 230, and control the display 230 to display a screen including different amount of information on the determined display area. In this case, the hinge angle of the display 230 may be matched with the watchable display area and then stored. According to an exemplary embodiment, if the display 230 is unfolded while a telephone call is performed, the controller 290 may control the display 230 to display a first telephone call screen 1910 on full screen as illustrated in FIG. 19A.

Figure 19B:
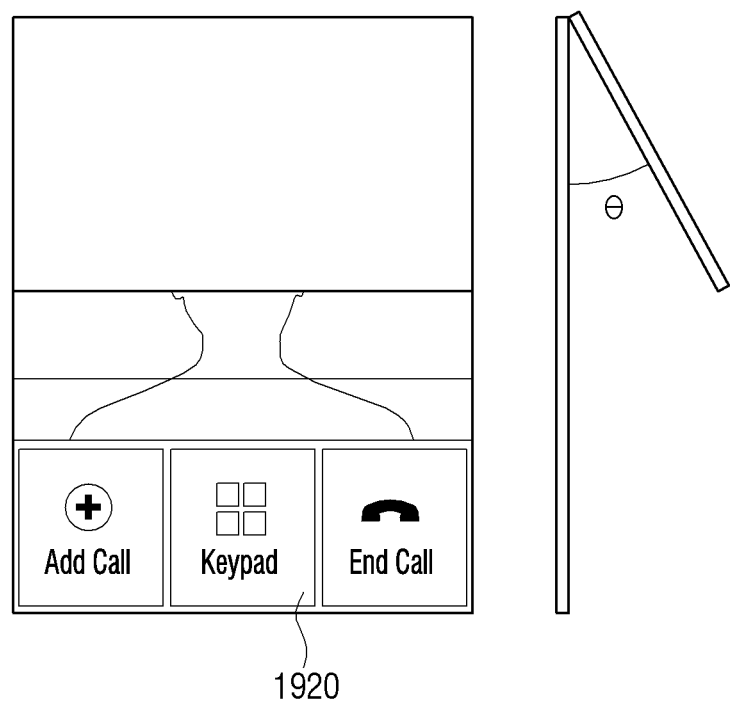

If a hinge angle of the display 230 is folded as much as θ while a telephone call is performed, the controller 290 may determine a display area corresponding to the hinge angle, and as illustrated in FIG. 19B, may control the display 230 to display a second telephone call screen 1920 on the determined display area. In this case, the second telephone call screen 1920 may include less information and fewer icons than those included in the first telephone call screen 1910.

Figure 19C:
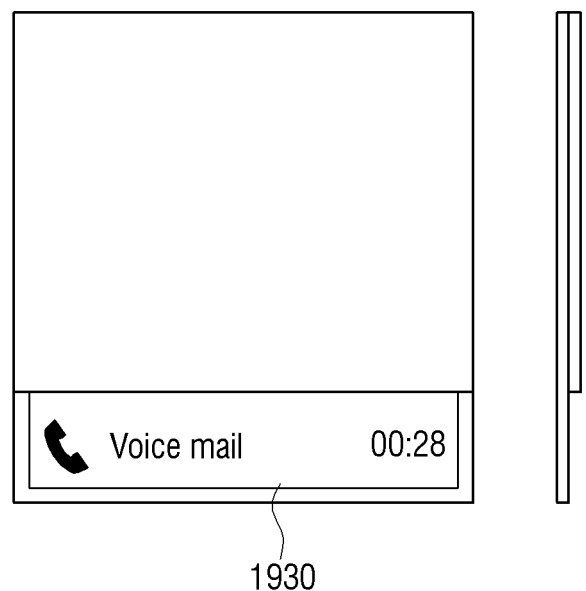

In addition, if the display 230 is folded while a telephone call is performed, the controller 290 may control the display 230 to display a UI 1930 informing that a telephone call is being performed on the exposure area as illustrated in FIG. 19C.

Figure 20A:
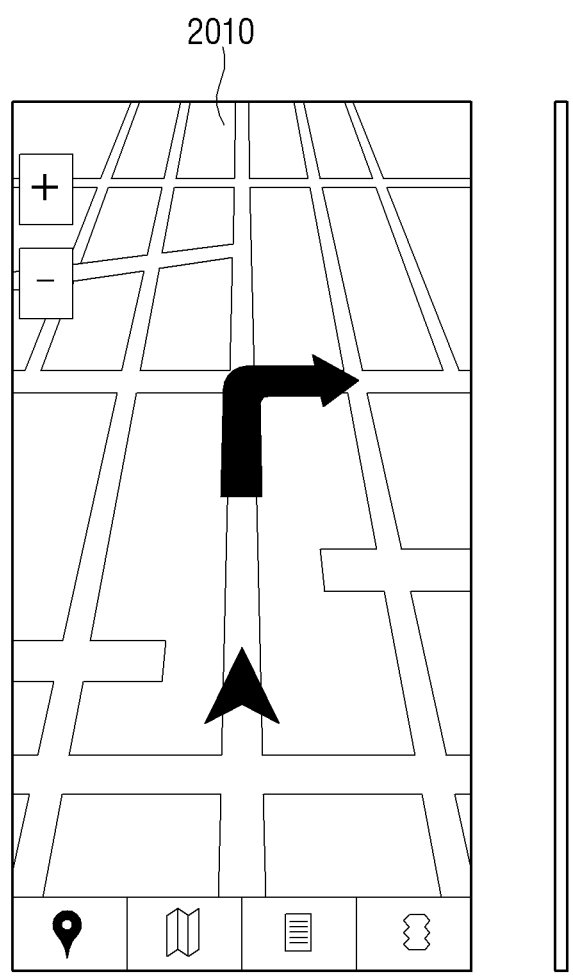

According to another exemplary embodiment, if the display 230 is unfolded while a navigation application is executed, the controller 290 may control the display 230 to display a first navigation screen 2010 on full screen as illustrated in FIG. 20A.

Figure 20B:
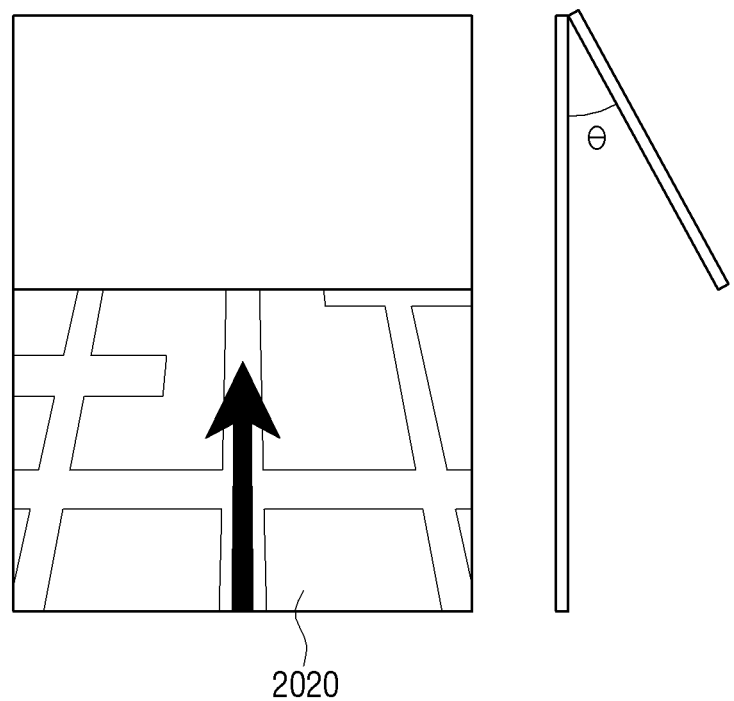

If a hinge angle of the display 230 is folded as much as θ while a navigation application is executed, the controller 290 may determine a display area corresponding to the hinge angle, and as illustrated in FIG. 20B, may control the display 230 to display a second navigation screen 2020 on the determined display area. In this case, the area guided by the second navigation screen 2020 may be smaller than the area guided by the first navigation screen 2010.

Figure 20C:
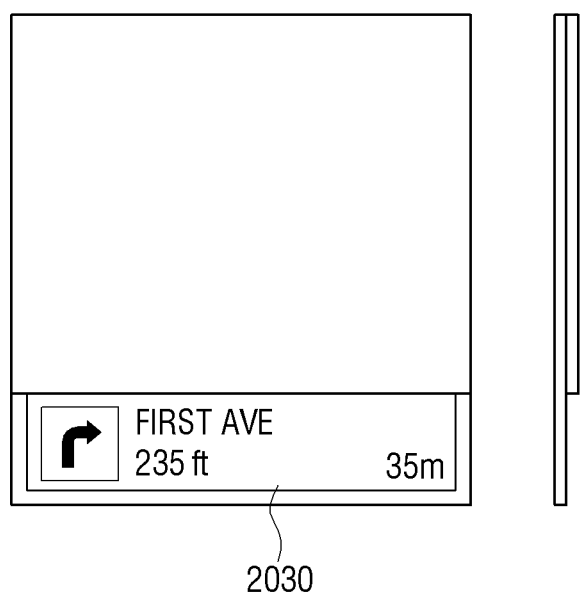

If the display 230 is folded while a navigation application is executed, the controller 290 may control the display 230 to display a third navigation screen 2030 on the exposure area as illustrated in FIG. 20C. In this case, the third navigation screen 2030 may include only direction information and distance information instead of a map screen included in the first navigation screen 2010 and the second navigation screen 2020. However, a map screen may also be included on the exposure area in third navigation screen 2030.

Whenever a folding interaction or an unfolding interaction is detected, the controller 290 may control the display 230 to reconfigure and display information such that the information corresponds to the size and direction of a screen.

Figure 21A:
Figure 21B:
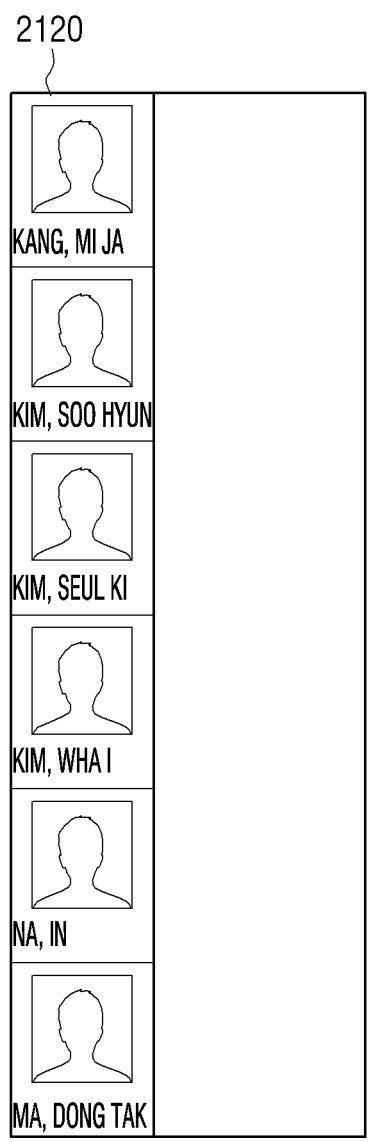

Specifically, as illustrated in FIG. 21A, if a folding interaction of folding the display 230 is detected while a first address book list 2110 is displayed on full screen, the controller 290 may control the display 230 to display a second address book list 2120 on the exposure area as illustrated in FIG. 21B. In this case, the first address book list 2110 might include user information such as image, name, telephone number, direct call icon, etc., and the second address book list 2120 might include user information such as image and name only, but the display is not limited thereto.

Figure 22A:
Figure 22B:
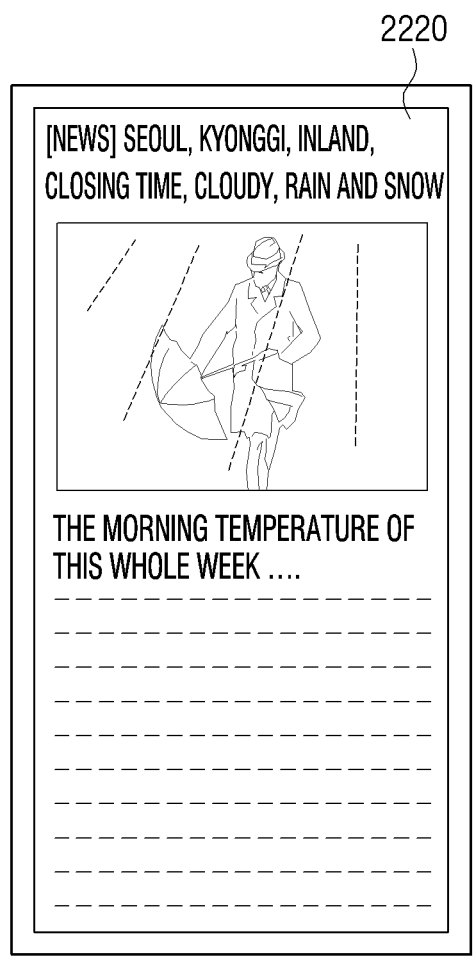

In addition, as illustrated in FIG. 22A, if an unfolding interaction of unfolding the display 230 is detected while a news title 2210 is displayed on the exposure area when the display 230 is folded, the controller 290 may control the display 230 to display a full screen 2220 including not only the news title but also the news image and the news text as illustrated in FIG. 22B.

Figure 23A:
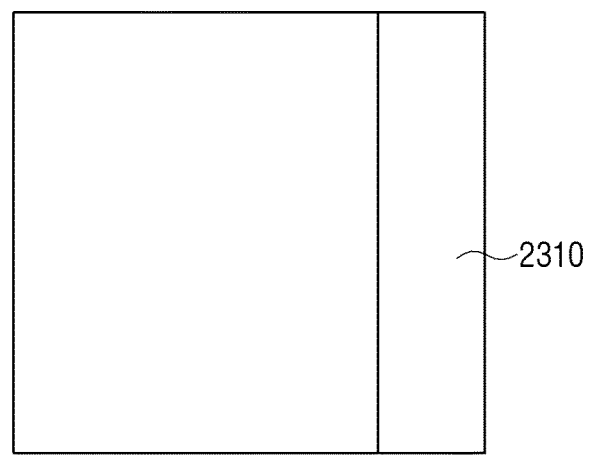
Figure 23A:
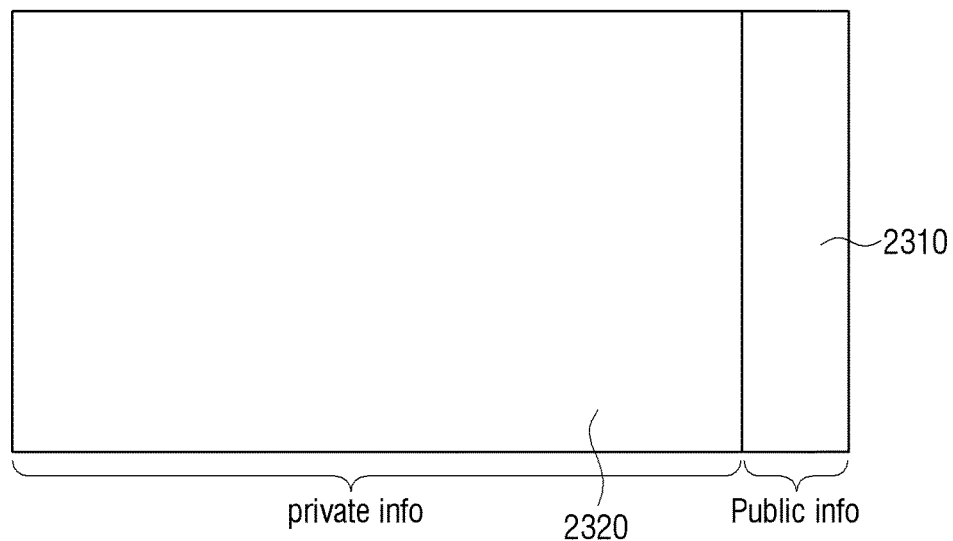
Figure 23B:
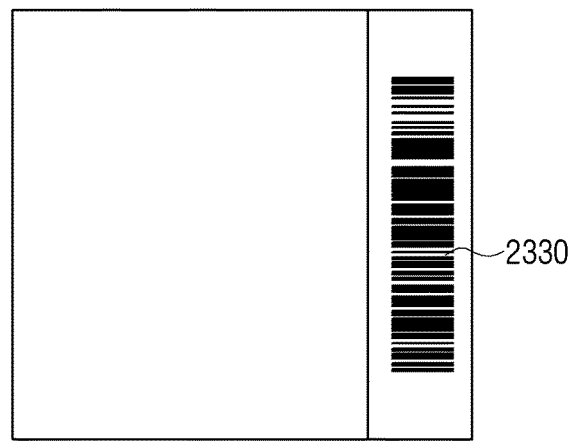
Figure 23B:
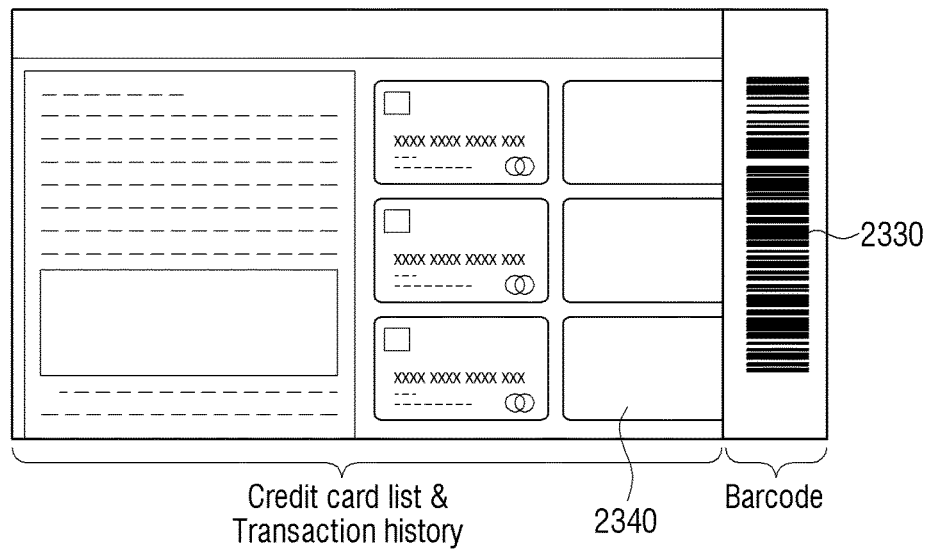

In addition, the controller 290 may control the display 230 to display different information on the exposure area and the hidden area when the display 230 is folded. In this case, as illustrated in FIG. 23A, the controller 290 may control the display 230 to display common information on an exposure area 2310 and private information on a hidden area 2320. For example, as illustrated in FIG. 23B, the controller 290 may control the display 230 to display barcode information which is common information on the exposure area 2330, and credit card list and transaction information which is private information on the hidden area 2340.

An Interaction on an Exposure Area

According to an exemplary embodiment, while the display 230 is folded forward such that the first area faces the second area with reference to the folding line and a part of the second area is exposed to outside, the detector 280 may detect a first user interaction of moving along a long side of the exposed area or a second user interaction of moving along a short side of the exposed area. If the first user interaction is detected through the detector 280, the controller 290 may control the display 230 to display an execution screen of an application which provides a first function on the exposure area. On the other hand, if the second user interaction is detected through the detector 280, the controller 290 may control the display 230 to display an execution screen of an application which provides a second function on the exposure area.

The first user interaction of moving along a long side of the exposed area may include, for example, the first user interaction of moving in a direction in parallel with a long side of the exposed area. On the other hand, the second user interaction of moving along a short side of the exposed area may include, for example, the second user interaction of moving at right angles to the direction in parallel with a short side of the exposed area.

In this case, being in parallel may include, for example, a state where a prolonged line of the long side of the exposed area and a prolonged line of a trace of the first user interaction which moves in a horizontal direction do not meet with each other or meet in an area outside the exposed area. Alternatively, being in parallel may include, for example, a state where a prolonged line of the short side of the exposed area and a prolonged line of a trace of the second user interaction which moves in a vertical direction do not meet with each other or meet in an area outside the exposed area.

In addition, the first user interaction moving in one direction and the second user interaction moving at right angles to the one direction may include a case where a cross angle between a prolonged line of a trace of the first user interaction and a prolonged line of a trace of the second user interaction is either 90° or almost 90°. For example, if a cross angle between the prolonged lines is a value between 80° and 100°, it can be seen that the motion direction of the first user interaction is at right angles to the motion direction of the second user interaction.

Hereinafter, one or more exemplary embodiments will be described in greater detail with reference to FIGS. 24-31.

FIGS. 24A to 24D are views illustrating an exemplary embodiment of performing various functions of the user terminal device 200 illustrated in FIG. 2 according to a user interaction on an exposure area.

Figure 24A:
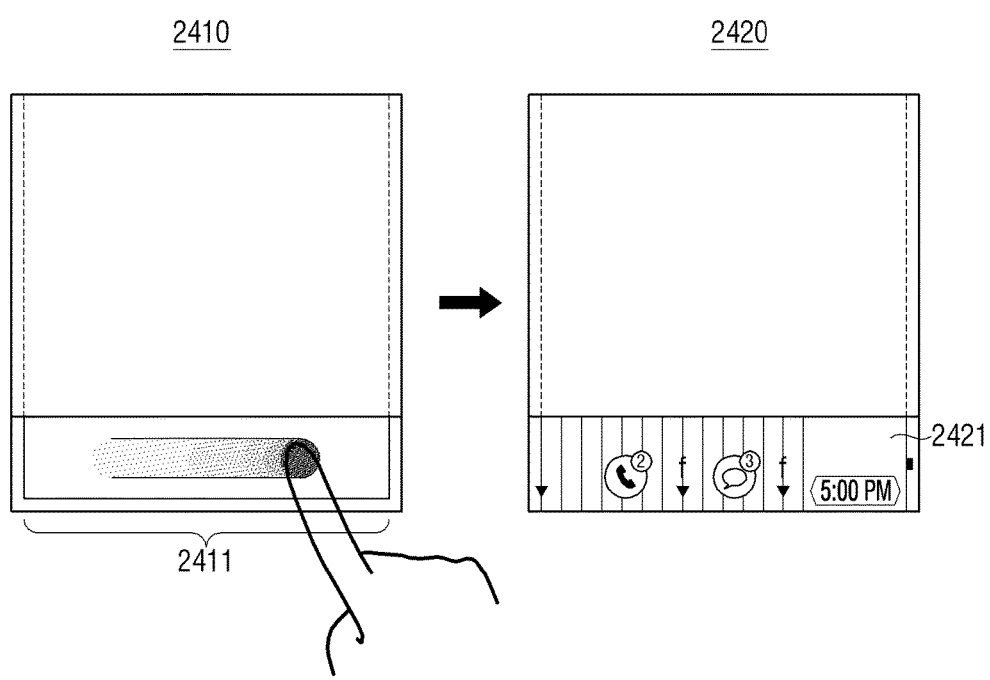
FIGS. 24A to 31B are views illustrating exemplary embodiments of performing various functions of a user terminal device when a user interaction is detected on an exposure area.

As illustrated in 2410 of FIG. 24A, while an image is not displayed on an exposure area, the detector 280 may detect a user interaction of moving in one direction (for example, in a right direction) along a long side 2411 of the exposure area. The state where an image is not displayed on the exposure area may include, for example, a state where the display 230 is inactive. If the detector 280 detects the user interaction, as illustrated in 2420 of FIG. 24A, the controller 290 may control the display 230 to display an execution screen 2421 of an application for displaying a home screen on the exposure area. The home screen 2421 may include, for example, the current time information or a timeline.

Figure 24B:
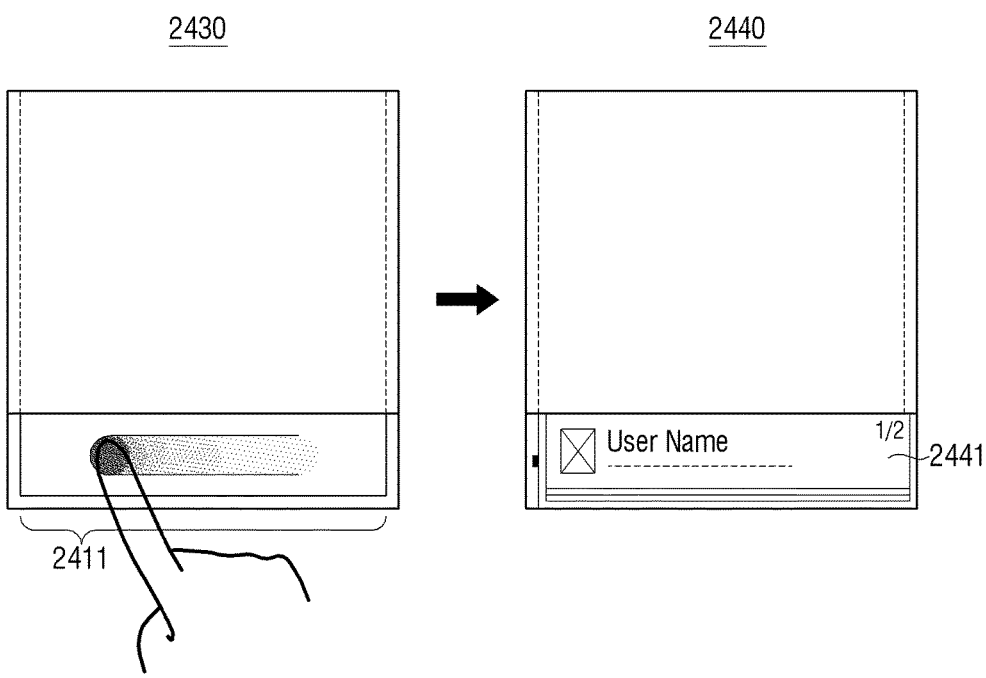

As illustrated in 2430 of FIG. 24B, while an image is not displayed on the exposure area, the detector 280 may detect a user interaction of moving in an opposite direction to the one direction (for example, in a left direction) along the long side 2411 of the exposure area. If the detector 280 detects the user interaction, as illustrated in 2440 of FIG. 24B, the controller 290 may control the display 230 to display an execution screen 2441 of an application for displaying public information (for example, the number of unread messages, message sender information, etc.) on the exposure area.

Figure 24C:
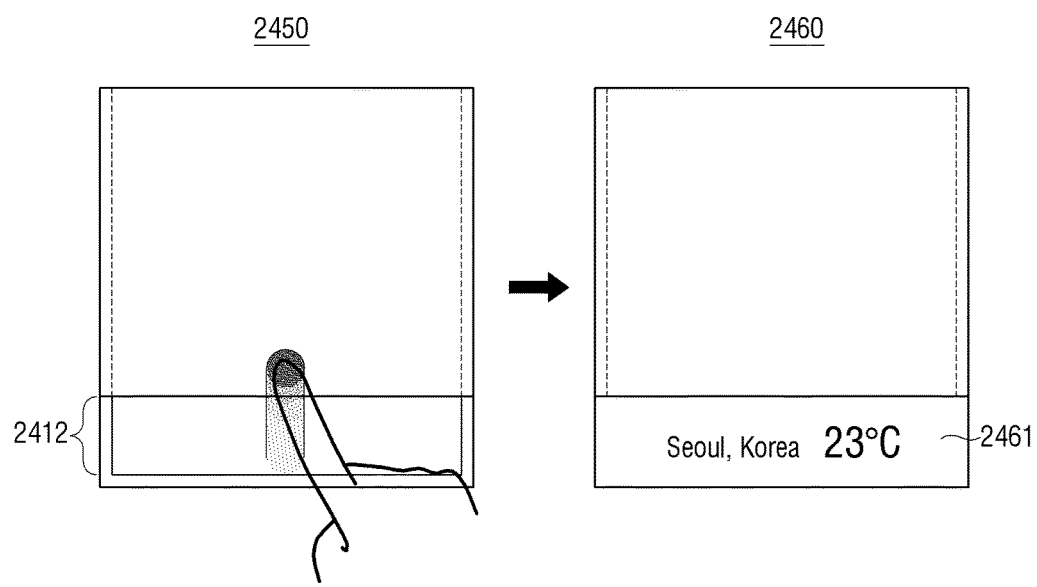

As illustrated in 2450 of FIG. 24C, while an image is not displayed on the exposure area, the detector 280 may detect a user interaction of moving in one direction (for example, in an upward direction, a folding line direction, or a direction of a covered area) along a short side of the exposure area. If the detector 280 detects the user interaction, as illustrated in 2460 of FIG. 24C, the controller 290 may control the display 230 to display an execution screen 2461 of an application for displaying glanceable information on the exposure area. The glanceable information may be information that a user may check quickly (for example, within 1-2 seconds), and may include information such as the current time, the current weather, etc. When a predetermined time elapses after the glanceable information is displayed, the controller 290 may control the display 230 to not display an image.

Figure 24D:
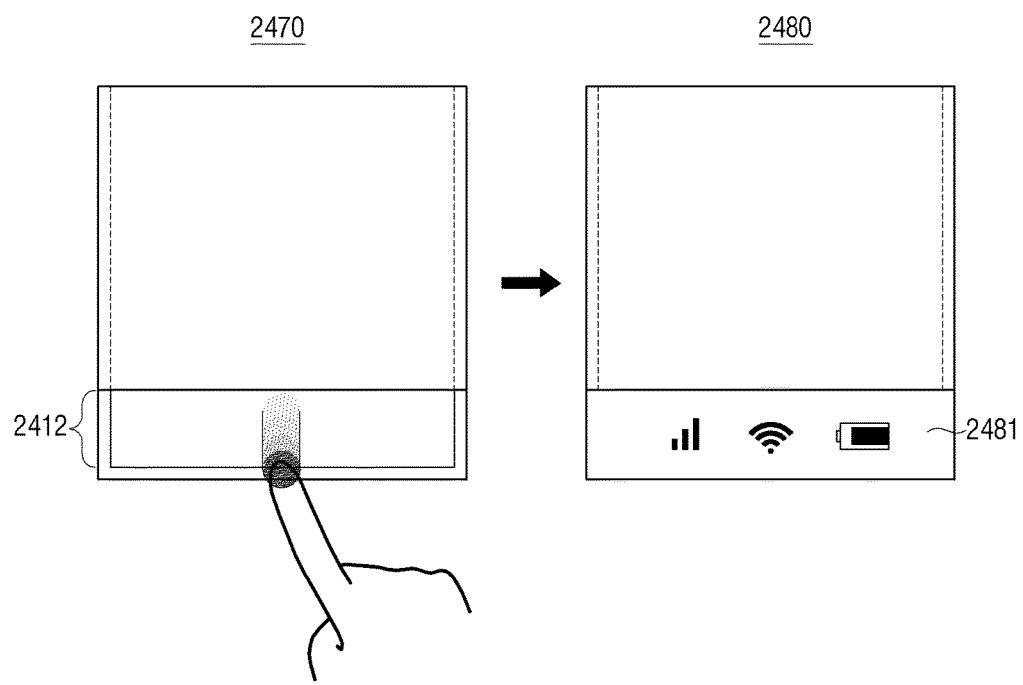

As illustrated in 2470 of FIG. 24D, while an image is not displayed on the exposure area, the detector 280 may detect a user interaction of moving in one direction (for example, in a downward direction, and a direction outside the display 230) along a short side 2412 of the exposure area. If the detector 280 detects the user interaction, as illustrated in 2480 of 24D, the controller 290 may control the display 230 to display an execution screen 2481 of an application for displaying state information of the user terminal device 200 (for example, volume information, networking information, battery information) on the exposure area. Alternatively, the controller 290 may control the display 230 to display a screen providing a UI for environment setting of the user terminal device 200 on the exposure area.

FIGS. 25A to 25D are views provided to explain an exemplary embodiment of performing various functions of the user terminal device 200 illustrated in FIG. 2 according to a user interaction on the exposure area.

As illustrated in 2510 of 25A, while an execution screen 2511 of a telephone application for requesting a telephone call is displayed on the exposure area, the detector 280 may detect a user interaction of moving in one direction (for example, in a right direction) along a long side of the exposure area. If the detector 280 detects the user interaction, as illustrated in 2520 of FIG. 25A, the controller 290 may accept the telephone call request, and control the display 230 to display an execution screen 2521 of the telephone application indicating that the telephone call request has been accepted on the exposure area. The execution screen 2521 of the telephone application for accepting a telephone call request may include, for example, at least one of a telephone call acceptance icon and a telephone call time.

Figure 25A:
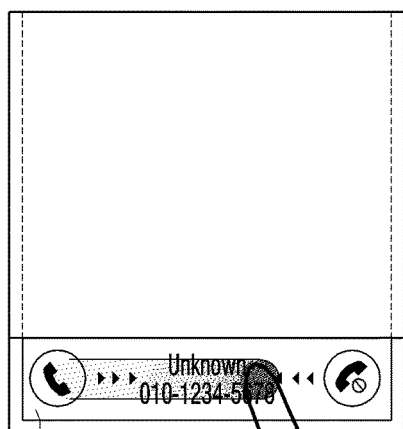
Figure 25A:
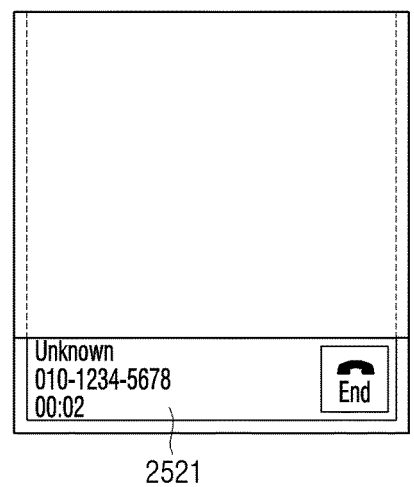
Figure 25B:
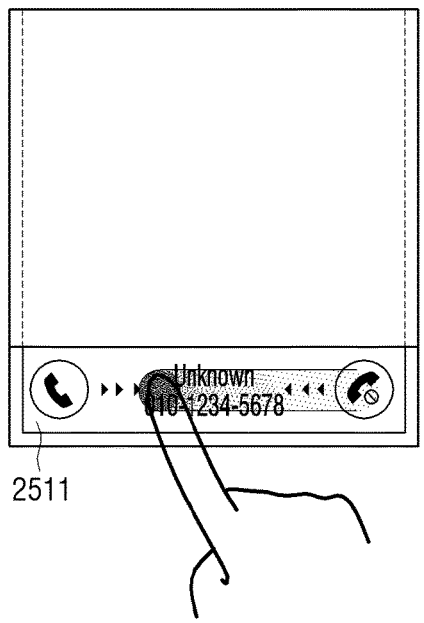
Figure 25B:
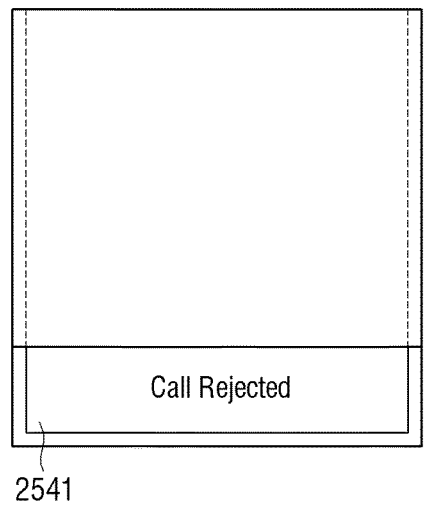

As illustrated in 2530 of FIG. 25B, while the execution screen 2511 of the telephone application for requesting a telephone call is displayed on the exposure area, the detector 280 may detect a user interaction of moving in one direction (for example, in a left direction) along a long side of the exposure area. If the detector 280 detects the user interaction, as illustrated in 2540 of FIG. 25B, the controller 290 may refuse the telephone call request, and may control the display 230 to display an execution screen 2541 of a telephone application indicating that the telephone call request has been refused on the exposure area. The execution screen 2541 of the telephone application for refusing a telephone call request may include, for example, at least one of a telephone call refusal phrase and a telephone call refusal icon.

Figure 25C:
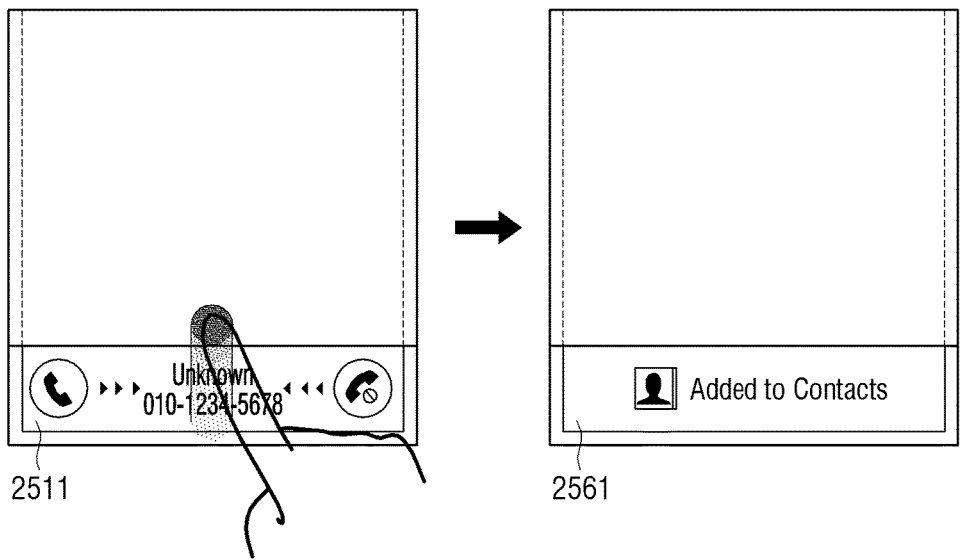

As illustrated in 2550 of FIG. 25C, while the execution screen 2511 of the telephone application for requesting a telephone call is displayed on the exposure area, the detector 280 may detect a user interaction of moving in one direction (for example, in an upward direction) along a short side of the exposure area. If the detector 280 detects the user interaction, as illustrated in 2560 of FIG. 25C, the controller 290 may control the display 230 to display an execution screen 2561 of a telephone application indicating that a counterpart telephone number is stored in a contact list on the exposure area. Subsequently, if the detector 280 detects an unfolding interaction of unfolding the display 230 up to a predetermined angle, the controller 290 may control the display 230 to display an execution screen of a telephone application including various functions such as the function of managing counterpart telephone numbers using a contact list.

According to another exemplary embodiment, as described above with reference to 2520 of FIG. 25A, while the execution screen 2521 of the telephone application indicating a telephone call request has been accepted is displayed on the exposure area, the detector 280 may detect a user interaction of moving in one direction (for example, in an upward direction) along a short side of the exposure area. In this case, as illustrated in 2560 of 25C, the controller 290 may control the display 230 to display the execution screen 2561 of the telephone application indicating that a counterpart telephone number is stored in a contact list on the exposure area.

Figure 25D:
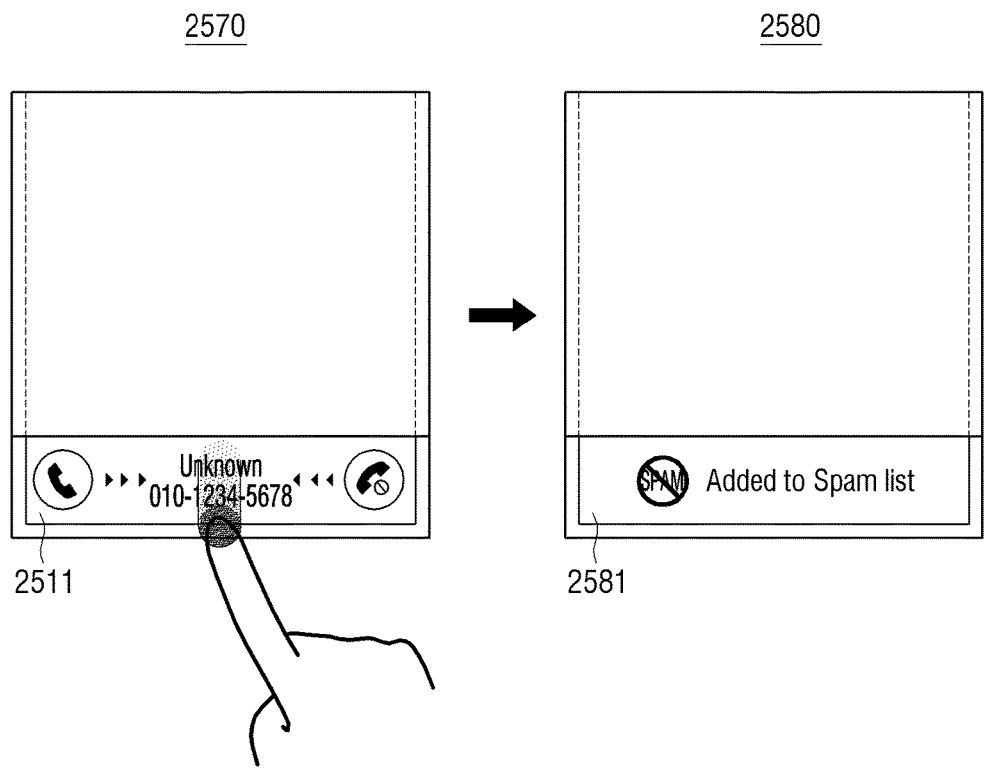

As illustrated in 2570 of FIG. 25D, while the execution screen 2511 of the telephone application for requesting a telephone call is displayed on the exposure area, the detector 280 may detect a user interaction of moving in one direction (for example, in a downward direction) along a short side of the exposure area. If the detector 280 detects the user interaction, as illustrated in 2580 of FIG. 25D, the controller 290 may control the display 230 to display an execution screen 2581 of a telephone application indicating that a telephone number of the counterpart who requests a telephone call is stored in a spam list on the exposure area. In addition, the controller 290 may control the display 230 to display an execution screen of a telephone application indicating that a counterpart telephone number is deleted from a telephone history list on the exposure area.

According to another exemplary embodiment, as illustrated in 2540 of FIG. 25B, while the execution screen 2541 of the telephone application indicating that a telephone call request is refused is displayed on the exposure area, the detector 280 may detect a user interaction of moving in one direction (for example, in a downward direction) along a short side of the exposure area. In this case, as illustrated in 2580 of FIG. 25D, the controller 290 may control the display 230 to display the execution screen 2581 of the telephone application indicating that a counterpart telephone number is stored in a spam list on the exposure area.

FIGS. 26A to 26D illustrate an exemplary embodiment of performing various functions of the user terminal device 200 illustrated in FIG. 2 according to a user interaction on the exposure area.

Figure 26A:
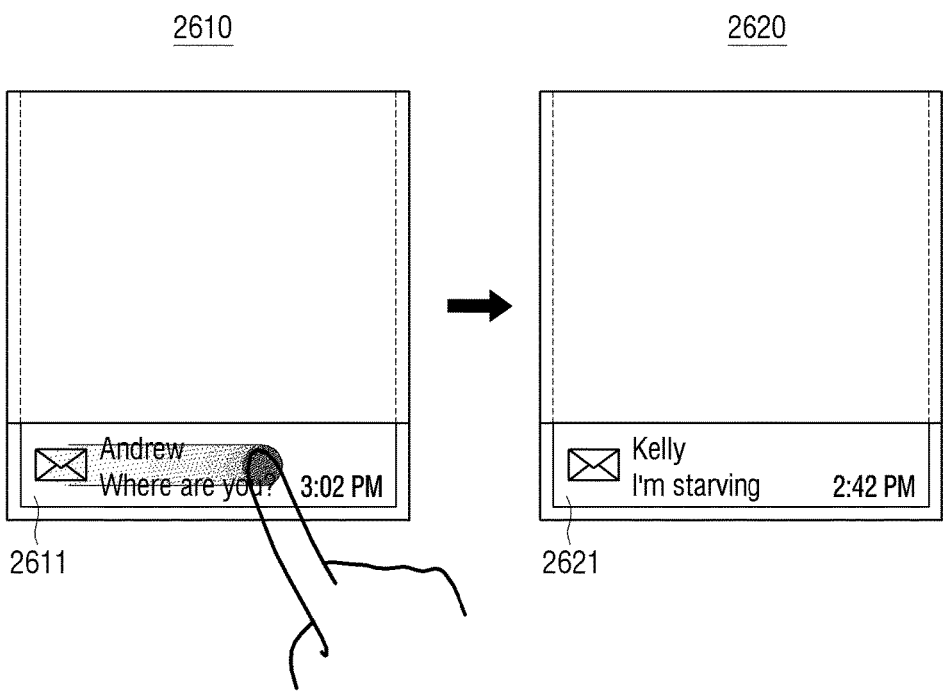

As illustrated in 2610 of FIG. 26A, while an execution screen 2611 of a message application for displaying a received message is displayed on the exposure area, the detector 280 may detect a user interaction of moving in one direction (for example, in a right direction) along a long side of the exposure area. If the detector 280 detects the user interaction, as illustrated in 2620 of FIG. 26A, the controller 290 may control the display 230 to display an execution screen 2621 of the message application for displaying a previously received message.

Figure 26B:
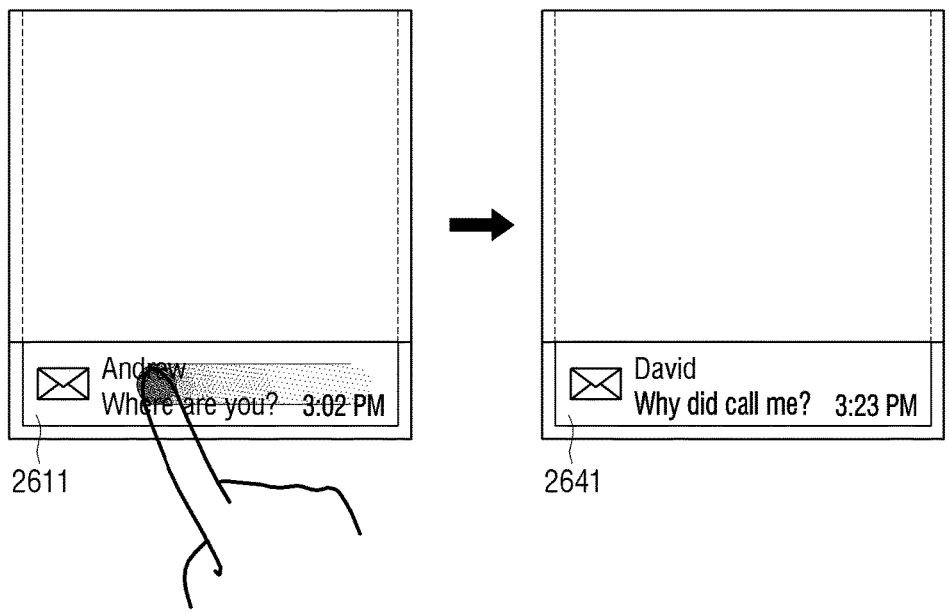

As illustrated in 2630 of FIG. 26B, while the execution screen 2611 of the message application for displaying a received message is displayed on the exposure area, the detector 280 may detect a user interaction of moving in one direction (for example, in a left direction) along a long side of the exposure area. If the detector 280 detects the user interaction, as illustrated in 2640 of FIG. 26B, the controller 290 may control the display 230 to display an execution screen 2641 of a message application for displaying a message after the message.

Figure 26C:
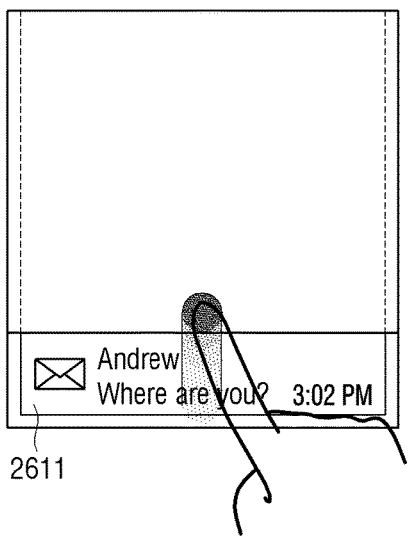
Figure 26C:
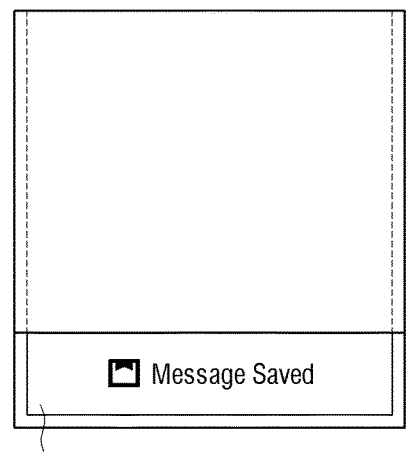

As illustrated in 2650 of FIG. 26C, while the execution screen 2611 of the message application for displaying a received message is displayed on the exposure area, the detector 280 may detect a user interaction of moving in one direction (for example, in a upward direction) along a short side of the exposure area. If the detector 280 detects the user interaction, as illustrated in 2660 of FIG. 26C, the controller 290 controls the display 230 to display an execution screen 2661 of an application indicating that the received message is stored.

Figure 26D:
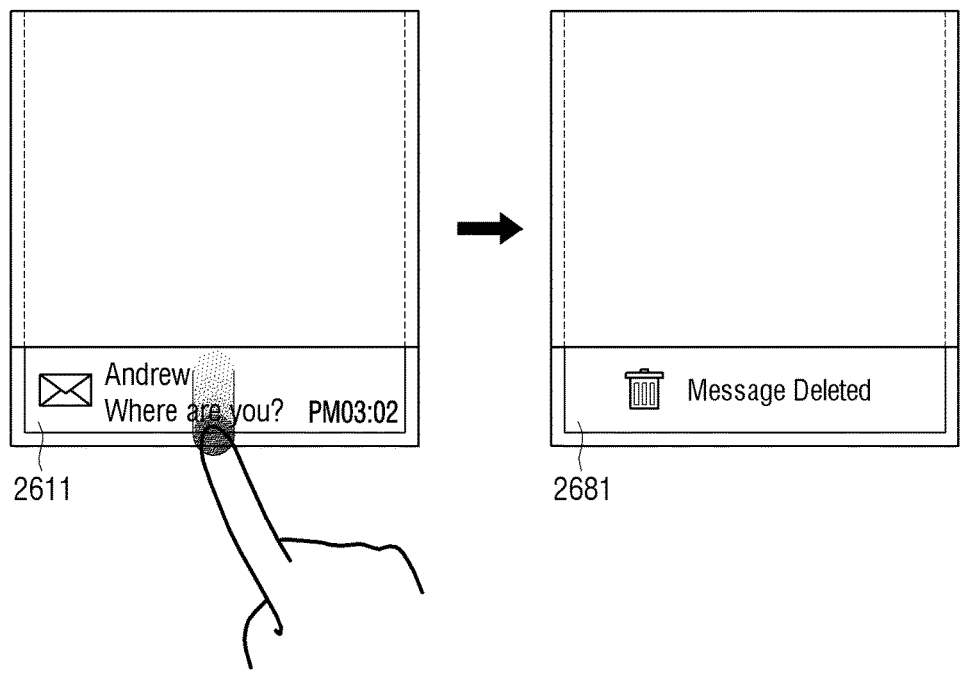

As illustrated in 2670 of FIG. 26D, while the execution screen 2611 of the message application for displaying a received message is displayed on the exposure area, the detector 280 may detect a user interaction of moving in one direction (for example, in a downward direction) along a short side of the exposure area. If the detector 280 detects the user interaction, as illustrated in 2680 of FIG. 26D, the controller 290 may control the display 230 to display an execution screen 2681 of an application indicating that the received message is deleted.

As described above, the controller 290 may provide different functions of an application according to the type of a detected user interaction.

According to an exemplary embodiment, if the detector 290 detects a user interaction of moving in one direction (for example, in an upward direction) while image information is displayed on the exposure area, the controller 290 may perform functions related to storage, such as keeping, scrapping, and reminding of the displayed image information. Alternatively, if the detector 280 detects a user interaction of moving in one direction (for example, in a downward direction) along a short side of the exposure area, the controller 290 may perform the function of deleting the displayed image information. If the detector 280 detects a user interaction of moving in one direction (for example, in a left or right direction) along a long side of the exposure area, the controller 290 may perform the feature of displaying other information related to the displayed image information.

According to another exemplary embodiment, if the detector 280 detects a user interaction of moving in one direction (for example, in an upward or downward direction) along a short side of the exposure area while an execution screen of an application is displayed on the exposure area, the controller 290 may control the display 230 to display an upper menu or a lower menu of the execution screen of the displayed application on the exposure area. Alternatively, the controller 290 may control the display 230 to display an execution screen of an application providing a specialized function (for example, storing or deleting a telephone number) on the execution screen of the application. If the detector 290 detects a user interaction of moving in one direction (for example, in a left or right direction) along a long side of the exposure area, the controller 290 may control the display 230 to immediately display an execution screen of an application providing the function of controlling information in the execution screen.

According to another exemplary embodiment, if the detector 280 detects a user interaction of moving in one direction (for example, in an upward or downward direction) along a short side of the exposure area while an image is not displayed on the exposure area, the controller 290 may control the display 230 to display a home screen the size of the exposure area, a notice, and an execution screen of an application provided by a third party. Alternatively, if the detector 280 detects a user interaction of moving in one direction (for example, in a left or right direction) along a long side of the exposure area, the controller 290 may provide a function that replaces a hard key, or may control the display 230 to display an execution screen of an application providing a quick setting menu.

Figure 27A:
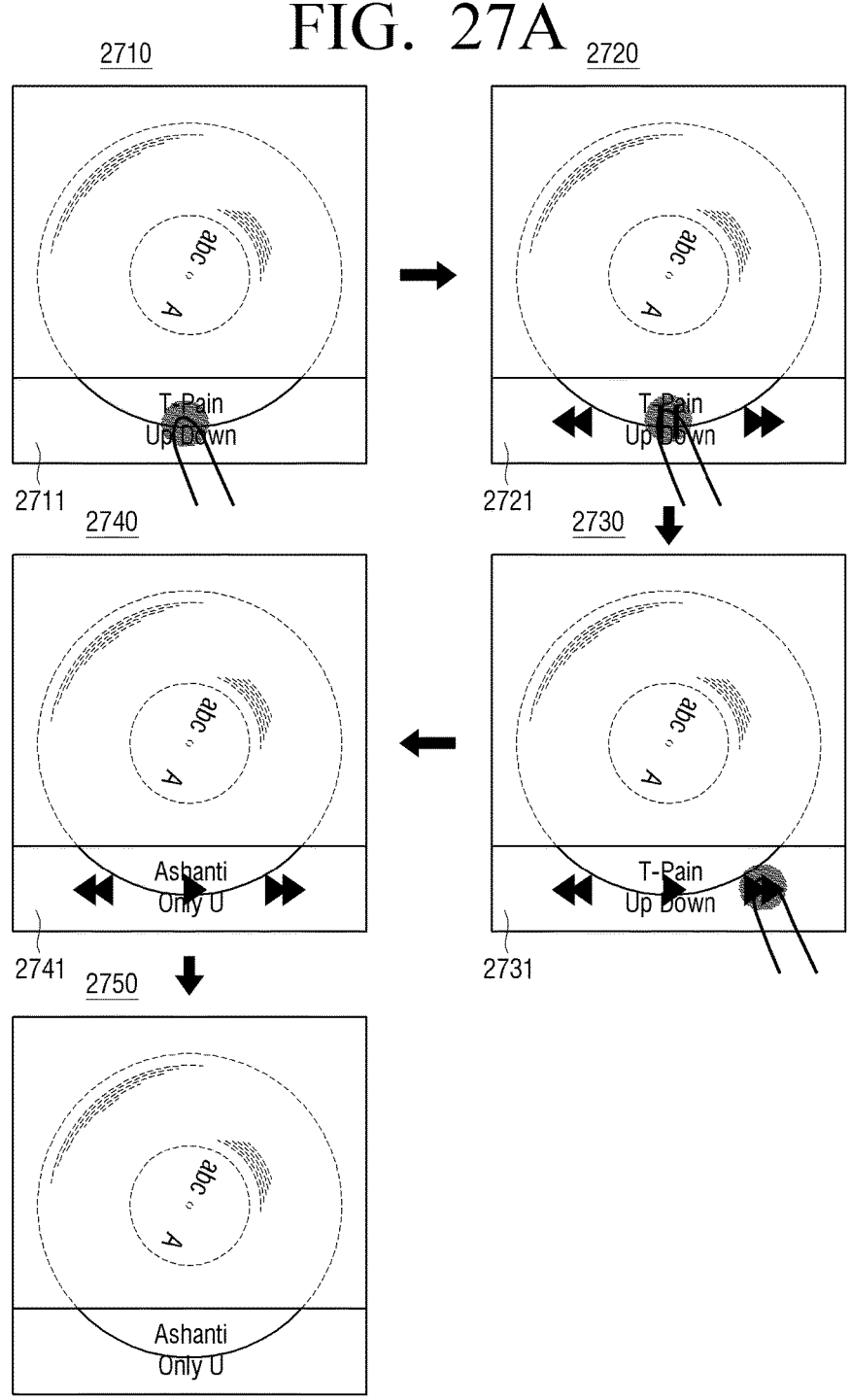
Figure 27B:
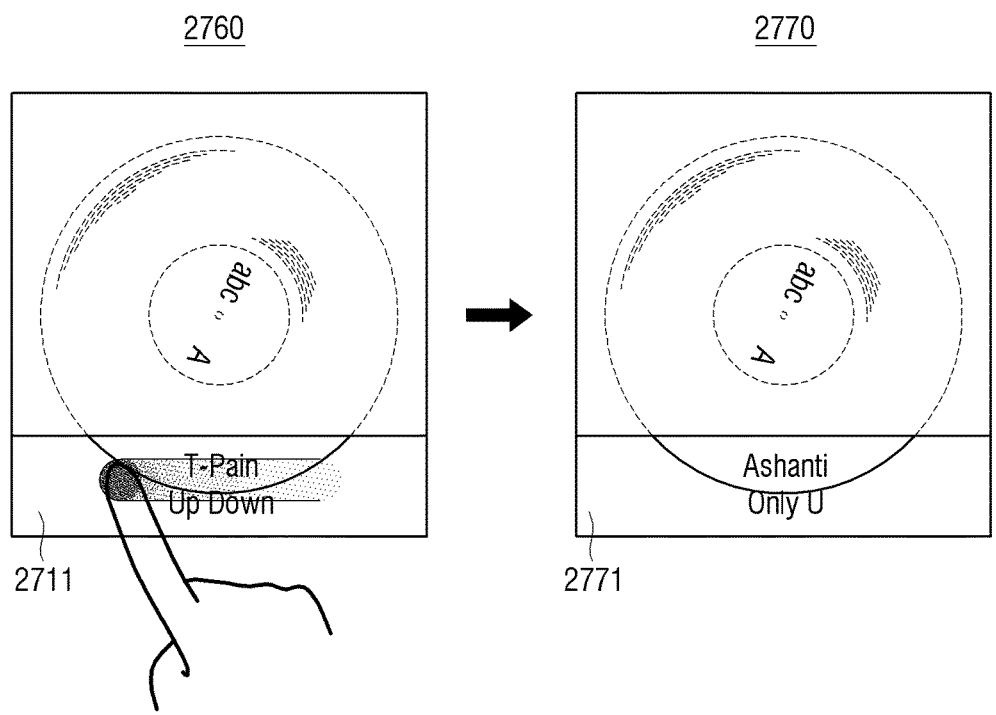
Figure 27C:
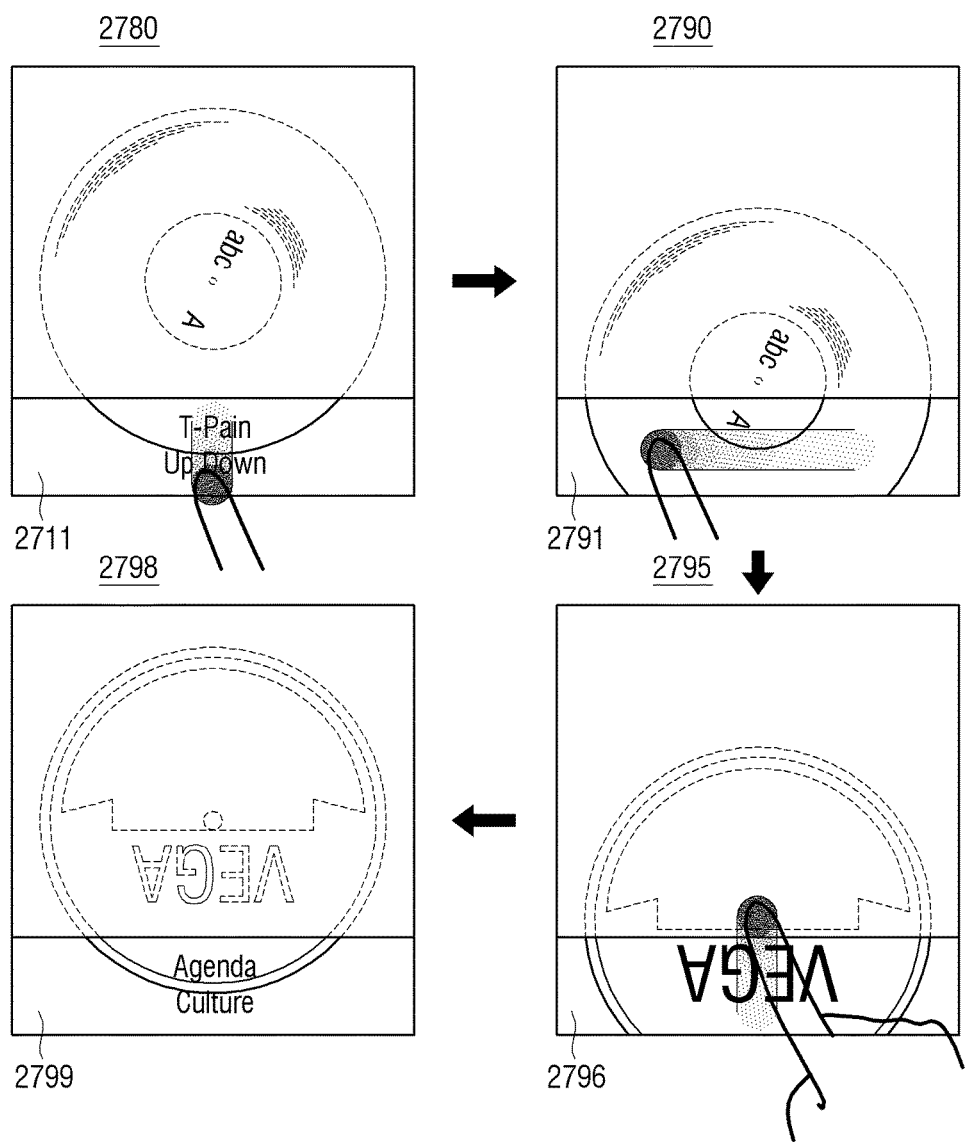

FIGS. 27A to 27C are views illustrating an exemplary embodiment of performing various functions of the user terminal device 200 illustrated in FIG. 2 according to a user interaction on the exposure area.

As illustrated in 2710 of FIG. 27A, the controller 290 may control the display 230 to display an execution screen 2711 of a music player application for displaying information on music which is currently reproduced (for example, the name of the music or singer information) on the exposure area. In this case, the controller 290 may control the display 230 to display a graphic which shows that a Long Playing Record (LPR) is inserted between the first display area and the second display area and part of the LPR is exposed on the exposure area. In this case, the detector 280 may detect a user interaction of touching the exposed area.

If the detector 280 detects the user interaction, as illustrated in 2720 of FIG. 27A, the controller 290 may control the display 230 to display an execution screen 2721 of a music player application for displaying a menu to control music which is currently reproduced on the exposure area. The menu to control music may include, for example, a UI for pausing currently-reproduced music, a UI for searching a playlist where the currently-reproduced music is included or searching music which comes next to the currently-reproduced music from a music album, and a UI for searching music before the currently-reproduced music from a playlist where the currently-reproduced music is included. While the menu to control the currently-reproduced music is displayed, the detector 280 may detect a user interaction of touching the UI for pausing the currently-reproduced music.

If the detector 280 detects the user interaction, as illustrated in 2730 of FIG. 27A, the controller 290 may pause the currently-reproduced music, and control the display 230 to display an execution screen 2731 of a music player application for displaying a menu to control the paused music. While the menu to control the paused music is displayed, the detector 280 may detect a user interaction of touching the UI for searching music which comes next to the currently-paused music from a playlist or a music album where the currently-paused music is included.

If the detector 280 detects the user interaction, as illustrated in 2740 of FIG. 27A, the controller 290 may search music which comes next to the currently-paused music from a playlist or a music album, and control the display 230 to display an execution screen 2741 of a music player application for displaying information regarding the music which comes next to the currently-paused music. In this case, the execution screen 2741 of the music player application may also display a menu to control the music which comes next. While the menu to control the music which comes next is displayed, the detector 280 may detect a user interaction of touching a UI for reproducing the next music.

If the detector 290 detects the user interaction, as illustrated in 2750 of FIG. 27A, the controller 290 may reproduce the next music. Subsequently, after a predetermined time elapses, the controller 290 may control the display 230 to not display the menu to control the next music.

As illustrated in 2760 of FIG. 27B, while the execution screen 2711 of the music player application for displaying information related to the music which is currently reproduced is displayed on the exposure area, the detector 280 may detect a user interaction of moving in one direction (for example, in a left direction) along a long side of the exposure area. If the detector 280 detects the user interaction, as illustrated in 2770 of FIG. 27B, the controller 290 may reproduce music which comes after the currently-reproduced music in a playlist or a music album where the currently-reproduced music is included, and control the display 230 to display an execution screen 2771 of a music player application for displaying information regarding the currently-reproduced music (that is, the next music).

According to another exemplary embodiment, the detector 280 may detect a user interaction of moving in one direction (for example, in a right direction) along a long side of the exposure area. In this case, the controller 290 may reproduce music before the currently-reproduced music in a playlist or a music album where the currently-reproduced music is included, and control the display 230 to display an execution screen of a music player application for displaying information regarding the currently-reproduced music (that is, the previous music).

As illustrated in 2780 of FIG. 27C, while the execution screen 2711 of the music player application for displaying information regarding the currently-reproduced music is displayed on the exposure area, the detector 280 may detect a user interaction of moving in one direction (for example, in a downward direction) along a short side of the exposure area. If the detector 280 detects the user interaction, as illustrated in 2790 of FIG. 27C, the controller 290 may control the display 230 to display an execution screen 2791 of a music player application for displaying information regarding a playlist or a music album including the currently-reproduced music (for example, the name of the playlist or the music album). In this case, the controller 290 may control the display 230 to display a graphic which shows part of the LPR inserted between the first display area and the second display area is extracted on the exposure area. Here, the detector 280 may detect a user interaction of moving in one direction (for example, in a left direction) along a long side of the exposure area. If the detector 280 detects the user interaction, as illustrated in 2795 of FIG. 27C, the controller 290 may control the display 230 to display an execution screen 2796 of a music player application for displaying information related to the playlist or music album which comes next in the folder including the currently-reproduced playlist or music album on the exposure area. While the information regarding the next playlist or music album is displayed, the detector 280 may detect a user interaction of moving in one direction (for example, in an upward direction) along a short side of the exposure area. If the detector 280 detects the user interaction, as illustrated in 2798 of FIG. 27C, the controller 290 may control the display 230 to display a graphic which shows that part of the extracted LPR is inserted between the first display area and the second display area on the exposure area. Subsequently, the controller 290 may reproduce music included in the next playlist or music album, and control the display 230 to display an execution screen 2799 of a music player application for displaying information regarding the currently-reproduced music.

Figure 28:
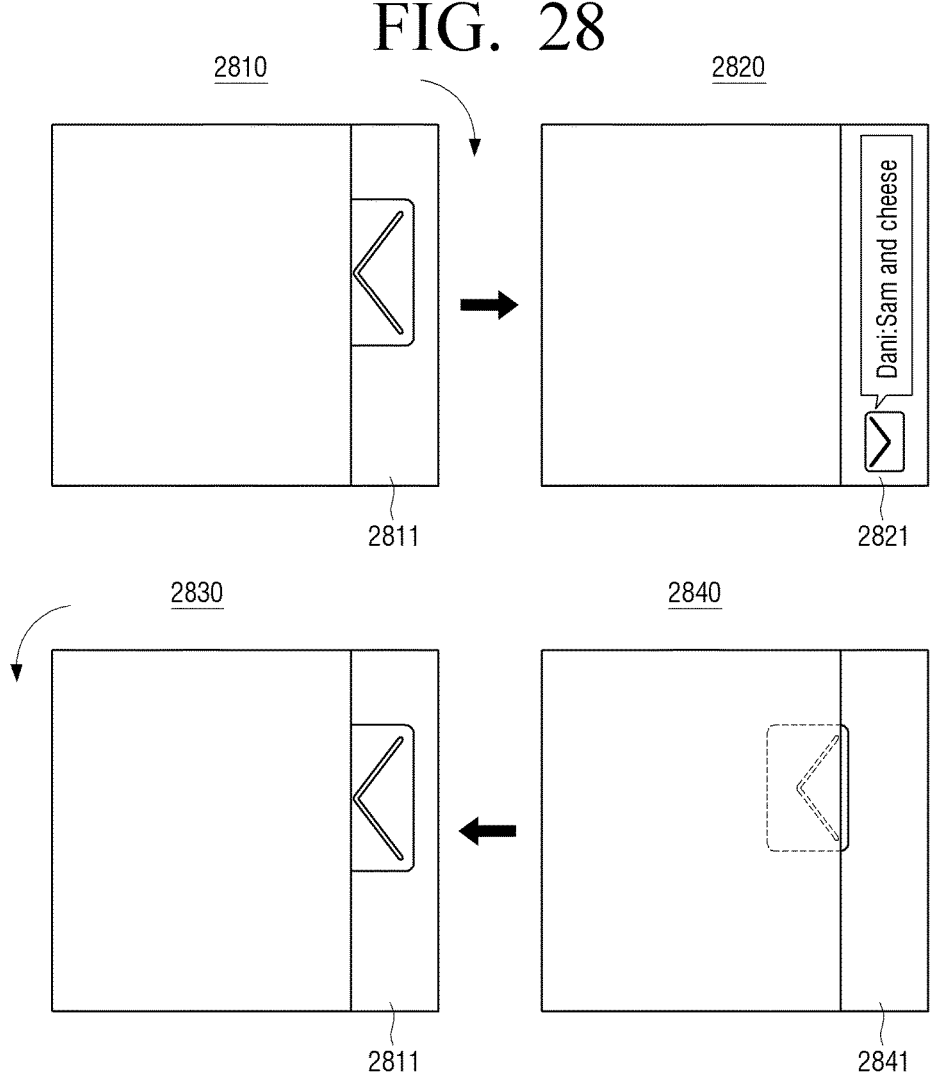

FIG. 28 is a view illustrating an exemplary embodiment of performing various functions of the user terminal device 200 illustrated in FIG. 2 according to a user interaction on the exposure area.

As illustrated in 2810 of FIG. 28, the controller 290 may control the display 230 to display an execution screen 2811 of an application where a graphic showing that a message is popping out of a pocket when the message is received is displayed on the exposure area. In this case, the detector 280 may detect a user interaction of tilting the user terminal device 200 towards the direction of the exposure area. If the detector 280 detects the user interaction, as illustrated in 2820 of FIG. 28C, the controller 290 may control the display 230 to display an execution screen 2821 of an application where the content of a message is displayed on the exposure area.

As illustrated in 2830 of FIG. 28, while the execution screen 2811 of an application where a graphic showing that a message is popping out of a pocket is displayed is displayed on the exposure area, the detector 280 may detect a user interaction of tilting the user terminal device 200 in an opposite direction to the exposure area. If the detector 280 detects the user interaction, as illustrated in 2840 of FIG. 28, the controller 290 may store a message in the storage 250, and control the display 230 to display an execution screen 2841 of an application for displaying a graphic showing that a message is inserted and kept in a pocket on the exposure area.

Figure 29:
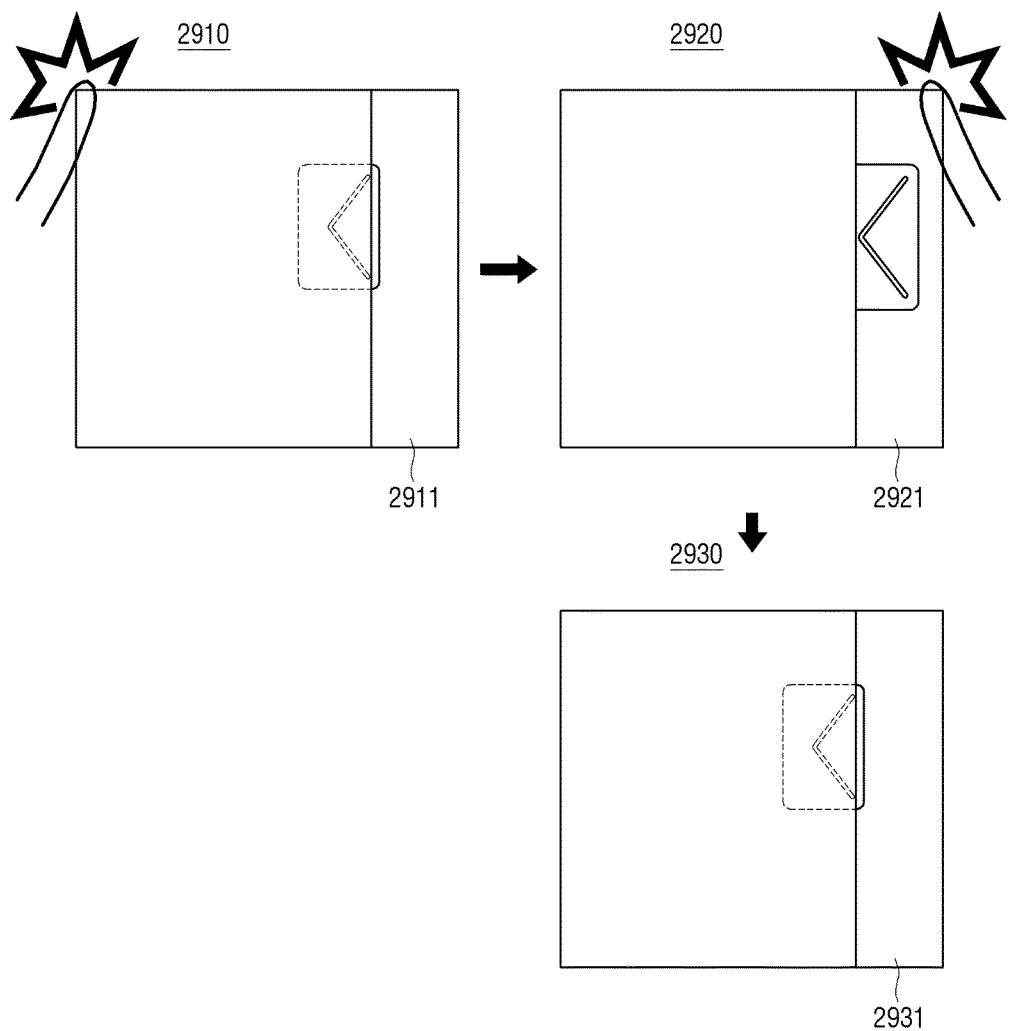

FIG. 29 is a view illustrating an exemplary embodiment of performing various functions of the user terminal device 200 illustrated in FIG. 2 according to a user interaction on the exposure area.

As illustrated in 2910 of FIG. 29, the controller 290 may control the display 230 to display an execution screen 2911 of an application for displaying a graphic showing that part of a content (for example, a message) is protruded between the first and the second display areas when the message is received on the exposure area. In this case, the detector 280 may detect a user interaction of tapping one side of the user terminal device 200. For example, the detector 280 may detect a user interaction of tapping a hinge unit, a folding line or around the folding line of the display 230. If the detector 280 detects the user interaction, as illustrated in 2920 of FIG. 29, the controller 290 may control the display 230 to display an execution screen 2921 of an application for displaying a graphic showing that most of the content is protruded between the first and the second display areas on the exposure area so that the content can be identified. While the graphic showing that most of the content is protruded between the first and the second display areas is displayed on the exposure area, the detector 280 may detect a user interaction of tapping another side of the user terminal device 200. For example, the detector 280 may detect a user interaction of tapping a bezel on the exposure area or a corner of the exposure area. If the detector 280 detects the user interaction, as illustrated in 2930 of FIG. 29, the controller 290 may control the display 230 to display an execution screen 2931 of an application for displaying a graphic showing that part of a content is protruded between the first and the second display areas on the exposure area. Alternatively, the controller 290 may control the display 230 to not display the content on the exposure area.

Figure 30:
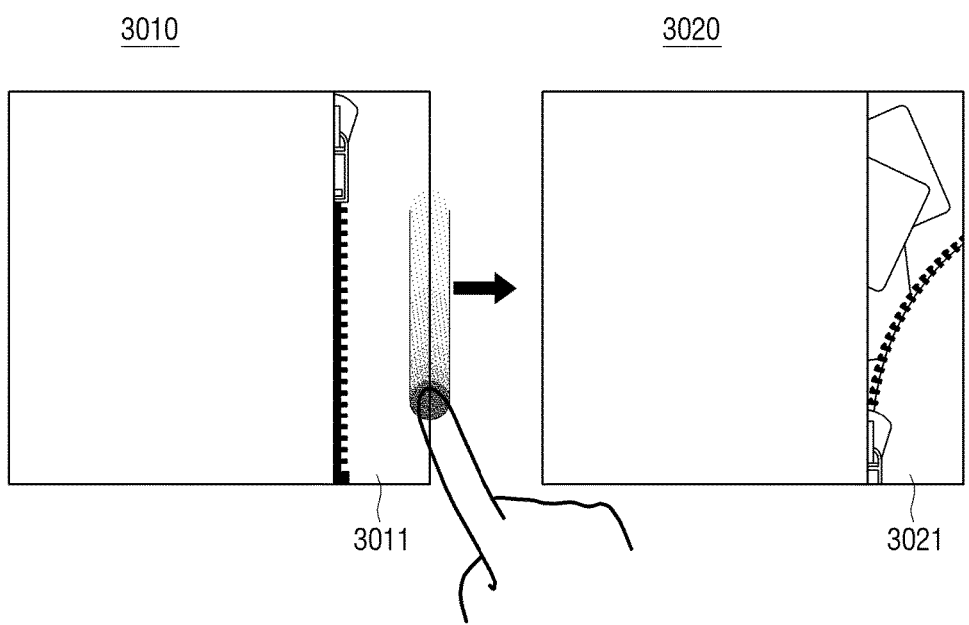

FIG. 30 is a view illustrating an exemplary embodiment of performing various functions of the user terminal device 200 illustrated in FIG. 2 according to a user interaction on the exposure area.

As illustrated in 3010 of FIG. 30, the controller 290 may control the display 230 to display an execution screen 3011 of an application for displaying a graphic showing that a zipper is locked to indicate that the exposed screen is in a lock state on the exposure area. In this case, the detector 280 may detect a user interaction of moving in one direction (for example, in a downward direction) along a long side of the exposure area. If the detector 280 detects the user interaction, as illustrated in 3020 of FIG. 30, the controller 290 may display at least one content (for example, public information) by releasing the lock state of the exposed screen, and control the display 230 to display an execution screen 3021 of an application for displaying a graphic showing that the zipper is opened on the exposure area.

Figure 31A:
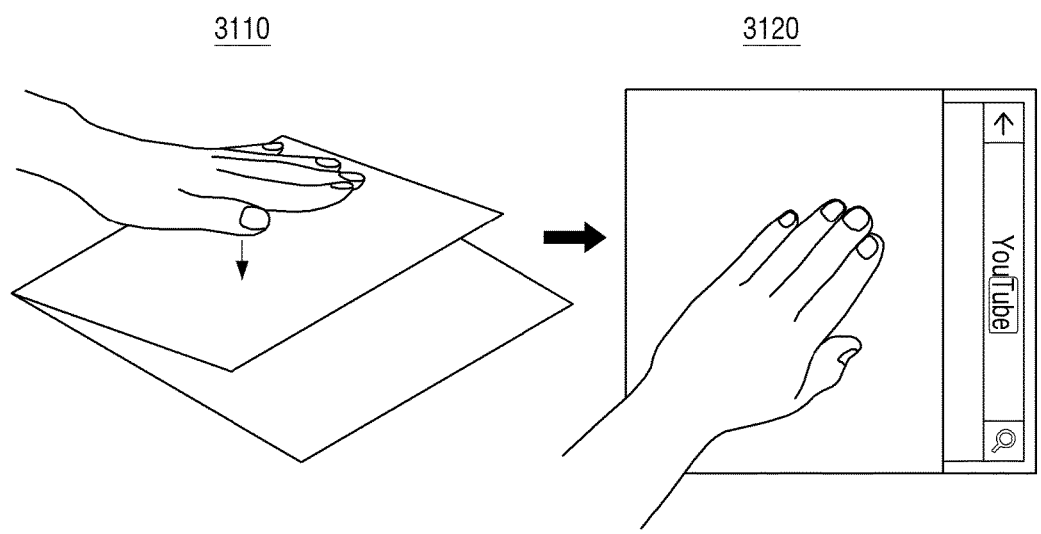
Figure 31B:
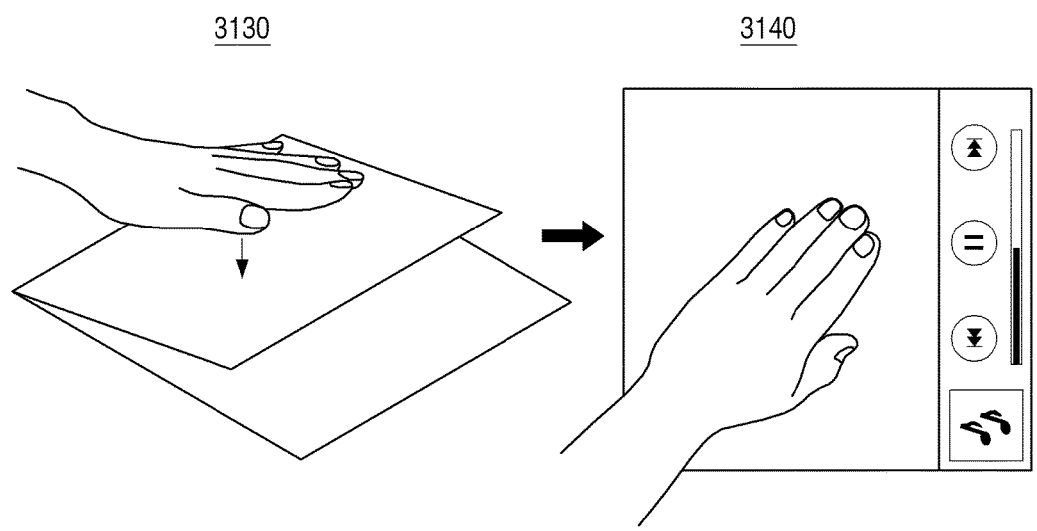

FIGS. 31A and 31B are views illustrating an exemplary embodiment of performing various functions of the user terminal device 200 illustrated in FIG. 2 according to a user interaction on the exposure area.

As illustrated in 3110 of FIG. 31A, the detector 280 may detect a user interaction of pressing a cover of the user terminal device 200. In this case, the exposure area may not display any image, or may display an image in a lock state. While the detector 290 detects the user interaction of pressing the cover, as illustrated in 3120 of FIG. 31A, the controller 290 may control the display 230 to display part of an application which is currently used. While the part of the application is displayed, the detector 280 may detect a user interaction of stopping the operation of pressing the cover of the user terminal device 200. If the detector 280 detects the user interaction, the controller 290 may control the display 230 to not display the part of the application on the exposed screen.

As illustrated in 3130 of FIG. 31B, the detector 280 may detect a user interaction of pressing the cover of the user terminal device 200. In this case, the exposure area may not display any image, or may display an image in a lock state. While the detector 280 detects the user interaction of pressing the cover, as illustrated in 3140 of FIG. 31B, the controller 290 may control the display 230 to display a preview screen of an application which is currently used. For example, if the application is a music application, the preview screen of the application may be a menu to control the music which is currently reproduced. While the preview screen of the application is displayed, the detector 280 may detect a user interaction of stopping the operation of pressing the cover of the user terminal device 200. If the detector 280 detects the user interaction, the controller 290 may control the display 230 to not display the preview screen of the application on the exposed screen.

Figure 32:
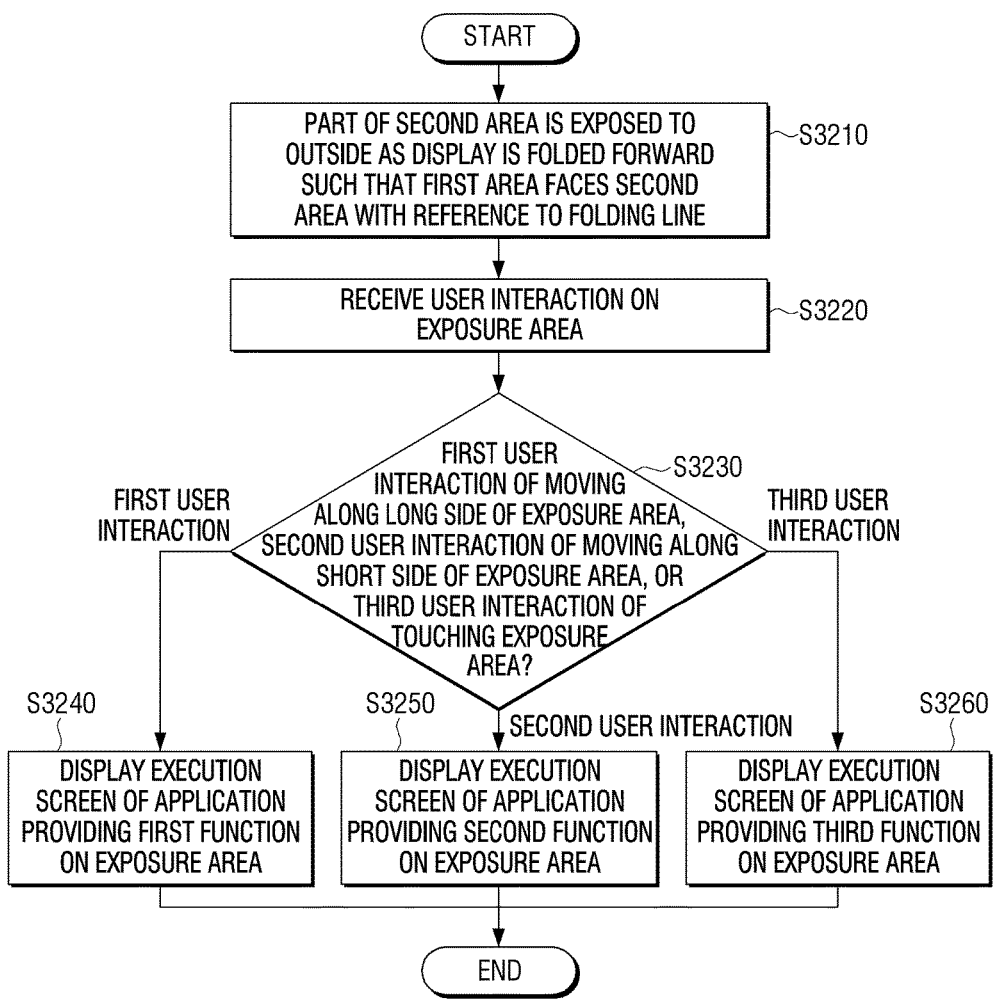
FIG. 32 is a flowchart illustrating a displaying method of a user terminal device according to an exemplary embodiment.

FIG. 32 is a flowchart illustrating a displaying method of the user terminal device 200 according to another exemplary embodiment.

First of all, the display 230 may be folded forward such that a first area faces a second area with reference to a folding line, and a part of the second area may be exposed to outside (S3210).

In this state, the user terminal device 200 may receive a user interaction on the exposure area (S3220). The user terminal device 200 may determine whether the received user interaction is a first user interaction of moving along a long side of the exposure area, a second user interaction of moving along a short side of the exposure area, or a third user interaction of touching the exposure area (S3230).

If it is determined that the received user interaction is the first user interaction of moving along a long side of the exposure area, the user terminal device 200 may display an execution screen of an application providing a first function on the exposure area (S3240).

If it is determined that the received user interaction is the second user interaction of moving along a short side of the exposure area, the user terminal device 200 may display an execution screen of an application providing a second function on the exposure area (S3250).

If it is determined that the received user interaction is the third user interaction of touching the exposure area, the user terminal device 200 may display an execution screen of an application providing a third function on the exposure area (S3260).

As described above, the display 230 displays a UI on the exposure area which is an exposed area when the display 230 is folded and thus, a user may perform various functions of the user terminal device through the UI displayed on the exposure area, even when the display is folded, and the displayed UI may provide various information.

The displaying method of a user terminal device according to the above-described various exemplary embodiments may be realized as a program and provided in the user terminal device. Specifically, a non-transitory computer readable medium including a program of a control method of the user terminal device is stored may be provided.

The non-transitory recordable medium refers to a medium which may store data semi-permanently and a memory, and may be readable by an apparatus. Specifically, the non-transitory readable medium may be CD, DVD, hard disk, Blu-ray disk, USB, memory card, ROM, etc.

The foregoing embodiments and advantages are merely exemplary and are not to be construed as limiting the present invention. The present teaching can be readily applied to other types of apparatuses. Also, the description of exemplary embodiments of the present inventive concept is intended to be illustrative, and not to limit the scope of the claims, and the disclosure includes many alternatives, modifications, and variations apparent to those skilled in the art.

What is claimed is:

1. A displaying method of a user terminal device including a single flexible display which is divided into a first area and a second area by a hinge, and an exposure area of the first area being not covered by the second area when the user terminal device is folded so that the first area faces the second area, the method comprising:
    detecting one of a first user interaction and a second user interaction different from the first user interaction on the exposure area while the user terminal device is folded along the hinge such that the first area faces the second area; and
    displaying a first function execution screen on the exposure area in response to detecting the first user interaction on the exposure area, and displaying a second function execution screen on the exposure area in response to detecting the second user interaction on the exposure area,
    wherein the first area is continuous,
    wherein the first user interaction comprises movement in a first direction along a long side of the exposure area and movement in a second direction opposite to the first direction along the long side of the exposure area, and
    wherein the displaying the first function execution screen on the exposure area comprises:
        displaying a third function execution screen on the exposure area in response to detecting movement in the first direction, and
        displaying a fourth function execution screen on the exposure area in response to detecting movement in the second direction.

2. The method as claimed in claim 1,
    wherein the second user interaction moves along a short side of the exposure area perpendicular to the first direction in parallel with a short side of the exposure area.

3. The method as claimed in claim 1, wherein an application providing the first function execution screen is the same as the application providing the second function execution screen.

4. The method as claimed in claim 1, wherein the second user interaction comprises movement in a third direction along a short side of the exposure area and movement in a fourth direction opposite to the third direction along the short side of the exposure area,
    wherein the first function execution screen comprises:
        displaying a fifth function execution screen on the exposure area in response to detecting movement in the third direction, and
        displaying a sixth function execution screen on the exposure area in response to detecting movement in the fourth direction.

5. The method as claimed in claim 1, wherein the first function execution screen displays one of a home screen, public information, state information of the user terminal device, and an environment setting user interface of the user terminal device, and
    wherein the second function execution screen displays another one of the home screen, public information, state information of the user terminal device, and the environment setting user interface of the user terminal device.

6. The method as claimed in claim 1, wherein the first function execution screen displays image information and a first user interface for requesting one or more of storing the image information, deleting the image information, displaying other information related to the image information, a lower menu and an upper menu, and
    wherein the second function execution screen displays a second user interface for requesting another one of storing the image information, deleting the image information, displaying other information related to the image information, and a lower menu or an upper menu.

7. The method as claimed in claim 1, wherein the first function execution screen is a telephone application execution screen for indicating that one of a telephone call request is accepted, the telephone call request is rejected, a telephone number of a counterpart requesting the telephone call is stored in a contact list, and the telephone number of the counterpart requesting the telephone call is stored in a spam list, and
    wherein the second function execution screen is another telephone application execution screen for indicating another one of the telephone call request is accepted, the telephone call request is rejected, the telephone number of the counterpart requesting the telephone call is stored in the contact list, and indicating that the telephone number of the counterpart requesting the telephone call is stored in the spam list.

8. The method as claimed in claim 1, wherein the first function execution screen is a message application execution screen for providing one of a received message, a next message, a previous message, an indication that the message is stored, and an indication that the message is deleted, and wherein the second function execution screen is another message application execution screen for providing another one of the next message, the previous message, the indication that the message is stored, and the indication that the message is deleted.

9. The method as claimed in claim 1, wherein the first function execution screen is a music application execution screen for providing one of playlist information, next song information, previous song information, and other playlist information, and
wherein the second function execution screen is another music application execution screen for providing another one of playlist information, next song information, previous song information, and other playlist information.

10. The method as claimed in claim 1, further comprising:
detecting a third user interaction of touching the exposure area; and
displaying a fifth function execution screen on the exposure area in response to detecting the third user interaction.

11. A user terminal device, the device comprising:
a hinge for folding the user terminal device;
a single flexible display including a first area and a second area, the first area and the second area being defined by the hinge, and an exposure area of the first area being not covered by the second area when the user terminal device is folded so that the first area faces the second area;
a detector configured to detect one of a first user interaction and a second user interaction different from the first user interaction on the exposure area while the user terminal device is folded along the hinge such that the first area faces the second area; and
a controller configured to display a first function execution screen on the exposure area in response to detecting the first user interaction on the exposure area, and display a second function execution screen on the exposure area in response to detecting the second user interaction on the exposure area,
wherein the first area is continuous,
wherein the first user interaction comprises movement in a first direction along a long side of the exposure area and movement in a second direction opposite to the first direction along the long side of the exposure area, and
wherein the controller is configured to control the single flexible display to display a third function execution screen on the exposure area in response to detecting movement in the first direction, and control the single flexible display to display a fourth function execution screen on the exposure area in response to detecting movement in the second direction.

12. The device as claimed in claim 11,
wherein the second user interaction moves along a short side of the exposure area perpendicular to the first direction in parallel with a short side of the exposure area.

13. The device as claimed in claim 11, wherein an application providing the first function execution screen is the same as the application providing the second function execution screen.

14. The device as claimed in claim 11, wherein the first function execution screen displays one of a home screen, public information, state information of the user terminal device, and an environment setting user interface of the user terminal device, and
wherein the second function execution screen displays another one of the home screen, public information, state information of the user terminal device, and the environment setting user interface of the user terminal device.

15. The device as claimed in claim 11, wherein the first function execution screen displays image information and a first user interface for requesting one or more of storing the image information, deleting the image information, displaying other information related to the image information, and a lower menu or an upper menu, and
wherein the second function execution screen displays a second user interface for requesting another one of storing the image information, deleting the image information, displaying other information related to the image information, a lower menu and an upper menu.

16. The device as claimed in claim 11, wherein the first function execution screen is a telephone application execution screen for indicating that one of a telephone call request is accepted, the telephone call request is rejected, a telephone number of a counterpart requesting the telephone call is stored in a contact list, and the telephone number of the counterpart requesting the telephone call is stored in a spam list, and
wherein the second function execution screen is another telephone application execution screen for indicating another one of the telephone call request is accepted, the telephone call request is rejected, the telephone number of the counterpart requesting the telephone call is stored in the contact list, and indicating that the telephone number of the counterpart requesting the telephone call is stored in the spam list.

17. The device as claimed in claim 11, wherein the first function execution screen is a message application execution screen for providing one of a received message being, a next message, a previous message, an indication that the message is stored, and an indication that the message is deleted, and
wherein the second function execution screen is another message application execution screen for providing another one of the next message, the previous message, the indication that the message is stored, and the indication that the message is deleted.

18. A user terminal device, the device comprising:
a hinge for folding the user terminal device;
a display including a first area and a second area, the first area and the second area being defined by the hinge, and an exposure area of the first area being not covered by the second area when the user terminal device is folded so that the first area faces the second area;
a detector configured to detect one of a first user interaction and a second user interaction different from the first user interaction on the exposure area while the user terminal device is folded along the hinge such that the first area faces the second area; and
a controller configured to display a first function execution screen on the exposure area in response to detecting the first user interaction on the exposure area, and display a second function execution screen on the exposure area in response to detecting the second user interaction on the exposure area,
wherein the second user interaction comprises movement in a third direction along a short side of the exposure area and movement in a fourth direction opposite to the third direction along the short side of the exposure area, wherein the controller is configured to control the display to display a fifth function execution screen on the exposure area in response to detecting movement in the third direction, and control the display to display a sixth function execution screen on the exposure area in response to detecting movement in the fourth direction.

\* \* \* \* \*